United States Patent
Digilov et al.

(10) Patent No.: US 10,447,795 B2
(45) Date of Patent: Oct. 15, 2019

(54) SYSTEM AND METHOD FOR COLLABORATIVE TELEPRESENCE AMONGST NON-HOMOGENEOUS ENDPOINTS

(71) Applicant: Polycom, Inc., San Jose, CA (US)

(72) Inventors: Matvey Digilov, Petach Tikva (IL); Amir Levy, Sunnyvale, CA (US); Marek Dutkiewicz, Sunnyvale, CA (US); Thomas Quentin Brady, Austin, TX (US); Mike Tucker, Austin, TX (US); Moshe Noah Lipsker, Moshav Nehusha (IL); Anat Levy, Petch Tikva (IL)

(73) Assignee: Polycom, Inc., San Jose, CA (US)

( * ) Notice: Subject to any disclaimer, the term of this patent is extended or adjusted under 35 U.S.C. 154(b) by 36 days.

(21) Appl. No.: 15/286,466

(22) Filed: Oct. 5, 2016

(65) Prior Publication Data
US 2017/0099361 A1    Apr. 6, 2017

Related U.S. Application Data

(60) Provisional application No. 62/237,361, filed on Oct. 5, 2015.

(51) Int. Cl.
| | | |
|---|---|---|
| H04L 29/08 | (2006.01) | |
| H04W 4/02 | (2018.01) | |
| H04W 4/80 | (2018.01) | |
| H04L 29/06 | (2006.01) | |
| H04N 7/15 | (2006.01) | |
| H04L 12/18 | (2006.01) | |
| H04W 84/18 | (2009.01) | |

(52) U.S. Cl.
CPC ............ *H04L 67/24* (2013.01); *H04L 65/403* (2013.01); *H04L 67/02* (2013.01); *H04W 4/023* (2013.01); *H04W 4/80* (2018.02); *H04L 12/1818* (2013.01); *H04M 2203/5054* (2013.01); *H04N 7/15* (2013.01); *H04N 7/152* (2013.01); *H04W 84/18* (2013.01)

(58) Field of Classification Search
CPC ..... H04L 65/403; H04L 12/1818; H04N 7/15; H04N 7/152; H04M 2203/5054
See application file for complete search history.

(56) References Cited

U.S. PATENT DOCUMENTS

| | | | |
|---|---|---|---|
| 8,553,065 B2 * | 10/2013 | Gannu | H04M 3/567 348/14.07 |
| 8,767,593 B1 * | 7/2014 | Allen | 370/260 |
| 9,338,400 B1 * | 5/2016 | Krishnan | H04N 7/152 |

(Continued)

*Primary Examiner* — Lashonda T Jacobs
(74) *Attorney, Agent, or Firm* — Blank Rome, LLP

(57) ABSTRACT

A telepresence system which includes at least one display device and a beacon coupled to the display device. The beacon emits a signal so as to be discoverable by electronic devices nearby such as in a meeting location. The system also includes a receiver-controller coupled to the beacon, the receiver-controller configured to enable such electronic devices to be recognized and to join a collaborative session in which content from one electronic device can be shared with other electronic devices. The receiver-controller can and will share some or all of its functions with one or more of the joined devices simultaneously, if security and identity protocols are satisfied.

17 Claims, 42 Drawing Sheets

(56) References Cited

U.S. PATENT DOCUMENTS

| | | | | |
|---|---|---|---|---|
| 9,609,030 B2* | 3/2017 | Sun | | H04N 7/142 |
| 9,774,824 B1* | 9/2017 | Brady | | H04L 67/18 |
| 2004/0130614 A1* | 7/2004 | Valliath | | H04N 7/147 |
| | | | | 348/14.01 |
| 2007/0273751 A1* | 11/2007 | Sachau | | H04N 7/14 |
| | | | | 348/14.02 |
| 2009/0110169 A1* | 4/2009 | Whitsell | | H04L 12/1818 |
| | | | | 379/205.01 |
| 2009/0210789 A1* | 8/2009 | Thakkar | | H04L 65/403 |
| | | | | 715/719 |
| 2010/0005142 A1* | 1/2010 | Xiao | | G06Q 10/10 |
| | | | | 709/204 |
| 2010/0073454 A1* | 3/2010 | Lovhaugen | | G06F 3/0486 |
| | | | | 348/14.03 |
| 2010/0149309 A1* | 6/2010 | Hagen | | H04N 7/144 |
| | | | | 348/14.12 |
| 2010/0321465 A1* | 12/2010 | Behrens | | H04L 12/1818 |
| | | | | 348/14.02 |
| 2011/0081923 A1* | 4/2011 | Forutanpour | | H04W 4/21 |
| | | | | 455/457 |
| 2012/0069133 A1* | 3/2012 | Wu | | H04L 12/1818 |
| | | | | 348/14.03 |
| 2012/0127263 A1* | 5/2012 | Ogle | | H04L 12/1827 |
| | | | | 348/14.09 |
| 2012/0158849 A1* | 6/2012 | Yoakum | | H04L 12/1822 |
| | | | | 709/205 |
| 2013/0106976 A1* | 5/2013 | Chu | | H04L 65/1069 |
| | | | | 348/14.02 |
| 2013/0106977 A1* | 5/2013 | Chu | | H04N 7/142 |
| | | | | 348/14.02 |
| 2013/0109365 A1* | 5/2013 | Buzdugan | | H04W 76/40 |
| | | | | 455/416 |
| 2013/0155175 A1* | 6/2013 | Mock | | H04L 12/1813 |
| | | | | 348/14.05 |
| 2013/0198635 A1* | 8/2013 | Jones | | H04L 65/104 |
| | | | | 715/727 |
| 2014/0074537 A1* | 3/2014 | Bargetzi | | G08C 17/02 |
| | | | | 705/7.19 |
| 2014/0108506 A1* | 4/2014 | Borzycki | | H04L 67/10 |
| | | | | 709/203 |
| 2014/0108792 A1* | 4/2014 | Borzycki | | G06F 21/6218 |
| | | | | 713/165 |
| 2014/0150059 A1* | 5/2014 | Uchida | | H04L 63/08 |
| | | | | 726/3 |
| 2014/0337528 A1* | 11/2014 | Barton | | H04L 41/00 |
| | | | | 709/225 |
| 2015/0007055 A1* | 1/2015 | Lemus | | G06F 3/0484 |
| | | | | 715/753 |
| 2015/0077502 A1* | 3/2015 | Jordan | | H04N 7/142 |
| | | | | 348/14.03 |
| 2015/0097922 A1* | 4/2015 | Le Devehat | | H04L 65/1069 |
| | | | | 348/14.08 |
| 2015/0117626 A1* | 4/2015 | Nord | | H04M 3/568 |
| | | | | 379/202.01 |
| 2015/0156231 A1* | 6/2015 | Noisette | | H04L 12/1818 |
| | | | | 709/204 |
| 2015/0312344 A1* | 10/2015 | Anderton | | G06Q 10/06 |
| | | | | 709/203 |
| 2015/0349971 A1* | 12/2015 | Sinha | | H04L 63/0428 |
| | | | | 370/260 |
| 2016/0065625 A1* | 3/2016 | Ouyang | | H04L 65/403 |
| | | | | 715/753 |
| 2016/0095141 A1* | 3/2016 | Ma | | H04W 76/10 |
| | | | | 455/416 |
| 2016/0205154 A1* | 7/2016 | Huang | | G06F 16/9558 |
| | | | | 709/204 |
| 2016/0248597 A1* | 8/2016 | Liu | | H04L 51/043 |
| 2016/0316174 A1* | 10/2016 | Whynot | | H04L 49/35 |
| 2016/0323330 A1* | 11/2016 | Holst | | H04L 12/18 |
| 2017/0118271 A1* | 4/2017 | Reyes | | H04L 67/06 |

* cited by examiner

| Feature | Chairperson | Attendee | Guest |
|---|---|---|---|
| Mute Local endpoint | Yes | Yes | Yes |
| Volume Control Local endpoint | Yes | Yes | Yes |
| Initiate a call using local endpoint | Yes | Yes | No |
| Control Local Camera | Yes | Yes | No |
| Send Content to Local Display(s) | Yes | Yes | Yes |
| End content display | Yes | No | No |
| Control Local display(s) layout | Yes | Yes | No |
| View Participant List | Yes | Yes | Yes |
| Add/Remove a Participant | Yes | No | No |
| (Hard) Mute a Participant | Yes | No | No |
| (Soft) Mute a Participant | Yes | No | No |
| (Hard) Mute all participants except self | Yes | No | No |
| (Soft) Mute all participants except self | Yes | No | No |
| Change Roles of other participants | Yes | No | No |
| Control Camera of Far End participant | Yes | No | No |
| View Content | Yes | Yes | Yes |
| Send Content to meeting participants | Yes | Yes | No |
| Recording Start/Stop/Pause | Yes | Yes | No |
| Chat with all participants | Yes | Yes | Yes |
| Chat with individual participants | Yes | Yes | Yes |
| Chat with sub-set of participants | Yes | Yes | Yes |
| End The Meeting | Yes | No | No |

FIG. 1

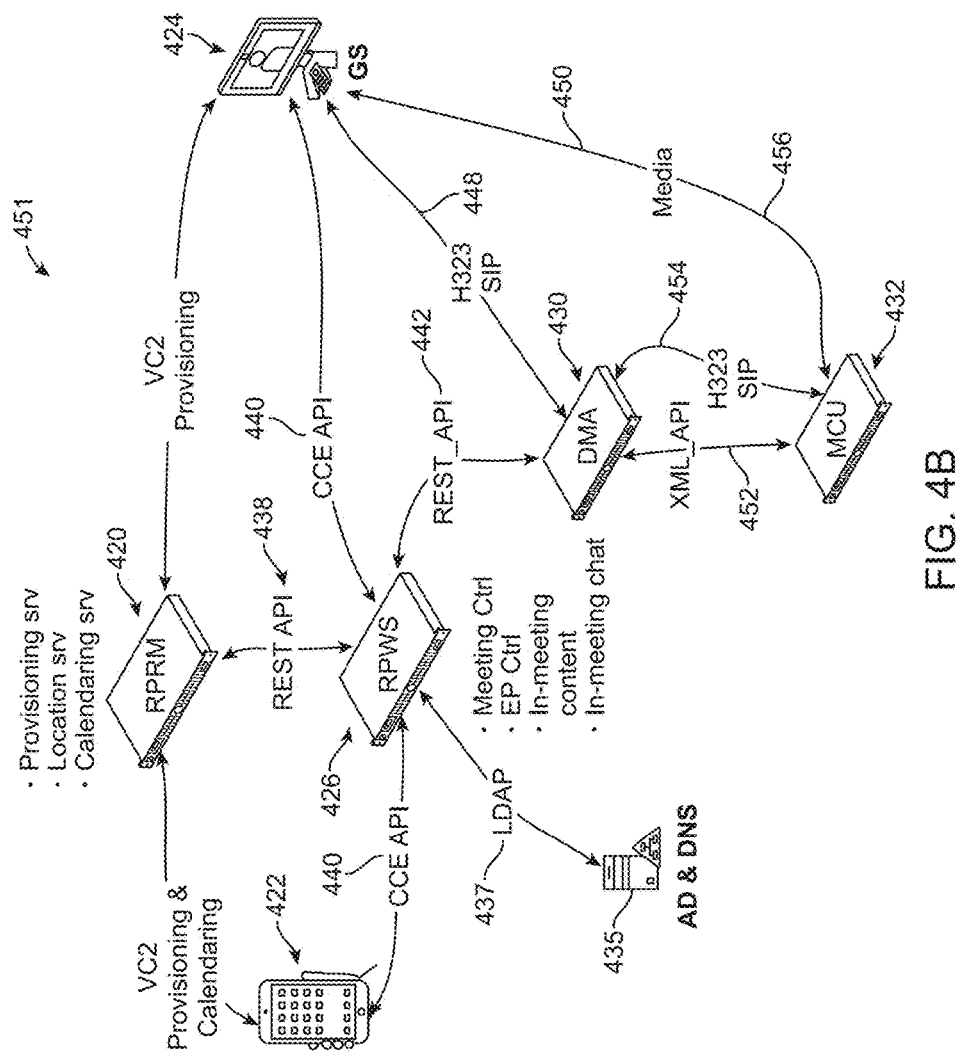

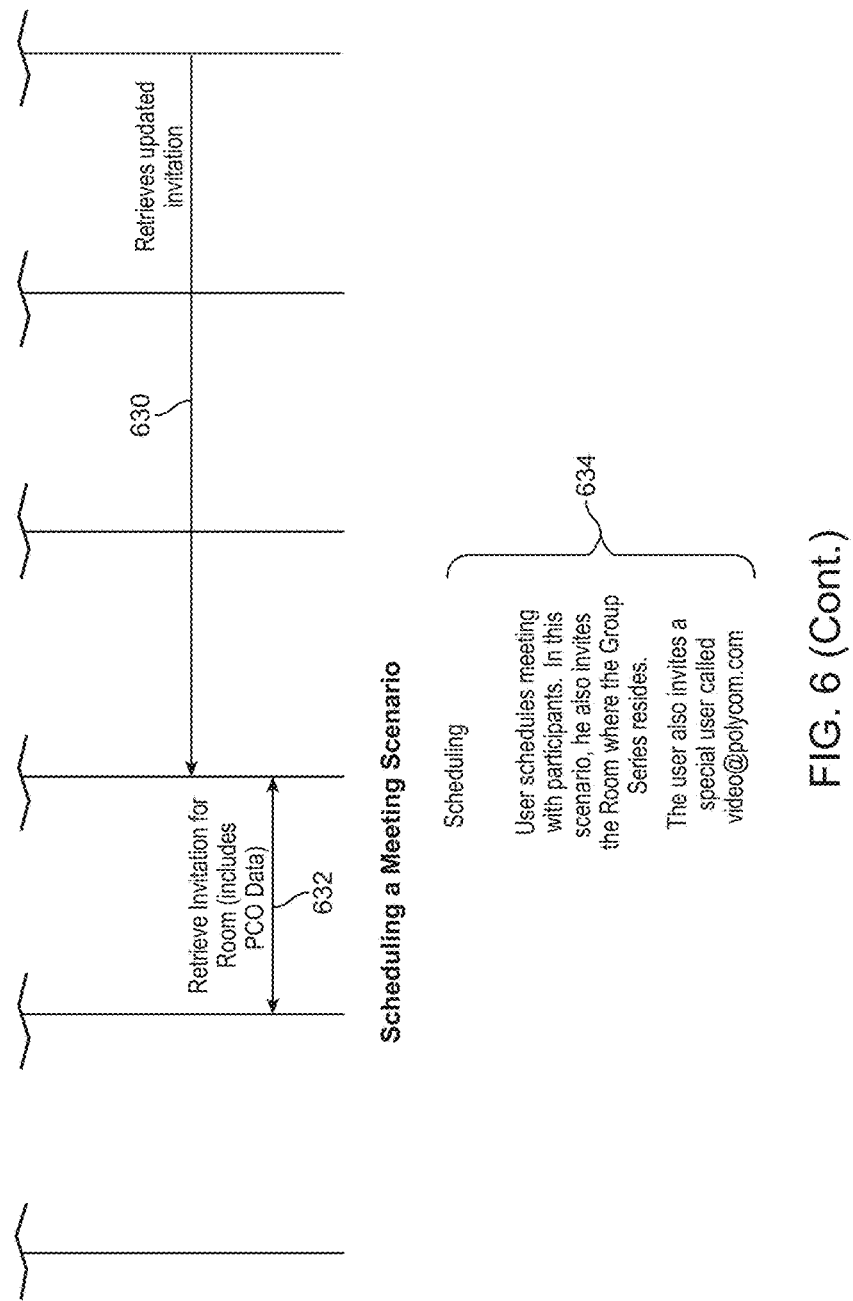

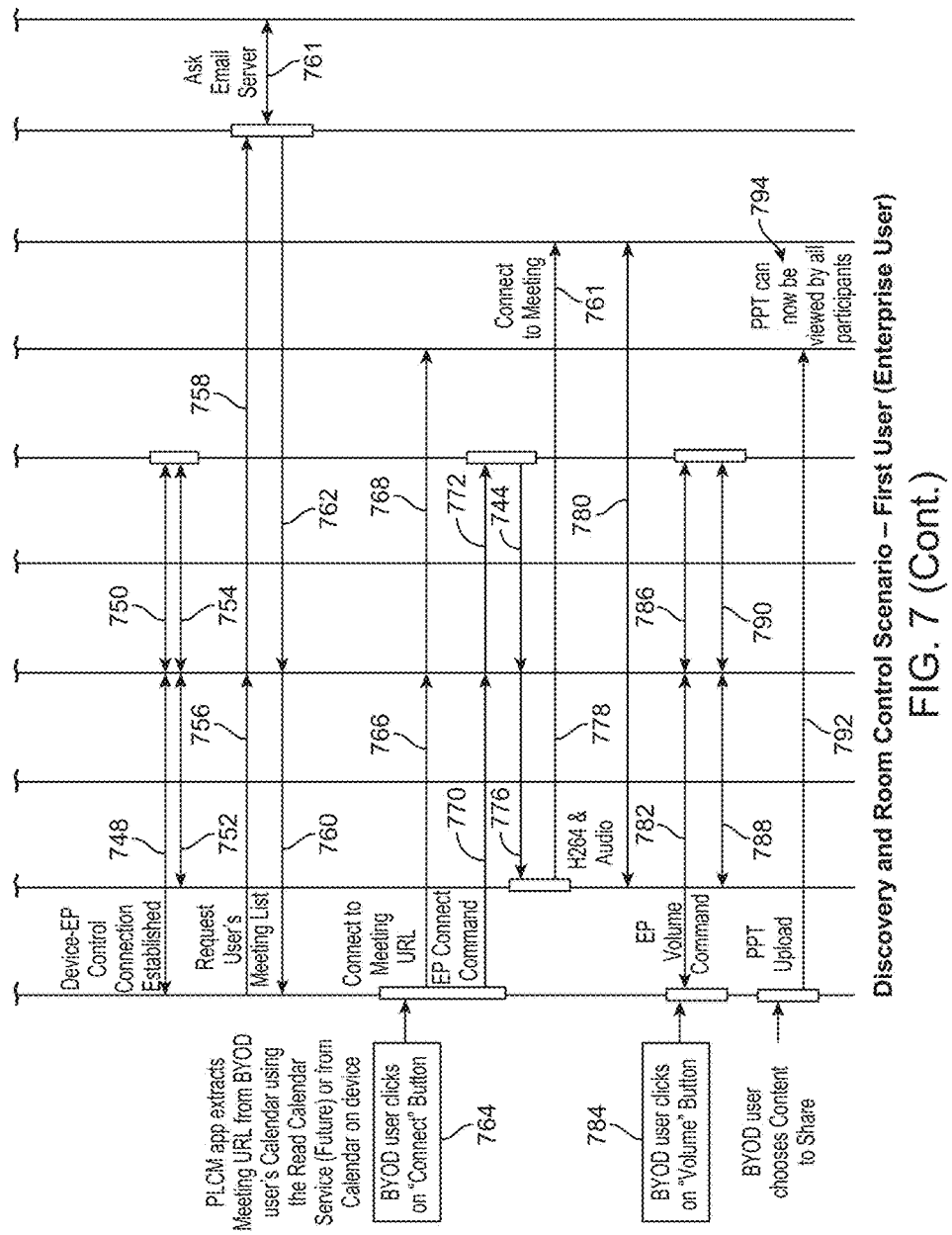

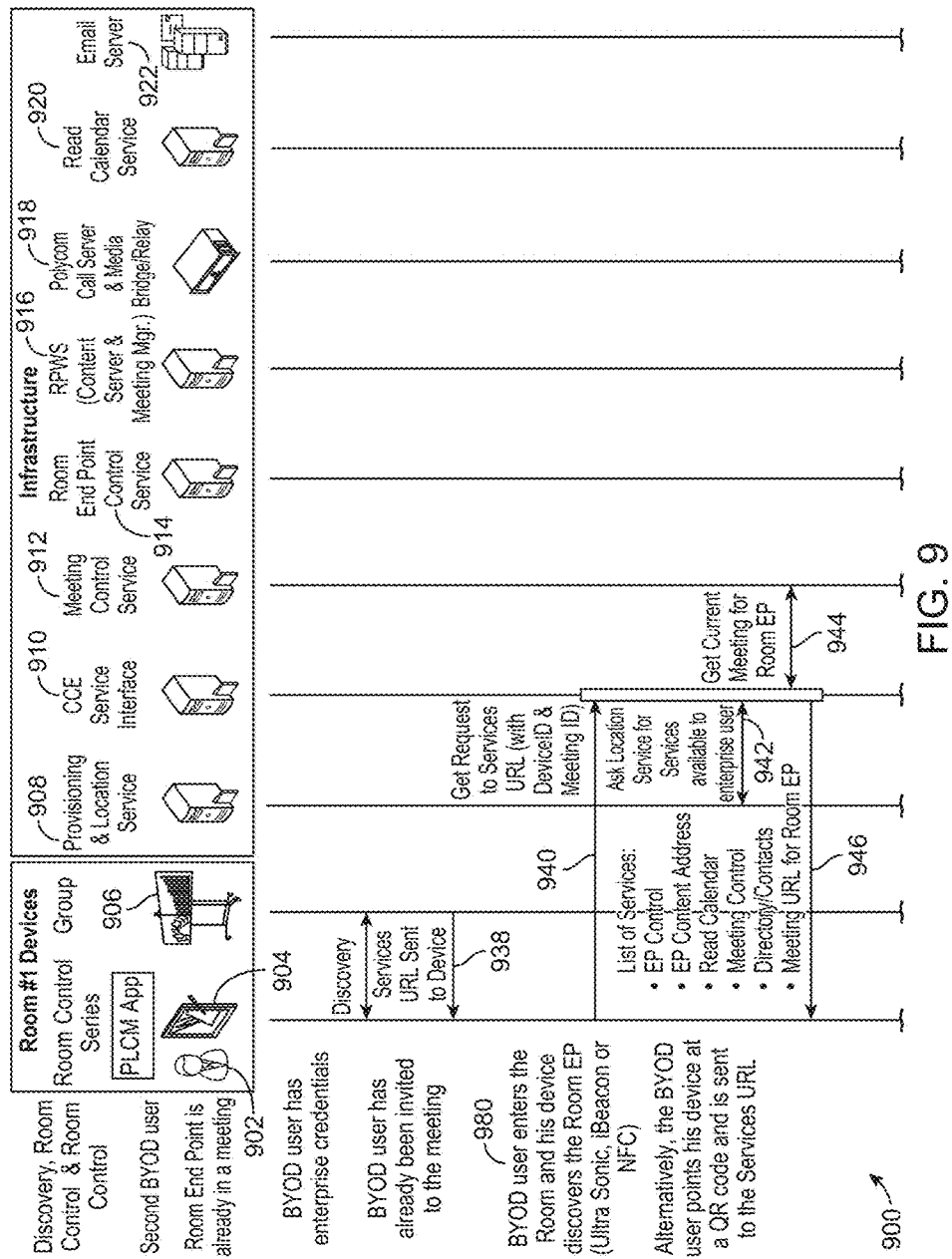

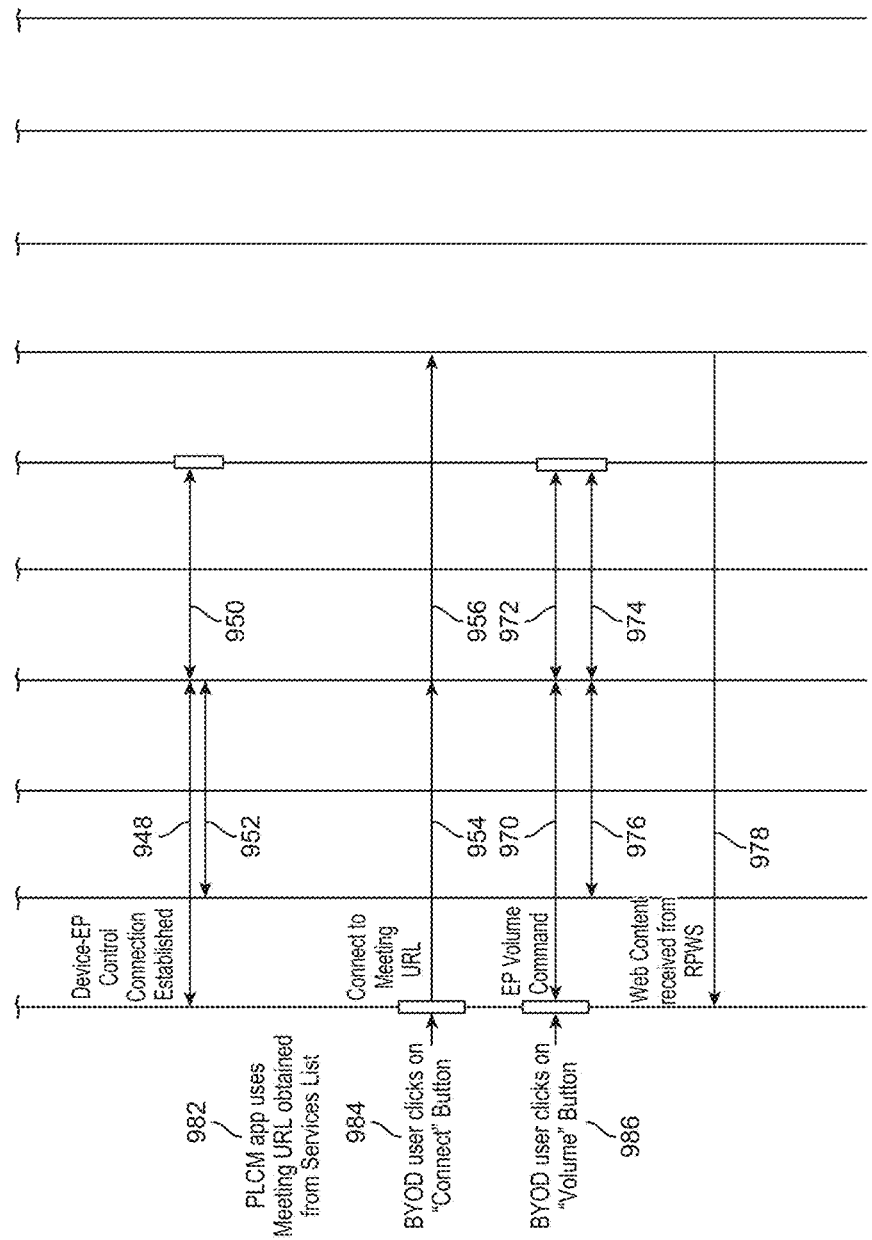

SYSTEM AND METHOD FOR COLLABORATIVE TELEPRESENCE AMONGST NON-HOMOGENEOUS ENDPOINTS

CROSS-REFERENCE TO RELATED APPLICATION

This application claims priority to U.S. Non-Provisional Application No. 62/237,361, filed Oct. 5, 2015, the contents of which are entirely incorporated by reference herein.

FIELD

The present disclosure relates to conferencing in a telepresence environment, and more particularly to the field of telepresence collaboration using disparate types of end-user electronic devices made to differing specifications and/or standards.

BACKGROUND

Telepresence systems exist that allow users in the same and/or different locations to see, hear, and interact with each other in real time. Most people participating in meetings have one or more personal devices (PC, Tablet or Smartphones, for example) with them. These devices can have substantial computing capacity, data storage, and Internet connectivity and can be associated with personal information such as contacts, calendar and documents (stored locally or remotely) that are relevant to a meeting topic. Using and sharing this information during a meeting is usually difficult. Existing telepresence systems do not readily allow users to collaborate with each other using their personal electronic devices (for example, personal computers (PCs), tablets and smart phones) unless these personal electronic devices are substantially uniform, (run using same or similar software, constructed to same or similar specifications). Thus, there is room for improvement in the art.

BRIEF DESCRIPTION OF THE DRAWINGS

Embodiments of the present disclosure will be understood and appreciated more fully from the following detailed description, taken in conjunction with the drawings in which:

FIG. 1 is a table showing example control features that can be available to meeting participants;

FIG. 4B illustrates a possible architecture for a CCE system;

FIG. 9 shows the interaction flow for when a enters a meeting in progress;

DETAILED DESCRIPTION

Figure 2:
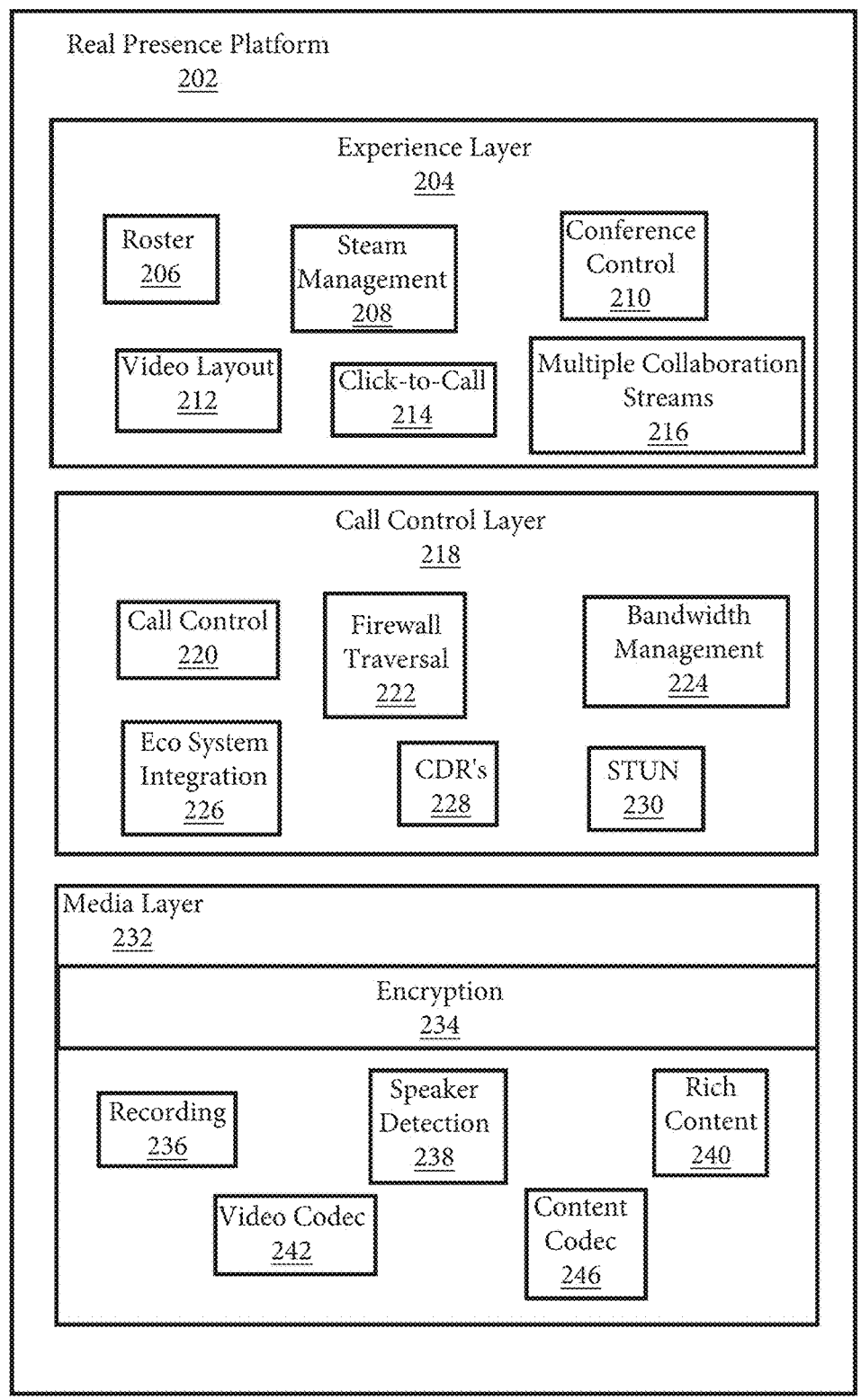
FIG. 2 illustrates an example architecture according to an embodiment of this disclosure.

This disclosure describes functionalities that give people using collaboration devices, solutions and services, an improved telepresence experience when such persons are in a room (or similar location) which contains a telepresence device as described below. These advanced functionalities enable users to combine the processing power and user interface of their personal devices (like smartphones, tablets and laptop computers, for example) together with telepresence room endpoints and displays. Systems and methods within this disclosure enable people to collaborate with others using the best, though differing, devices available for audio, content and video communications. These collaboration sessions can be called 'bring your own device' (BYOD) situations/scenarios or telepresence collaboration sessions involving differing (non-homogenous) types and kinds of personal devices. Furthermore, systems and methods within this disclosure provide users a consistent experience whether they join a collaboration session from a group meeting space or from a personal space. At least one embodiment within this disclosure is a system for providing collaboration sessions for users which combine a room system for audio (and optionally video/content), and content and conference control functions, on their personal devices.

At least one embodiment within this disclosure is an infrastructure service configured to provide the above described user experiences. Such a service can be termed a 'Collaboration Control Experience (CCE) service.' Various aspects of CCEs are described below. At least one embodiment within this disclosure is a method and system which enable users who have differing endpoints (EP) to have BYOD-functionality for both existing EP and those yet to come, without the need to deploy new features. Because personal endpoints are often associated with a specific user, not all of the features of a BYOD/CCE solution are necessarily required for all users, an endpoint might already be 'registered' to a user and configured with to the user's particular needs. Some possible functionalities of a BYOD/CCE solution include, but are not limited to, simple discovery of personal EP and pairing of a personal EP with a telepresence device.

Within this disclosure, a BYOD/CCE experience can include using protocols for sending content from a BYOD to a display and/or conference. A BYOD/CCE experience can additionally or alternatively include receiving content from a conference on a BYOD.

Also within this disclosure, a BYOD/CCE experience can include the following aspects: the use of the people plus content internet protocol (PPCIP) for sharing content, from a personal device to a display and/or to a conference; smart-pairing for remote control and content sent via software applications, such as Polycom RealPresence Mobile (RPM)/Polycom RealPresence Desktop (RPD); one or more CSS interfaces for sending and receiving content; and conference control functions accessible through web-browser plug-ins, (the RealPresence Web Suite solution, for example). CCE services described herein can provide a routable connection from a Wi-Fi network to the video system network.

As indicated above, various aspects of this disclosure are directed toward enhancing a meeting participant's experience. For example, a user can be enabled to enter a meeting room and receive a meeting reminder on her smartphone. She can then request to join the meeting (or accept and a request to join the meeting) by pressing a button on her smartphone or speaking a command. Thereafter she can be joined to the meeting quickly and automatically, and thereafter be registered with collaboration tools described in this disclosure. As another example of an enhanced user experience enabled within this disclosure, a user could walk in late to a meeting room, open a video presentation from a data sharing application on her smartphone, and select to share the presentation, and the presentation would quickly thereafter be displayed in high-definition on a display in room. The user is enabled to then select a play option on (or via) her phone, which would cause to the video to begin playing, visible to all the meeting attendees. Thus, aspects of this disclosure are concerned with minimizing the number of steps required for a user to join a meeting using a personal device and to share information from the personal device with others in the meeting.

Various devices can be supported by systems and methods within this disclosure. Such devices include, but are not limited to, Group Series, Trio, Debut, Centro, VVX devices and Soundstructure devices. Personal devices which can be supported by systems and methods within this disclosure include, but are not limited to, PCs running Windows 8 and newer versions, and those running MacOS Yosemite and newer versions, tablets running iOS and Android, smartphones running iOS and Android, Windows Surface Pro3 devices, Windows 10 based smartphones and amazon tablet devices.

In at least one embodiment within this disclosure, personal devices are able to access BYOD/CCE solutions without the need for installing special applications on the personal devices. In at least one embodiment, calendar systems and information can be shared and utilized, without the need for calendaring-system plugins. In at least one embodiment, a cloud service that facilitates optimal performance for the widest range of scenarios is provided, including the B2B solution where a user is visiting a customer site where the user has limited or no connectivity to a LAN or WLAN. A 'private cloud' option for endpoint users is also possible within this disclosure. Such aspects and functionalities can create a user experience that has the consistency and immediacy of 'Presence'/instant messaging, or a phone call extended to a content and video session.

There are various ways for a personal device to 'discover' a CCE device within this disclosure. Systems and methods providing easy, convenient, secure and 'foolproof' ways for such communication devices to be discovered by PCs, Tablets and Smartphones using 'native' OS capabilities or applications are described. Such discovery options include, but are not limited to, Ultrasonic (SmartPairing), Bluetooth, a quick response (QR) code reader (to read a QR code located in a meeting room or on a door to the meeting), a meeting room identifier posted in the room, NFC and iBeacon.

Once a user device has discovered a CCE-device and associated devices, the user's device will pair with the CCE-device and associated devices as appropriate. In most situations, the pairing will occur automatically, requiring little or no user interaction, (likely just a confirmation that Pairing with a device is desired). The Pairing process can be achieved by one or more methods. Such methods include, but are not limited to, using a Telnet CLI interface on HDX and Group Series; using the PPCIP protocol for Content Send (supported on HDX and Group Series); using the web interface of a personal device; using device application programming interfaces (API); using the CCE service hosted within the customer network; and/or using the CCE service hosted in the cloud.

In at least on embodiment, once the personal device has paired with the room endpoint, the CCE system will provide the user of the personal device with several options, depending on the situation that exists at the time of the pairing. For example, if the meeting room endpoint (CCE device) is not connected to a call, an indication of user-selectable ongoing or upcoming meetings will be rendered. Meetings can be displayed in a pop up form or other suitable manner. In at least one embodiment, only meetings scheduled to occur within a predetermined time are displayed, (for example, in the next fifteen minutes, the next thirty minutes or other suitable time). The personal device user can be offered a 'click to join' the meeting option, which once selected, can enable the user to use the room endpoint (CCE device) for Audio and/or video communications. Content (information) can be directed to the users personal devices as appropriate. A personal endpoint device can also be given the ability to control certain aspects of the meeting which she has joined. In at least one embodiment, the CCE system can access calendars on personal devices and used for a 'click to join' feature.

In at least one embodiment, if no meeting appears on the personal device calendar, the CCE system will give the personal endpoint user an option to share content on the room display or and/or dial in from a dial-pad and/or contact a directory. In at least one embodiment, all contact directories available on the paired personal device can be available for the device user to access and/or select contacts. In at least one embodiment, a user shall be displayed as an 'In Room Participant' in the Enhanced Participant List as displayed to other participants in the call on their control device.

If the meeting room endpoint (the CCE device) is connected to a call, in at least one embodiment, a message can be displayed on the paired personal device containing a selectable option to join a meeting. If the user joins a meeting, her device can receive content pertaining to the meeting and/or be given the ability to control aspects of the meeting. In at least one embodiment, such a user can be required to enter a security code and/or an authentication code, in order to avoid eavesdropping and/or unintentional joining of a meeting by a personal device user. As in the situation where the meeting room endpoint is not currently connected to a call, the name or identity of the paired user can be displayed as an "In Room" Participant in a participant list her personal device and/or on the control devices (such as personal devices or touch control devices) of other meeting participants.

In at least one embodiment, in event a personal device is paired with the room system (meeting room endpoint), various controls can be made available to a personal endpoint user. The nature and extent of control options can depend on the role of endpoint user within a meeting. There can be at least three types of participants, including a chairperson, an attendee and a guest. The chairperson can be the person who initiated the meeting and/or the main presenter at the meeting. An attendee can be a person whom was requested to join the meeting, whereas a guest can be a person who has requested to join the meeting without having been previously invited (or a person who is not a member of the organization to which the chairperson belongs). FIG. 1 is a table showing the control features that can be available to meeting participants, depending on their roles. The roles and their corresponding controls can be configurable depending on the needs of the organization controlling the room endpoint. With regard to FIG. 1, Soft Mute 1 is a mute initiated by the meeting Chairperson that can be over-ridden by the individual user from their control portal or device. Conversely, Hard Mute 2 is a mute that cannot be overridden from the device/user control interface.

As intimated above, a participant list can include a list of participants in a room, that is, users which have joined a meeting from a single endpoint. A participant list can include an interface through which attendees can change the list of in-room participants, by adding and/or removing participants. In at least one embodiment, an 'in room' participant list can be based on the credentials obtained by the personal device that has registered in the room. The 'in room' participant list can be based on a user's detection and/or login using, Bluetooth/NFC/QR/Wi-Fi Direct pairing. Such a list can also be based on a meeting participant's directly entering his or her name (or other suitable identifier) into the list. Enabling such direct entry can be facilitated by displaying a list of the people invited to the meeting. In at least one embodiment, the list can be wholly or partially 'scraped' from the meeting invitation. A participant list can be based on accessing user information when users sign in using authorization methods known in the art. In at least one embodiment a participant list can be generated by matching an image of a face detected or recognized by a participant device against a directory (corporate or otherwise) containing user images previously provided. In at least one embodiment, the CCE system can be configured to detect when people leave the meeting room and remove them from the participant list. In at least one embodiment, the time that attendees join and leave a meeting can be stored for subsequent retrieval. It will be understood that the above-described methods of generating participant lists are neither mutually exclusive nor collectively exhaustive.

As intimated above, one of the benefits provided by various embodiments within this disclosure is that sharing of content by meeting participants is simplified and/or enhanced, thus facilitating collaboration by the participants. Thus, those participating in a 'bring your own device' BYOD experience are enabled to view, send and annotate content from their personal devices. In at least one embodiment, such content can be sent to displays in the meeting room and/or sent in a form that allows remote participants to access the content. Depending on the implementation, the following types of content can be shared by participants: desktop/screen content; application content (for example, a PowerPoint presentation); content stored remotely, (such as in Cloud Storage; audio clips; and video files. In at least one embodiment, the owner of a personal device participating in a meeting can annotate content shared by other participants. In at least one embodiment, multiple participants can be enabled to annotate content simultaneously.

In at least one embodiment, a meeting participant can be able to control the layout of video and content feeds on the displays in a meeting room. For example, a participant can be able to select which of the displays in the room are used to display the video feed, and which of the displays are used to display on or more content feed(s). The CCE system can be configured to select a default layout. In at least one embodiment, a default based on best practices in a given field and/or layout use history associated with the meeting room. In at least one embodiment, a move and point style interface can be provided to participants so that they can modify layouts. In at least one embodiment, layouts used during a session can be saved in a database for subsequent retrieval. A saved layout can be associated with the room that used the layout.

Embodiments within this disclosure can be implemented using one or more architectures described herein. This architecture can include a Real Presence Platform (RPP). The RPP can have at least three layers, an Experience Layer, a Call Control Layer and a Media Layer. The Call Control Layer and the Media Layer can be implemented in ways known in the art. Aspects of the Experience Layer and its interaction with the other two layers, include ensuring that an endpoint device will reliably detect a sharing device (such as a CCE device) that is usable by and compatible with the endpoint device. In at least one embodiment, simple manual pairing can be enabled, as a backup for when automatic detection/pairing/sign-in options are not available or operative for whatever reason. Such manual pairing option can include use when the automatic methods are not available. This could use near field communication (NFC), iBeacon, QR codes or an URL/room identifier displayed within a meeting room.

FIG. 2 illustrates an example Real Presence Platform 202. In this example, Real Presence Platform 202 includes an Experience Layer 204, a Call Control Layer 218 and a Media Layer 232. Experience Layer 204 includes Roster 206; Steam Management 208; Conference Control 210; Video Layout 212; Click-to-Call 214; and Multiple Collaboration Streams 216. Call Control Layer includes Call Control 220; Firewall Traversal 222; Bandwidth Management 224; Eco System Integration 226; CDR's 228; and STUN 230. Media Layer 232 includes Recording 236; Speaker Detection 238; Rich Content 240; Video Codec 242; Content Codec 242

In at least one embodiment, a hosting server (a Public CCE server) is provided where meeting room device information is registered and stored. Each room/device can be assigned a unique identifier. When a room system joins a meeting it can register the meeting with the Public CCE server and be given a meeting identifier. In at least one embodiment, when a user enters a room that has a corresponding identifier stored in the database server, that user's personal device can discover the room identifier, and register to the Public CCE, and provide the room number. The user's device can then be directed to the appropriate content channel(s) and control portal corresponding to the meeting the user has joined.

In at least one embodiment, a shared system can broadcast content and broadcast control server addresses in conjunction with discovery mechanisms, such as, for example, and ultrasonic discovery mechanism or a Bluetooth discovery mechanism. A personal device can thereby establish a connection to the content and control servers to deliver the appropriate functionality to other users, depending on their login credentials/privileges. A possible architecture for a shared system is illustrated in the connectivity diagram shown in FIG. 3.

Figure 3:
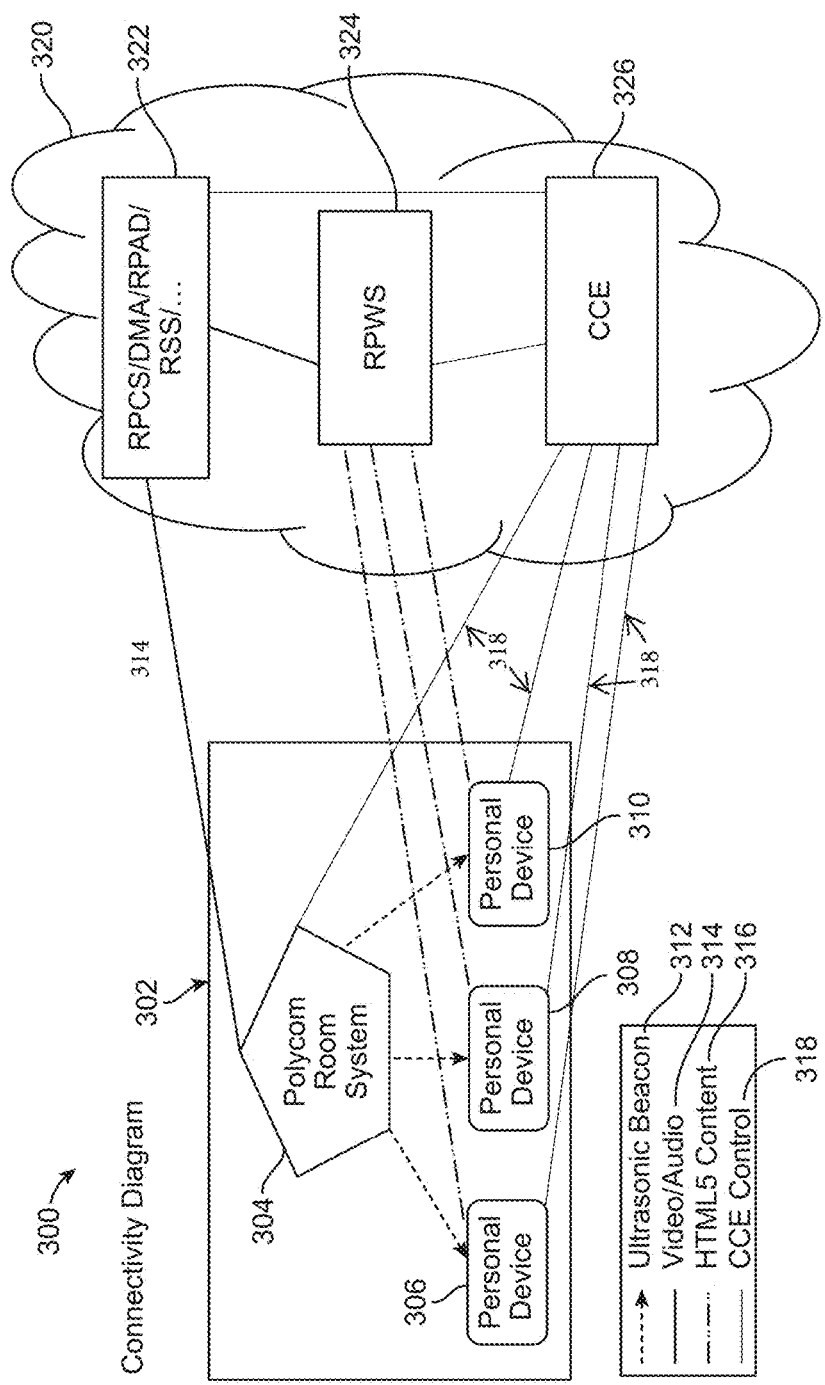
FIG. 3 illustrates an example architecture for a shared system.

FIG. 3 illustrate exemplary architecture 300 of a solution to support the bring-your-own-device functionalities in accordance with one embodiment. One exemplary implementation of the solution would involve Polycom hosting a server (Call it Public Collaboration Control Experience server (Public CCE)) on the public Internet that rooms and their devices could register to. Each room/device would receive a unique identifier. Referring to FIG. 3, architecture 300 may include group 302, including Polycom Room System 304 and one or more personal devices 306, 308 and 310, and group 320, including Real Presence™ Collaboration Server/Digital Media Adapter/Real Presence™ Access Director/Really Simple Syndication system(s) (RPCS/DMA/RPAD/RSS) 322, Real Presence™ Web Suite (RPWS) 324 and Control Experience Server (CCE) 326. Note that group 302 may reside inside a conference room, while group 320 may serve as infrastructure hosted on the Internet.

Polycom Room System 304 may broadcast the content and control server addresses as part of an Ultrasonic beacon mechanism, as illustrated by lines 312. CCE 326 may establish communications to control RPWS 324 and RPCS/DMA/RPAD/RSS 322, as shown by lines 318. CCE 326 may also include CCE control channel(s) with Polycom Room System 304 and personal devices 306-310, as demonstrated by lines 318. Further, RPCS/DMA/RPAD/RSS 322 may transfer viode/audio signals with Polycom Room System 304, as shown by line 314, and RPWS 324 may communicate HTML5 content with personal devices 306-310, as shown by lines 316. Polycom Room System 304 may "register" with CCE 326 and each receive a unique identifier. When a room system joins a meeting, it would register the meeting with CCE 326 and be given a meeting identifier. When a user enters a room that is in the database, their personal devices 306-310 would discover the room identifier and "register" to CCE 326 and provide the room number. CCE 326 would then be directed to the appropriate content channel(s) and control portal for the meeting.

Figure 4A:
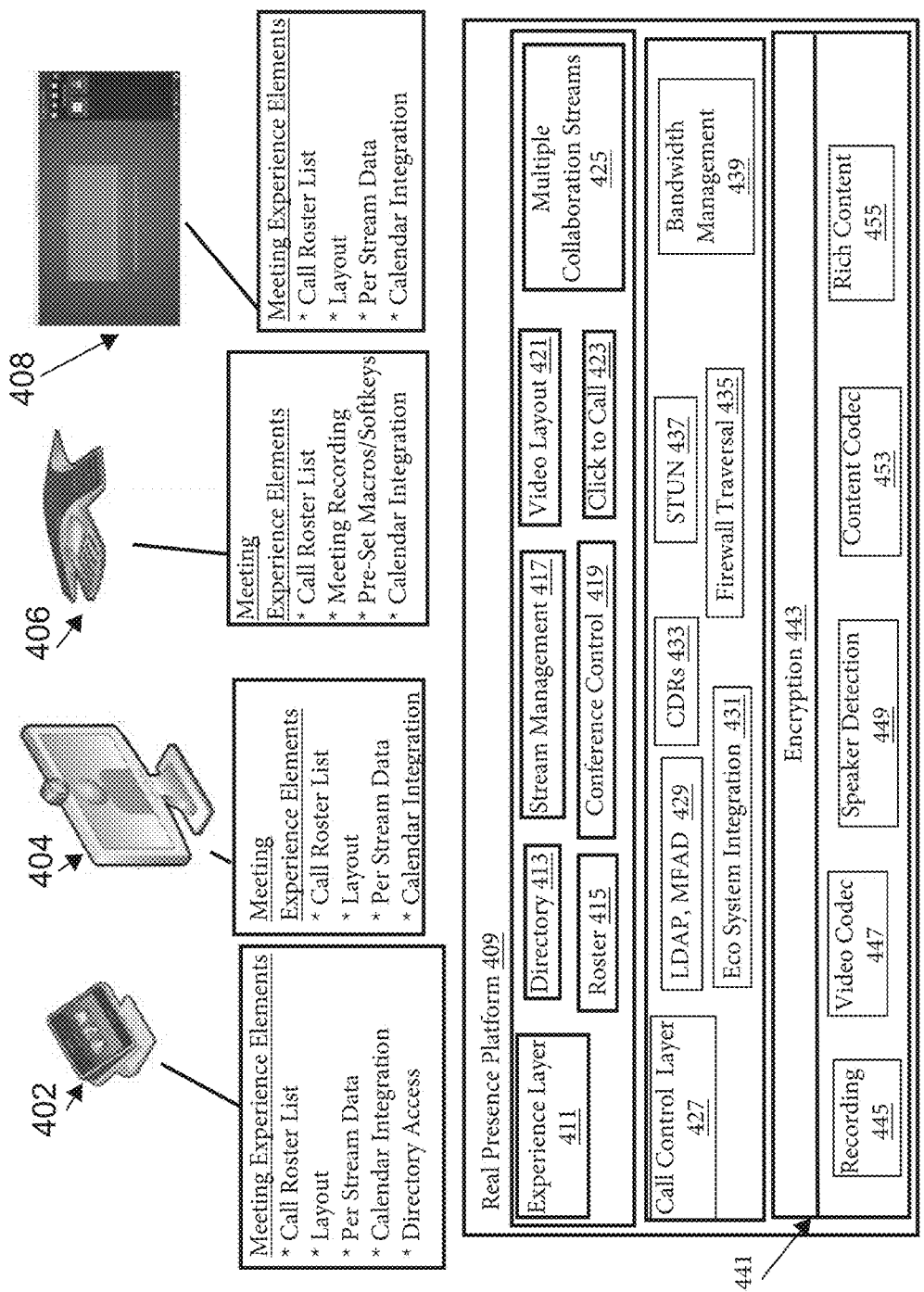
FIG. 4A illustrates aspects of the experience layer discussed shown in FIG. 2.

FIG. 4A illustrates aspects of an example of the Real Presence Platform discussed with reference to FIG. 2 above. As shown, a control device 402 can have call roster, layout, data stream selection, calendar integration and directory access functionality. A meeting room display 404 can display call roster lists, layout information, streamed data, and calendar integration information. A base CCE device 406 and a personal device 408 can share some or all functionalities of the control device 402. As shown, CCE device 406 can have call roster list functionalities, as well as meeting recording, pre-setting of macros and soft keys as well as calendar integration.

As shown in FIG. 4A, the Real Presence Platform 409, includes and Experience Layer 411, a Call Control Layer 427, and Media Layer 441. Experience Layer 411 includes Experience Layer; Directory 413; Roster 415; Stream Management 417; Conference Control 419; Video Layout 421; Click-to-Call 423; and Multiple Collaboration Streams 425. Call Control Layer 417 includes LDAP, MFAD 429; Eco System Integration 431; CDRs 433; Firewall Traversal 435; STUN 437; and Bandwidth Management 439. Media Layer 441 includes Recording 445; Video Codec 447; Speaker Detection 449; Content Codec 453; and Rich Content 455. As shown, functions and services in media layer 441 may use encryption 443 technology to encrypt their related information.

In at least one embodiment of this disclosure, room systems can implement an ultrasonic beacon containing information needed for a personal device to be able to detect and pair with a room system, and interact with a content and conference control infrastructure. Information required for proper pairing can include, an IP Address of the device, a room or system ID for the room in which the device is located, a URL for the CCE server, a Meeting Identifier in event the room is joined to a meeting, and a URL for the RPWS server. In at least one embodiment, a room system can enable registration with a CCE server when the room system powers on. Registration of a room system and/or a personal endpoint can include providing additional information, including, but not limited to the type of device being registered, the Audio and/or Video capabilities of the room in which the registering device is location, as well as a room identifier. In at least one embodiment, a room system shall support the ability to be controlled from multiple paired personal devices simultaneously and/or alternatively.

In at least one embodiment, the CCE server can be configured to act as a relay for control from a personal device to a room system, thus obviating the need for direct connections from a Wi-Fi network to video/audio devices with a meeting room. In at least one embodiment, a CCE service can be implemented as part of a preexisting server element, such as Polycom RealPresence Desktop (RPRM) or MEA. In at least one embodiment, a CCE service can be provided in a public cloud and/or a private cloud or an on-premise form. In at least one embodiment, a CCE server will act as a central repository for room and meeting related activities, including, but not limited to, maintaining a registry or rooms together with their capabilities, and tracking a rich participant list of all people/endpoints participating in the meeting as well maintaining a list of people presently in a meeting room. A CCE server can also provide conference control capabilities and can implement appropriate access control and roles based functionality limitations of the devices involved in a meeting.

In addition to the functionalities discussed above, a CCE environment can enable individual devices to share/communicate only with selected participants, rather than all meeting participants without the need to use additional applications running on a personal device. In at least one embodiment, Persistent Collaboration spaces can be defined/created to preserve collaboration settings between sessions for subsequent retrieval and use. In at least one embodiment, a CCE can have the ability to take a snapshot of the currently shared content, layouts, etc. for all collaborators at the end of a meeting and restore these settings upon entry into a persistent collaboration space. In at least one embodiment, snap shot ability can be restricted to a meeting's chairperson.

FIG. 4B illustrates a possible architecture for a CCE system within this disclosure. RPRM 420 can include a provisioning server, a location server and a calendaring server. As shown, RPRM 420 can send and receive management information to and from a personal endpoint 422, a RealPresence websuite (RPWS) 426 and a room display 424. RPWS 426 can in turn also send and receive management information to and from personal endpoint 422, room display 424, AD & DNS solutions 428, and DMA 430. DMA 430 can send and receive management information to and from MCU 430, and send and receive signaling information to and from MCU 430 and room display 424. Media can be sent and received by MCU 430 to and from room display 424.

As intimated above, meeting rooms can have many different devices in them. Such devices include, but are not limited to sensors, endpoints, and accessories such as a content pod. These devices can be controlled in accordance with various aspects of this disclosure. Such devices can also be mapped to a location (room) and a user of a device will be given options of other devices in the room to pair with and/or interact with. In at least one embodiment, a BYOD can detect multiple locators when a BYOD application starts to run. The BYOD can be configured to receive and store a list of associated locations. In at least one embodiment, a beacon can serve as a locator device. A beacon can be configured to transmit three data elements: a UUID (128 bits), a major key (16 bits), and a minor key (16 bits). The UUID can be set according to a default value, enabling all beacons transmitting the default UUID to be detected. The major key and the minor key can be sent in hexadecimal format.

Figure 5:
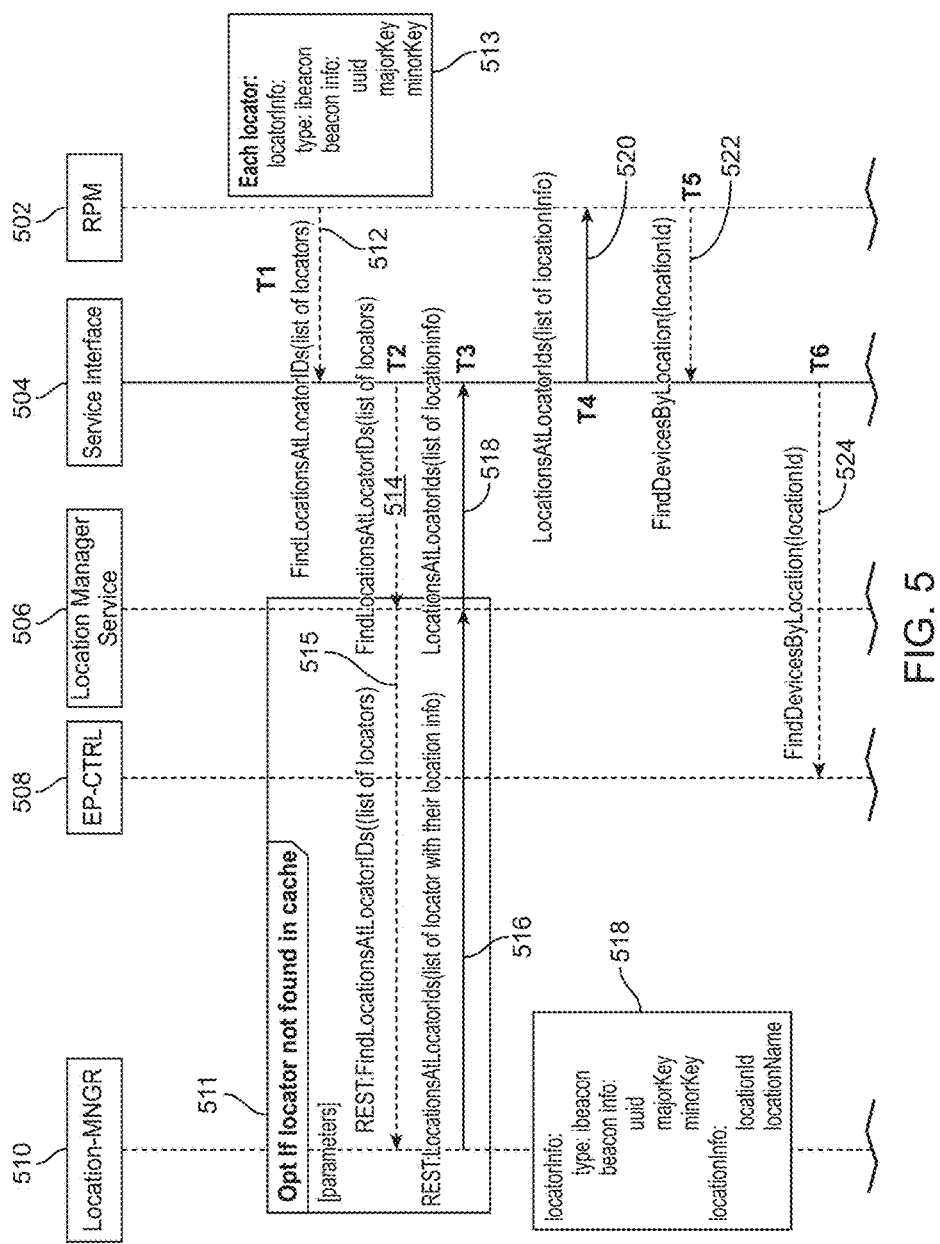
FIG. 5 is a flow diagram of an example location management method.
Figure 5:
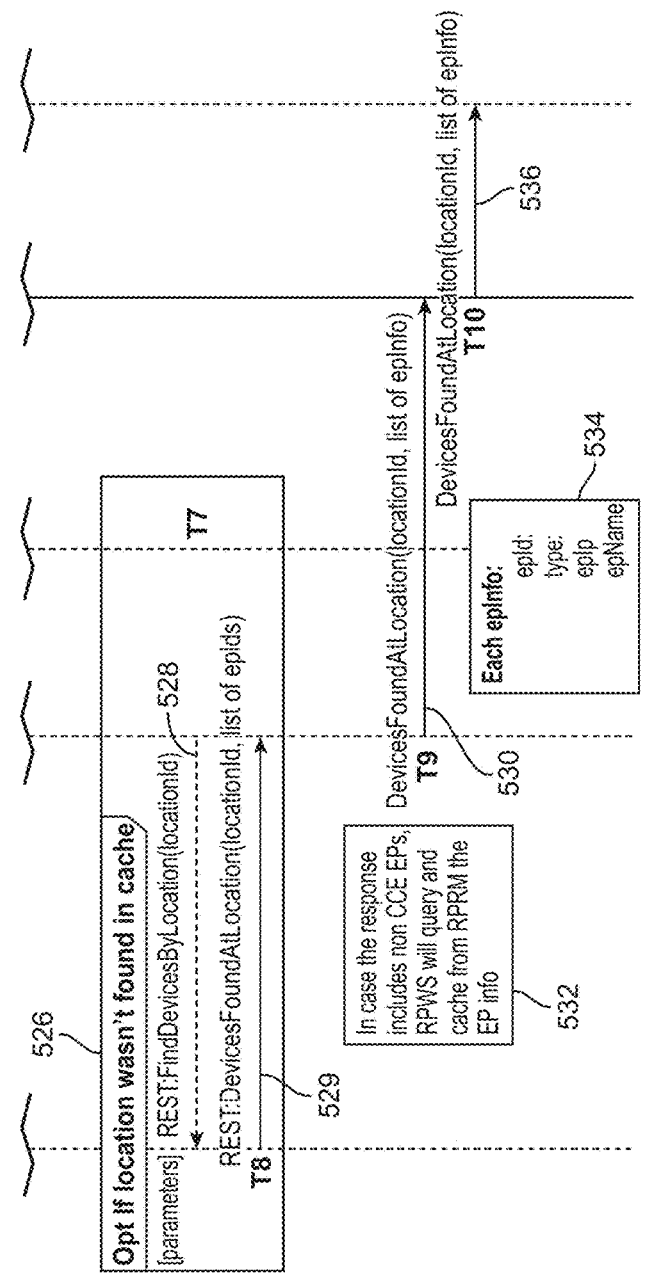

FIG. 5 is a flow diagram of an example location management method within this disclosure. At T1 (time one) the RPM 502 sends a list of locators to a service interface 504. At T2, the service interface 504 sends a list of locators to a location manager service 506 and to a Location-MNGR 510 if necessary. At T3 the Location-MNGR 510 and/or the location manager service 506 sends a list of locators, along with location information corresponding to the locators, to service interface 504. At T4, service interface 504 sends a list of locators along with location information corresponding to the locators to RPM 502. At T5, RPM 502 sends a request to find devices by their location 522 to service interface 504. At T6, service interface 504 sends a request to find devices by location 524 to EP-CTRL 508. If location information is not found in a cache, at T7 EP-CTRL 508 sends a request to find devices by location 528 to Location-MNGR 510. Thereafter, at T8, Location-MNGR 510 sends information about the devices found by location 529 to EP-CTRL 508. This information can include identifiers corresponding to the found devices and information corresponding to the locations of the found devices. At T9, EP-CTRL 508 relays this information 530 to service interface 504, which then relays the information 536 to RPM 502 at T10.

In at least one embodiment, a Beacon's Major and Minor fields will be set according to an Endpoint ID. The upper 2 bytes of the Endpoint ID can correspond to the Beacon's Major field value, and the lower 2 bytes of the Endpoint ID can correspond to Beacon's Minor field value. In at least one embodiment, BYOD that detects the beacons will query the RPWS Location Service via a service interface using an appropriate function call. In at least one embodiment, a location service can query the RPRM with to find locations corresponding to locator IDs. The RPRM can reply to the query by sending a location id value associated with the locator. The location ID value can be the combination of the beacon's major ID and minor ID. The RPRM can also reply by sending a name of a room in which an endpoint having a requested endpoint (EP) ID is found. In at least one embodiment, if there is no room associated with associated with the located EP, the room name will be set to the EP name/ID.

In at least one embodiment, an RPWS will send a list of location information (such as location id and location name) back to a BYOD. In at least one embodiment, a Location Service will not query the RPRM, but will instead reply to the BYOD with the following information: a location ID value associated with the locator, (the location ID value can be a combination of the beacon's major and minor IDs); and a room. A BYOD that receives information pertaining to the locations it queried can display a list of all EP and their corresponding room names, and thereafter a user can select an EP from the list. In at least one embodiment, if the list includes more than one location, a user can select a location from list after a first query and the BYOD will thereafter query only with regard to the selected location. Once the BYOD receives the list of associated devices, a user can select a device from that list.

As noted above, a collaborative meeting within this disclosure can have several phases or sections, including, but not limited to: 1) Pre-Meeting, 2) Discovery and Pairing, 3) Control of the Room Equipment from the user device, 4) Content Collaboration from the user's personal device, 5) Participant List (Roster) and In-Meeting Controls from the user's device and 6) After Meeting.

Table 2.1, shown below, sets forth the functionalities and related requirements for the Pre-Meeting Stage.

TABLE 2.1

Functional Requirements for Pre-Meeting Stage

| ID | Requirement |
|---|---|
| PM.1 | User shall be able to schedule collaboration meetings using standard calendar/scheduling tools without the need for any calendar 'plug in' |
| PM.2 | The CCE should support and scheduling system (non-Outlook) via standard interfaces like CalDav. The CCE should be able to broker/proxy an existing calendar event and convey it to any type of Endpoint click-to-call operation. |

TABLE 2.1-continued

Functional Requirements for Pre-Meeting Stage

| ID | Requirement |
|---|---|
| PM.3 | As many collaboration will require content. The End-users need have the option to upload their meeting content to the cloud before the meeting. In addition CSSv2 will handle notifications to the other users when new content is added. Permissions: read only for others, allow downloading, auto delete at end of the meeting |
| PM.4 | Users must authenticate to the service as pre-defined users (AD driven) or guest access (if enabled). |

Table 2.2, shown below, sets forth the functionalities and related requirements during the Discovery and Pairing Stage.

TABLE 2.2

Functional Requirements for Discovery & Pairing

| ID | Requirement | Phase |
|---|---|---|
| DP.1 | The solution shall support the following methods for the Personal Device to 'discover' the endpoint<br>Ultrasonic Beacon-using similar mechanism to SmartPairing<br>NFC tag posted somewhere in the room<br>QR Code posted somewhere in the room<br>Apple iBeacon<br>Bluetooth<br>Manual-using URL or code displayed on the room system display<br>Manual-using URL or code printed in the room. | |
| DP.2 | The solution shall support the following personal devices<br>Windows PCs<br>MacOS PCs<br>Tablets running iOS<br>Tablets running Android<br>Smartphone running iOS<br>Smartphones running Android<br>Surface Pro3 and newer devices<br>Windows Mobile devices | |
| DP.3 | If a client is needed for the discovery and pairing it shall be distributed using existing Polycom soft clients<br>RPM for iOS and Android phones/tablets<br>RPD for Windows and Mac PCs<br>RP WebSuite/CloudAxis client for IE, Chrome, Safar, Firefox browsers on PCs, Smartphones and Tablets | |
| DP.4 | The solution shall support the following pairing connections:<br>Direct Pairing: IP connectivity for situations where the endpoint is directly routable from the personal device. At a minimum the existing SmartPairing capability offered by RPD/RPM shall be supported in this mode.<br>Private Relay Pairing: Utilizing a service that is offered as an extension of a component of the existing RealPresence Platform. This service shall not require a new server or VM instance to deploy.<br>Public Relay Pairing: A public service hosted and managed by Polycom. | |
| DP.5 | The discovery and pairing process shall involve the minimum amount of end user intervention. | |
| DP.6 | The discovery and pairing process shall support the following types of users<br>Enterprise user that is registered with the solution using an application/client<br>Enterprise User who is not registered with the solution<br>Guest/Visitor-user that does not have a registration on the solution | |
| DP.7 | The solution shall support the following methods for the personal device to un-pair from the group system.<br>The application shall un-pair when the personal device leaves the room (applicable where the ultrasonic beacon has been used for discovery)<br>The application shall un-pair 5 minutes after the meeting time has ended (unless it is still in range of the ultrasonic beacon) | |
| DP.1-DP.7 | The following security mechanisms shall be employed to avoid accidental or malicious misuse of the solution.<br>Authentication of the user shall be preformed based on the username/password that is saved within the client application.<br>Require entry of a PIN code to access the system-by administrator control.<br>Option to 'remember' the PIN code shall be offered. | |

Table 2.3, shown below, sets forth the functionalities and related requirements during the Discovery and Pairing Stage.

TABLE 2.3

Functional Requirements for Control of the Room Equipment from User Device

| ID | Requirement |
|---|---|
| RC.1 | The following roles for room control shall be supported.<br>Chairperson<br>Attendee<br>Guest |
| RC.2 | All roles shall be able to perform the following functions when paired ~~directly~~ to the endpoint<br>initiate a call using the group endpoint from a calendar invite using a single operation.<br>Enter a number on the dial pad.<br>Select a person to call from the personal device contact directory<br>Select a person to call from their crporate directory<br>Select a person to call from a call history list |
| RC.3 | If from any reason the meeting can't be connected the system should provide an intelligible error message with the ability for the end-user to find the avenue for support. |
| RC.4 | The user device will be capable of performing the following audio control of the room equipment:<br>Mute<br>Volume Adjust |
| RC.5 | The user device will be capable of performing the following video control of the room equipment (when applicable):<br>Display/Hide Self View<br>Start/Stop Video<br>Control the Camera-direction and zoom<br>Layout of people on room display (existing functionality) |
| RC.6 | The solution must enable the users running the Polycom control application on a BYOD control device to control the layout seen on the Room endpoint. All end-point layout data should be derived from the meeting is created. For example, for a training presentation, that only the presenter may be shown in the layout. For some vertical applications, some layouts may be locked-out so that they can'be used during the meeting. |
| RC.7 | SVC Layout Control: The solution should either lock a pre-defined layout or suggest a default layout for the room endpoint. This approach should also allow definition of SVC streams that are being received so that Left, Center, Right streams are known and can be positioned in layouts accordingly, |
| RC.8 | Knowledge of other co-located devices participating in the conference should be utilized to their upmost ability. The solution should allow for a "user-centric" view of collaboration allowing the cross-use of many endpoints to provide the best experience possible. Functionality could include:<br>additional microphones on user's phones could serve as acoustic bubble microphones<br>iPad, laptop or other screens could augment HDX of GS as content or people screens<br>ringdown of dial out (identity conferencing) ??<br>Knowledge of endpoint location would be able to yield optimizations of more local connectivity to minimize delay and bandwidth. |
| RC.9 | The solution should use location ability of devices such as iPads to know when they are in the room. |
| RC.10 | The solution must enable multiple user devices and room controllers to simultaneously control a piece of room equipment. |

Table 2.4, shown below, sets forth the functionalities and related requirements during the Content Collaboration Stage.

TABLE 2.4

Functional Requirements for Content Collaboration from the User Device

| ID | Requirement |
|---|---|
| CC.1 | The personal device shall be able to send information to the in room display using the following methods<br>Using a VGA or HDMI cable connection to share the monitor using standard PC/Tablet screen mirroring or extension capability<br>Using the PPCIP protocol-send screen or application or DropBox or Whiteboard style annotations. Using WiFi or Ethernet connectivity<br>Using AppleTV, Chromecast, MirrorCast and other commercial screen sharing techniques |

TABLE 2.4-continued

Functional Requirements for Content Collaboration from the User Device

| ID | Requirement |
|---|---|
| CC.2 | The personal device shall be able send content to a multi-party conference using the following methods<br>Using a VGA or HDMI cable connection to share the monitor using standard PC/Tablet screen mirroring or extension capability<br>Using the PPCIP protocol-send screen or application or DropBox or Whiteboard style annotations. Using WiFi or Ethernet connectivity<br>Using CloudAXIS/RP Web Suite content connection<br>Using third-party content sharing tools such as Lync, WebEx, GoToMeeting. The personal application running on the device should be able to auto launch these applications based on information provided in the meeting invitation.<br>Using the CCE Service as a relay-send screen or application or DropBox or Whiteboard style annotations. |
| CC.3 | The personal device shall be able to display content sent by others using the following methods<br>Using the CloudAXIS/RP WebSuite content connection<br>Using third-party content sharing tools such as Lync, WebEx, GoToMeeting. The personal application running on the device should be able to auto launch these applications based on information provided in the meeting invitation. |

Table 2.5, shown below, sets forth the functionalities and related requirements during the In-Meeting Stage.

TABLE 2.5

Functional Requirements for Roster and In-Meeting Controls from the User's Device

| ID | Requirement |
|---|---|
| IM.1 | The personal device shall display a list of the participants on the call-including all endpoints and people in a room with a single endpoint. |
| IM.2 | The Participant List shall be built up using the personal device information of devices and endpoints connected to the meeting. |
| IM.3 | The participant list shall provide a UI that allows people to assign names to endpoints and add/modify identification of in-room meeting participants. |
| IM.4 | "Face-Detection"-Providing a name-tag to every participant during the meeting using face-database. |
| IM.5 | "Face" authentication-by using the face-detection and server database of faces-we can use the EP camera in conjunction with a server database to authenticate to the meeting server. |
| IM.6 | The personal device interface shall support controls based on user role in a meeting-Chairperson, attendee or guest. |
| IM.7 | The User Role shall take into account the user's designation within the meeting invitation and whether they are from the organization or a visitor. |
| IM.8 | The following control functions shall be supported:<br>View Participant List<br>Add/Remove a Participant<br>(Hard) Mute a Participant-status must be indicated on the participant's display<br>(Soft) Mute a Participant-status must be indicated on the participant's display<br>(Hard) Mute all participants excpet self-status must be indicated on the participants display<br>(Soft) Mute all participants excpet self-status must be indicated on the participants display<br>Change Roles of other participants<br>Control Camera of Far End participant<br>View Content<br>Send Content to meeting participants<br>Recording Start/Stop/Pause<br>Chat with all participants<br>Chat with individual participants<br>Chat with sub-set of participants<br>End The Meeting |
| IM.9 | The meeting chair should be able to classify recording with keywords, and providing archiving clues (or credentials) for later retrieval. |

Table 2.6, shown below, sets forth the functionalities and related requirements for the After-Meeting Stage.

TABLE 2.6

Functional Requirements for After-Meeting Stage

| ID | Requirement | Phase |
|---|---|---|
| AM.1 | The solution must enable meeting participants to access to meeting content, the meeting recording and full information about the meeting participants. | P2 |
| AM.2 | The solution must enable the use of Persistant Collaboration spaces (as defined in Lighthouse). These spaces should preserve collaboration settings between sessions. The solution shold have the ability to take a snapshot of the currently shared content, layouts, etc. for all collaborators at the end of a meeting and restore these settings upon entry into a persistant collaboration space. For example, this could be controlled by the chairperson setting a flag in the scheduled meeting to trigger persistence or not. | P2 |
| AM.3 | The solution should use knowledge of participant to allow the processing of recorded session to be "scripted" versus "transcripted". This would allow for a much more capable and streamlined collaboration experience such as emailing snippets of what participants spoke, RSS subscriptions to individuals and programs, etc. The solution should automatically create post-meeting comments thread and action item tracking. | P2 |
| AM.4 | The solution must send all meeting participants a meeting summary with the participant list, information enabling access to recorded meeting content access and other information. | P2 |
| AM.5 | The solution must create a post meeting comment thread and post-meeting action item tracking. | P2 |

Figure 6:
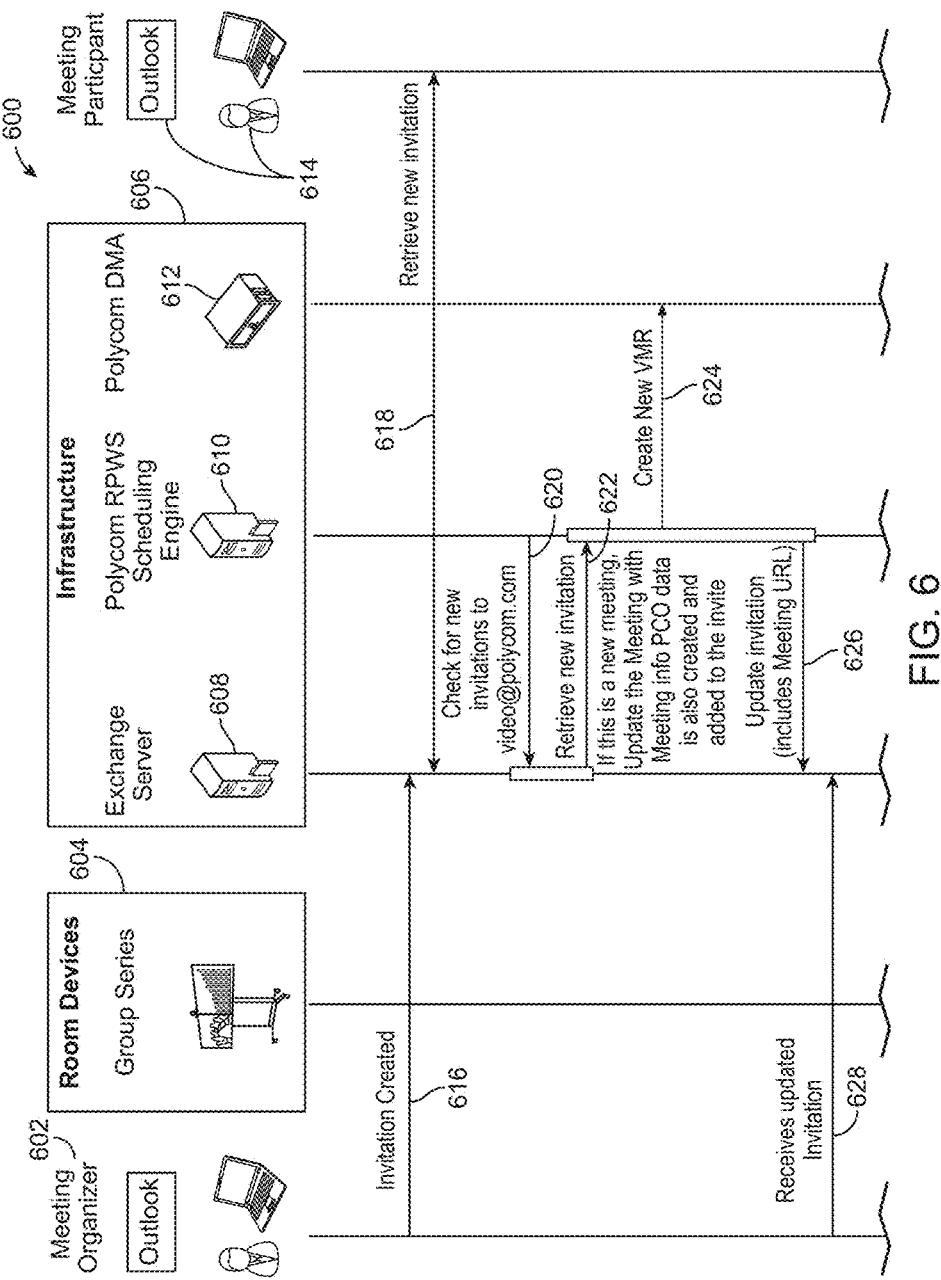
FIG. 6 is a flow diagram of a process of scheduling a meeting.

As noted above, various embodiments within this disclosure pertain to scheduling a collaboration meeting. FIG. 6 is a flow diagram 600 depicting a process of scheduling a meeting. In the example illustrated in FIG. 6, a user schedules a meeting with a number of other people in his company. Another person from the same company is also invited. The meeting invitation can be generated using Outlook, or another suitable solution. The flow diagram 600 begins with the meeting organizer 602 creating an invitation 616 and sending it to an Exchange server 608. A meeting participant 614 retrieves the new invitation 618 from the Exchange server 608. The Polycom RPWS scheduling engine 610 then queries the Exchange server to determine if there are any invitations to a special account, video@polycom.com 620. The Polycom RPWS scheduling engine 610 then retrieves the new invitation 622. If the meeting is a new meeting, the meeting is updated with meeting information, PCO data is created, and the invite is updated. The Polycom RPWS scheduling engine 610 then creates a new VMR by Polycom DMA 612. The Polycom RPWS scheduling engine 610 requests the Exchange server 608 to update the invitation to include a meeting URL 626. The meeting organizer 602 then receives the updated invitation 628 from the Exchange server 608. The meeting participant 614 also retrieves the updated invitation 630 from the Exchange server 608. The Exchange server 608 then retrieves the room including the PCO data 632. Additionally, when the meeting organizer 602 schedules a meeting with a meeting participant 614, he invites the room where the Group Series resides. The meeting organizer also invites the special user: video@polycom.com 634.

The solution illustrated in FIG. 6 can work with a variety of scheduling systems because this solution only requires that meeting URL information be inserted into the meeting invitation and that the application running on the user's device parse this information. There are several mechanisms which can be used including: 1) the Scheduling Solution as shown in FIG. 6; 2) scripting solutions which run on the server to insert meeting URLs; and 3) t h e direct insertion of the URL information when the invitation is created, possible as part of an e-mail signature.

Figure 7:
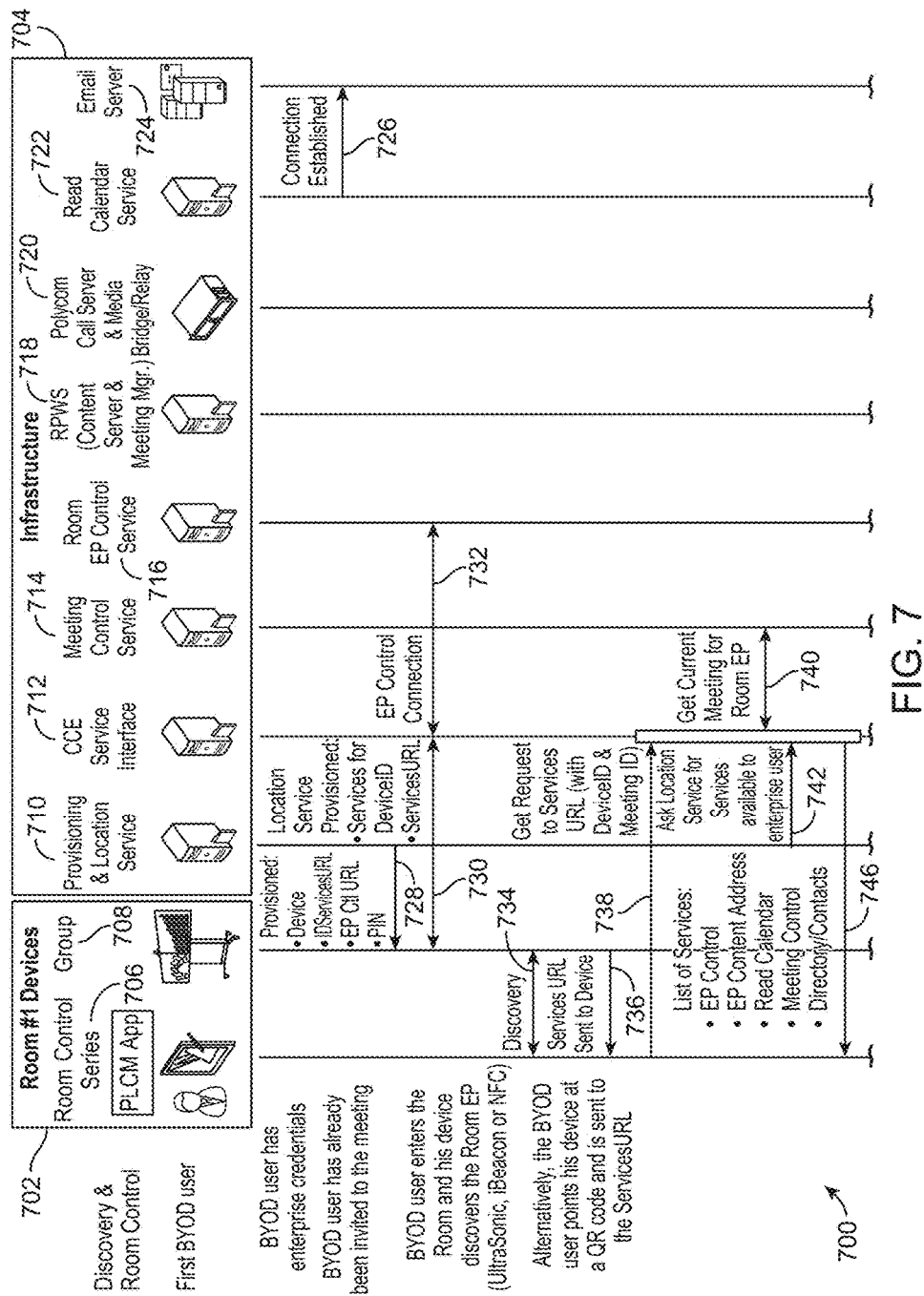
FIG. 7 shows an interaction flow for when a user enters a meeting room with a BYOD.

Various discovery and device pairing solutions and in-meeting solutions are described by this disclosure. For example, a user can enter a collaboration space containing a CCE device such as, for example, a Polycom Group Series system. The Group Series could be running an ultrasonic device discovery mechanism. The user's device can be running a control application. FIG. 7 shows the interaction flow 700 for the first user which enters a room with a BYOD control device and initiates the meeting. In this situation, the user can have enterprise credentials. The interaction flow 700 begins the read calendar service 722 establishing a connection 726 to the email server 724. The provisioning and location service 710 provides the Group Series 708 with provisioning information including the device, ID services URL, EP Ctrl URL and PIN 728. Location service is provisioned including service for DeviceID and Services URL between the CCE service interface 712 and the Group Series 708. Likewise, EP control connection 732 is established from the CCE service interface 712 and the Room EP control service 716. Discover 734 then takes place between the PLCM App 706 and the Group Series 708. The Group Series then provides service URL to the PLCM App 706. The PCLM App 706 the requests services URL with device ID and a meeting ID 738 from the CCE service interface 712. The Provisioning and location service 710 then requests location service for services available to an enterprise user 742 from the CCE service interface 712. The CCE service interface 712 provides a list of services to the PLCM App 706 including EP control, EP content address, read calendar, meeting control, and directory contacts 746.

The CCE service interface 712 then establishes a proxy connection 748, 750 between the room EP control service 716 and the PCLM App 706. Likewise the CCE service interface 712 then establishes a proxy connection 748, 750 between the room EP control service 716 and the Group Series 708. The PLCM App them requires the users meeting list 756 via the CCE service interface 712. The CCE service interface forwards the request 758 to the read calendar service 722, which in turn queries 761 the email server 724. The email server 724 response 762 is then forwarded back to the CCE service interface 712, which then forwards the request 760 back to the PLCM App 706.

The BYOD user then clicks on the "connect" button 764, indicating for the PLCM App 706 to send a connect to meeting urp 766 to the CCE service interface 712, which is forwarded from the CCE service interface 712 to the RPWS content server and meeting manager 718. The PLCM App 706 also sends an EP connect command 770 to the CCE services interface 772 to the room EP control service 716 which forwards the connect command 744 back through the CCE services interface 712 to the Group Series 708. The Group Series 708 connects to the meeting 761 by connecting to the Polycom call server and media bridge/relay 761. H264 video and audio 780 then is transmitted between them for the conference. The BYOD user clicks the "Volume" button 784 on the PLCM App 706. The volume command transmitted 782 to the CCE service interface 712. The volume command is then forwarded 786 to the room EP control service 716. The room EP control service routes the volume command 788, 790 back to the CCE services interface 712, and then to the Group Series 708. The BYOD users then chooses to content to share via the PLCM App 206. A ppt file upload is shared 792 from the PLCM App 206 to the RPWS content server and meeting manager 718, where it may be now be viewed by all participants 794.

Figure 8:
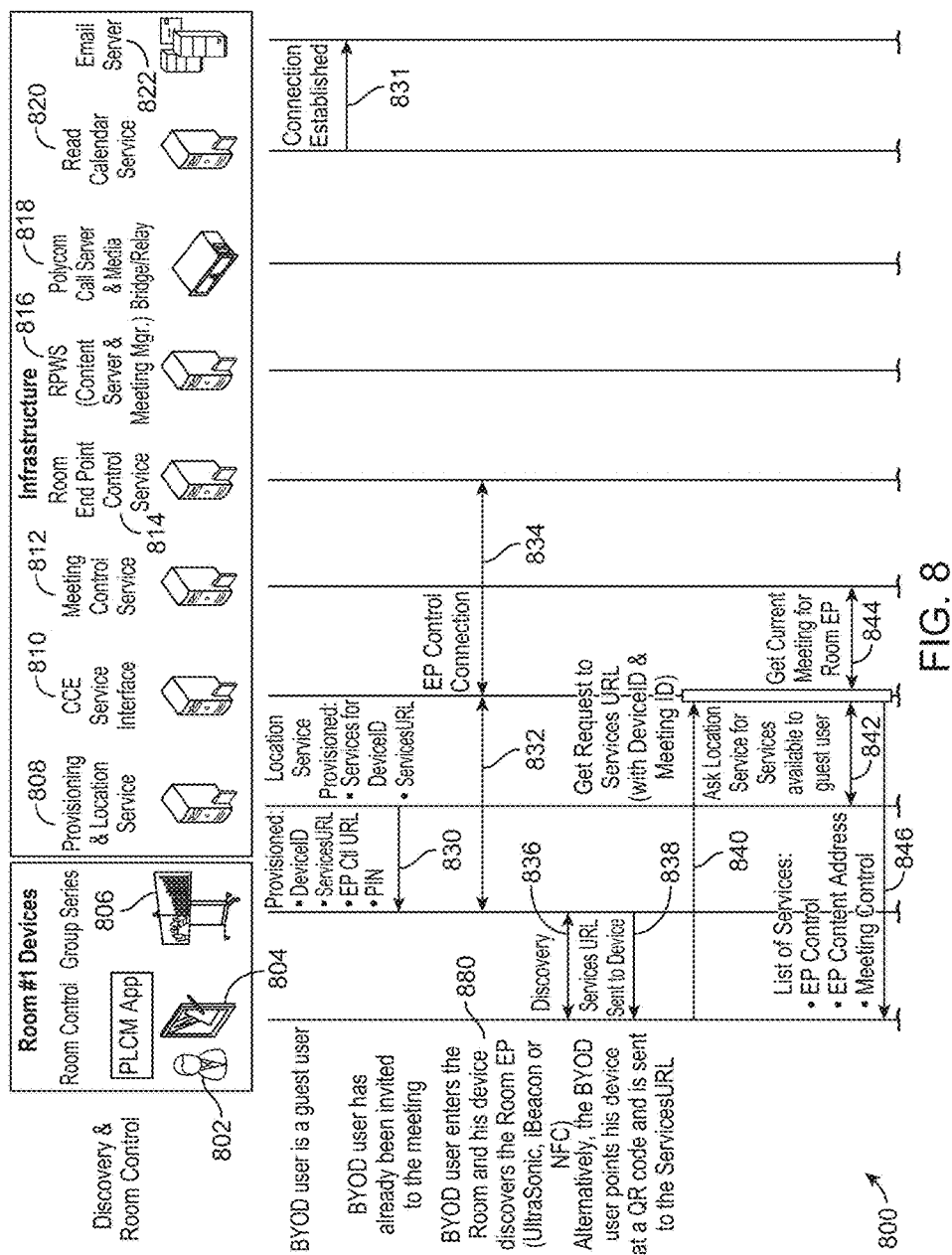
FIG. 8 shows the interaction flow for when guest user enters a meeting room.
Figure 8:
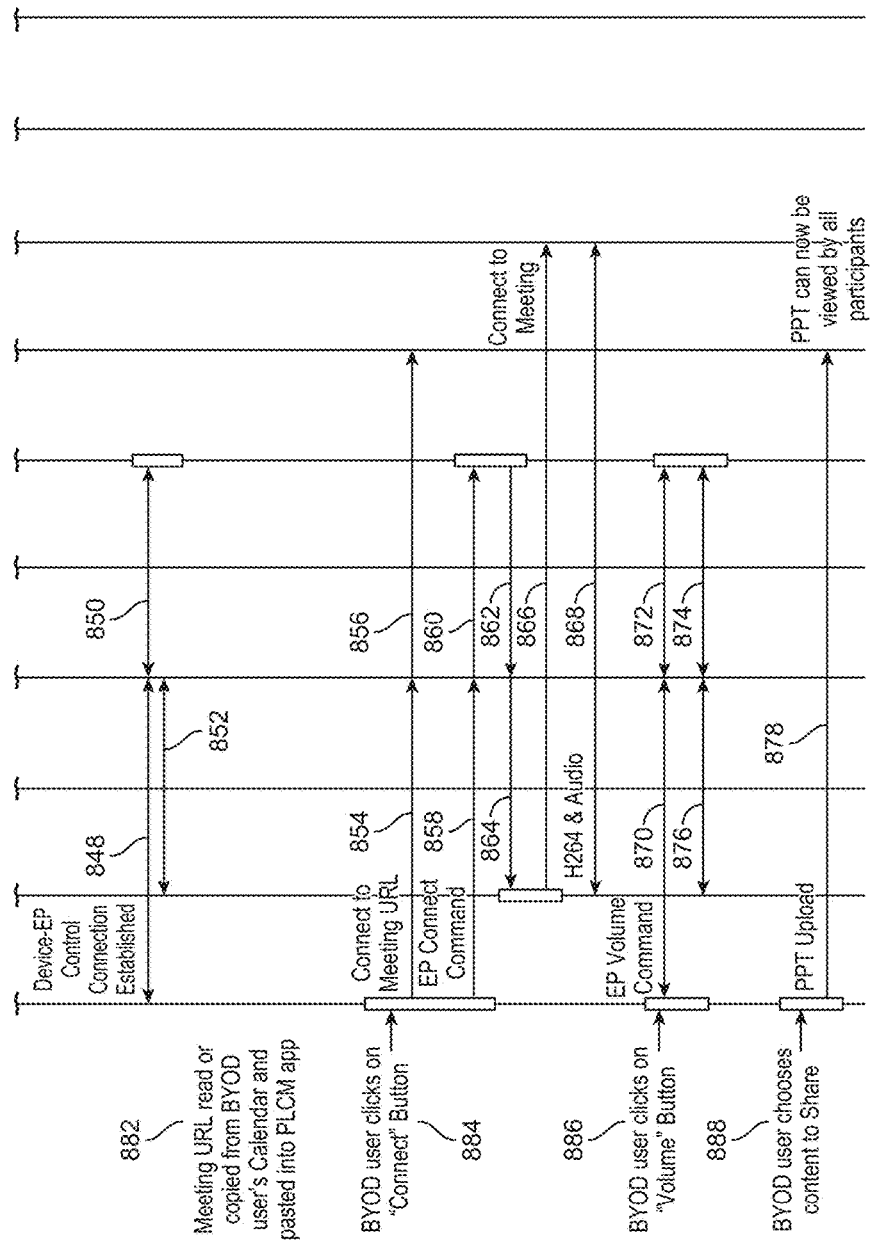

FIG. 8 illustrates instruction flow 800 during discovery & pairing for guest user 802 to join the meeting using his personal device 804 in accordance with one embodiment. At the top of FIG. 8, it shows devices in conference room #1, with different systems (including hardware and/or software) that serve as infrastructure to support the bring-your-own-device (BYOC) functionalities. On the left side of FIG. 8, it lists the sequence of events during the discovery & pairing for guest user 802 to join the meeting with his own device 804. The instruction flow 800 between personal device 804, Group Series system 806 in conference room #1, and infrastructure systems are demonstrated by the arrows in FIG. 8. Referring to FIG. 8, because user 802 is a guest user, instruction flow 800 may perform an initialization process to configure appropriate communications and settings among the systems. For example, Group Series system 806 may be provisioned, by Provision & Location Service system 808, information including Device ID, Services URL, Endpoint Control URL, PIN number, services for Device ID, and/or Services URL, as illustrated by arrow 830. Additionally, through Collaborative Control Experience (CCE) Service Interface system 810, Group Series system 806 may set up an endpoint control connection with Room Endpoint Control Service system 814, as illustrated by arrows 832 and 834. By using CCE Service Interface system 810 as an interface, Group Series system 806 may set up a "routed" connection with Room Endpoint Control Service system 814. Additionally, there may be an established connection between Read Calendar Service system 820 and E-mail system 822, as depicted by arrow 831.

Assuming that guest user 802 has already been invited to the meeting, at step 880, guest user 802 enters conference room #1 with his personal device 804. Personal device 804 may have installed appropriate application and/or software. Personal device 804 may discover Group Series system 806 in conference room #1, for example, automatically by using ultrasonic beacon, iBeacon, and/or near field communication (NFC) tag, or alternatively manually by guest user 802 to point his personal device 804 to reading a quick response (QR) code, as shown by arrow 836. Once personal device 804 discovers the Group Series system 806, Group Series system 806 may send a Services URL to personal device 804, as shown by arrow 836. Using the Service URL, Device ID and meeting ID, personal device 804 may send a request to CCE Service Interface system 810 to inquire location service for services available to guest user 802, shown by arrow 840. CCE Service Interface system 810 may collect, for example, information about the current meeting in conference room #1 from Meeting Control Service System 812, and services available to guest user 802 from Provisioning & Location Service System 808, as illustrated by arrows 842 and 844. Next, CCE Service Interface system 810 may send a list of services, for example, endpoint control, endpoint content address, and/or meeting control, to personal device 804, as shown by arrow 846. Once personal device 804 receives the list of services information, a control connection between personal device 804 and Group Series system 806 may have been established. In other words, personal device 804 may be able to control Group Series system 806 through CCE Service Interface 810 and Room Endpoint Control Service 814, as illustrated by arrows 848, 850 and 852.

At step 882, the meeting URL, for example, the URL of a WebEx meeting, may be read and/or copied from personal device 804's calendar and pasted into the corresponding application and/or software. User 802 may click on a "Connect" button shown on his personal device 804 to initiate the participation to the meeting, at step 884. With the request, personal device 804 may be connected to the meeting URL through CCE Service Interface System 810 and Real Presence Web Suite (Content Server & Meeting Manager system) 816, as shown by arrows 854 and 856. In parallel, personal device 804 may also send an endpoint connect command, as shown by arrow 858. This command may be further routed by CCE Service Interface system 810 and Room Endpoint Control Service system 814 to Group Series system 806, as illustrated by arrows 860, 862 and 864. In response, Group Series system 806 may inform Call Server & Media Bridge/Relay 818 and set up H264 and audio system of conference room #1, as shown by arrows 866 and 868. At step 886, user 802 may want to control the volume of the speakers in conference room #1. Guest user 802 may adjust the volume through personal device 804, for example, by clicking on a "Volume" button. In consequence, a volume adjustment command may be transmitted from personal device 804, through CCE Service Interface system 810 and Room Endpoint Control Service system 814, and finally reach Group Series 806, as demonstrated by arrows 870, 872, 874 and 876. At step 888, guest user 802 may also choose to share a content, for example, a PowerPoint presentation (PPT), to the meeting participants from his personal device 804. The PPT may be uploaded from personal device 804 to Real Presence Web Suite (Content Server & Meeting Manager system) 816, from which the PPT may be viewed by the meeting participants, as shown by arrow 878.

FIG. 9 shows instructions flow 900 during discovery & pairing for an enterprise bring-your-own-device (BYOD) user 902 who enters conference room #1 after the meeting has already been started on the room equipment, in accordance with one embodiment. Since BYOD user 902 has the enterprise credentials on his personal device 904, unlike instruction flow 800 in FIG. 8, instruction flow 900 may not have to perform the initiation process. Instead, once BYOD user 902 enters conference room #1 with his personal device 904, personal device 904 may go directly to discovery & pairing process. Similarly, since BYOD user 902 has already been invited to the meeting, personal device 904 may discover the conference room #1's endpoint, for example, automatically by ultrasonic, iBeacon, and/or NFC tag, or manually by reading a QR code, as shown at step 980. Once personal device 904 and Group Series system 906 discover each other, Group Series system 906 may send the services URL to personal device 904, as shown by arrow 938. Using the Service URL, Device ID and meeting ID, personal device 904 may send a request to CCE Service Interface system 910 to inquire location service for services available to guest user 902, shown by arrow 940. CCE Service Interface system 910 may collect, for example, information about the current meeting in conference room #1 from Meeting Control Service System 912, and services available to guest user 802 from Provisioning & Location Service System 908, as illustrated by arrows 942 and 944. Next, CCE Service Interface system 910 may send a list of services, for example, endpoint control, endpoint content address, read calendar, meeting control, directory/contacts, and/or meeting ULR for conference room #1's endpoint, to personal device 904, as shown by arrow 946. Once personal device 904 receives the list of services information, a control connection between personal device 904 and Group Series system 906 may have been established. In other words, personal device 904 may be able to control Group Series system 906 through CCE Service Interface 910 and Room Endpoint Control Service 914, as illustrated by arrows 948, 950 and 952.

At step 982, applications installed on personal device 906 may access the meeting URL obtained from services list. User 902 may click on a "Connect" button shown on his personal device 904 to initiate the participation to the meeting, at step 984. Personal device 904 may be connected to the meeting URL through CCE Service Interface System 910 and Real Presence Web Suite (Content Server & Meeting Manager system) 916, as shown by arrows 954 and 956. At step 986, user 902 may want to control the volume of the speakers in conference room #1. Guest user 902 may adjust the volume directly through personal device 904, for example, by clicking on a "Volume" button. In consequence, a volume adjustment command may be transmitted from personal device 904, through CCE Service Interface system 910 and Room Endpoint Control Service system 914, and finally reach Group Series 906, as demonstrated by arrows 970, 972, 974 and 976. Further, if another participant is sharing a content in the meeting, the meeting content may be transmitted from Real Presence Web Suite (Content Server & Meeting Manager system) 916 to personal device 904, as shown by arrow 978.

Figure 10:
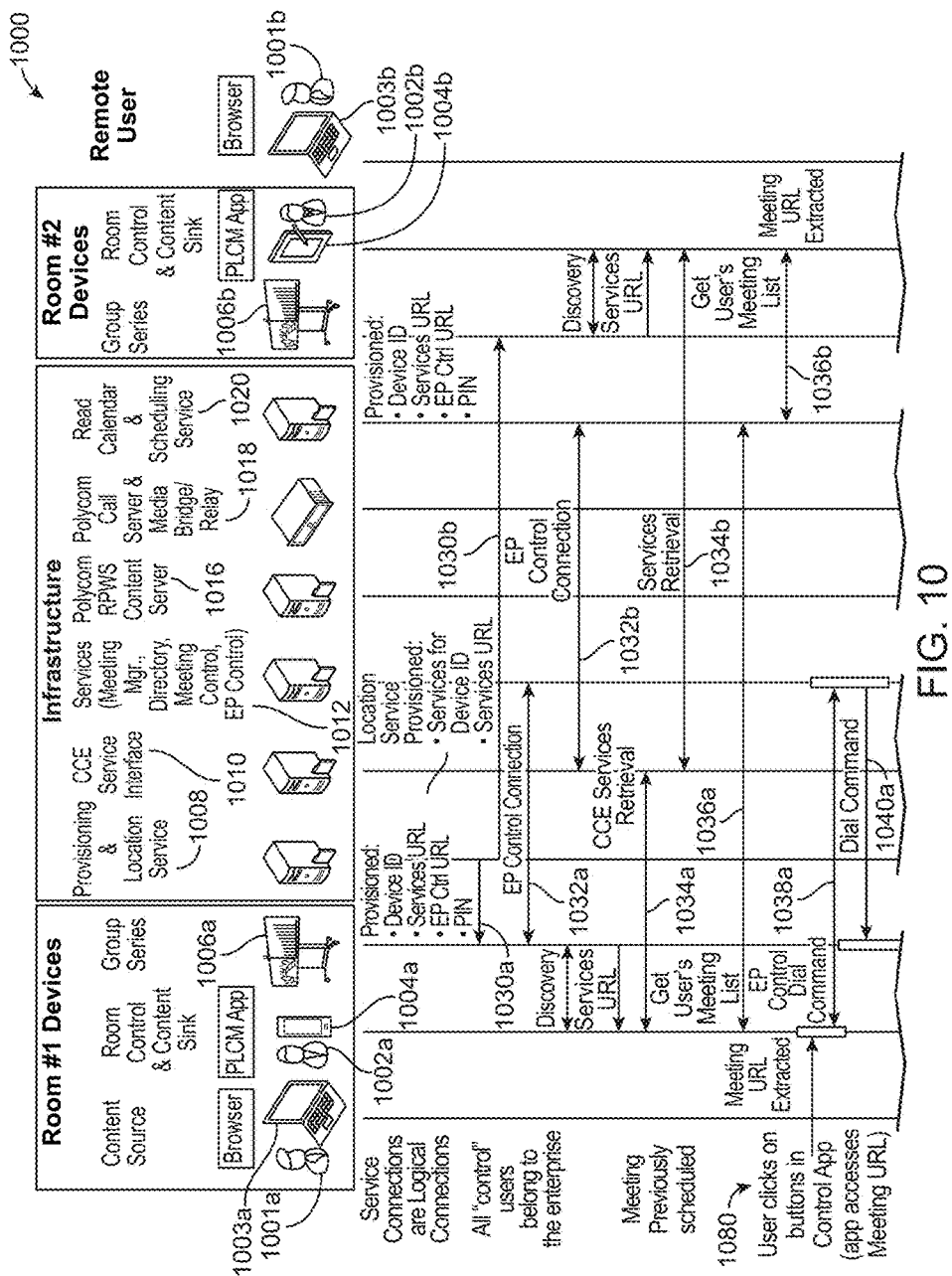
FIG. 10 illustrates an example action flow for when two collaboration spaces participate in a meeting.
Figure 10:
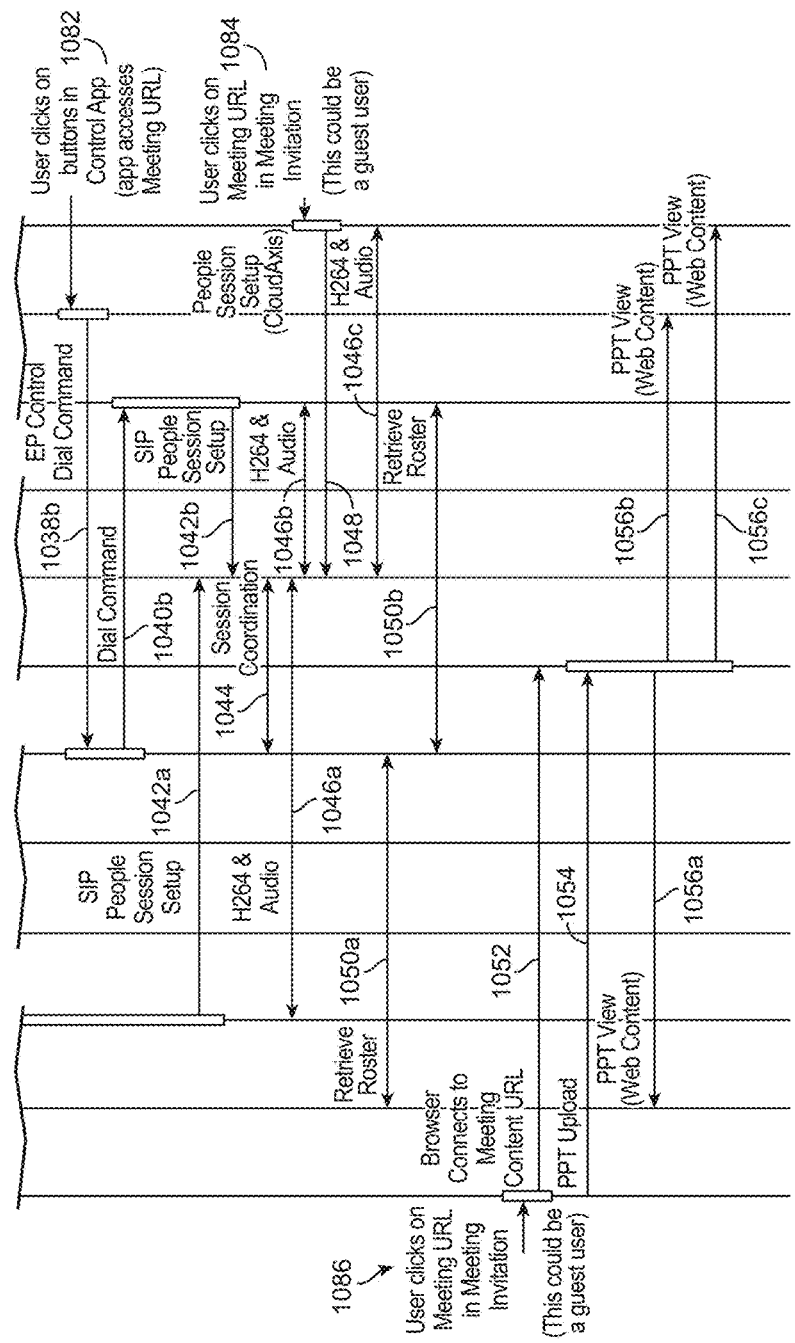

FIG. 10 illustrates instruction flow 1000 of an exemplary scenario where multiple users participate in the same previously scheduled meeting from different locations in accordance with one embodiment. For example, users 1001a and 1002a may participate in the meeting in conference room #1 that includes Group Series system 1006a, by using laptop 1003a and brining his own personal device 1004a, respectively. By comparison, user 1001b may join the meeting remotely through his laptop 1003b, and user 1002b may participate in the meeting bringing her own personal device 1004b in conference room #2, which includes Group Series system 1006b. Each user may control the corresponding Group Series system in the corresponding conference room with their devices. Referring to FIG. 10, the infrastructure will support each user to join the meeting and control corresponding endpoint devices in individual conference rooms. It is assumed that this meeting has been previously scheduled, each of the users 1001a, 1002a, 1001b and 1002b has been invited to the meeting, and they all belong to the enterprise. Thereby, instruction flow 1000 may configure the service connections (or logical connections) between the Group Series systems of the conference rooms #1 and #2 (e.g., Group Series systems 1006a and 1006b) with Provisioning & Location Service system 1008, as illustrated by arrows 1030a and 1030b, respectively. Upon the established service connections, Provisioning & Location Service system 1008 may provide to Group Series systems 1006a and 1006b the information, such as Device ID, Services URL, EP Control URL PIN number, services for Device ID and/or services URL. Further, through CCE Service Interface system 1010, Group Series systems 1006a and 1006b may establish EP control connections with Services system 1012, which may support functionalities such as meeting management, meeting directory, meeting and/or endpoint control, as depicted by arrows 1032a and 1032b. Since the meeting has been previous scheduled and all the users have been invited to the meeting, each user will discover and receive the services URL individually, following the similar process described in FIGS. 8 and 9. Additionally, for users 1002a and 1002b, their personal devices 1004a and 1004b may retrieve CCE services from CCE Service Interface System 1010, as shown by arrows 1034a and 1034b. They may also get user's meeting list through their own personal devices 1004a and 1004b from Read Calendar Services system 1020, as shown by arrows 1036a and 1036b. At step 1080, user 1002a may click on buttons in corresponding Control Application on his personal device 1004a. The control application on personal device 1004a may extract and access the meeting URL. Personal device 1004a may send an endpoint control dial command to Services system 1012, as shown by arrow 1038a. Upon the command, Service system 1012 may further route the dial command to Group Series system 1006a in conference room #1, as illustrated by arrow 1040a. At step 1082, user 1002b may also click on buttons in corresponding Control Application on her personal device 1004b. Similarly, the control application on personal device 1004b may extract and access the meeting URL. Personal device 1004b may send an endpoint control dial command to Services system 1012, as shown by arrow 1038b. Upon the command, Service system 1012 may further route the dial command to Group Series system 1006b in conference room #2, as illustrated by arrow 1040b. Group Series systems 1006a and 1006b may each send a request to Call Server and Media Bridge/Relay 1018 for session initiation protocol (SIP) people session setup, as shown by arrows 1042a and 1042b. Under the requests, Call Server and Media Bridge/Relay 1018 may communicate with Services system 1012 (as shown by arrow 1044) and then set up the H264 and audio through Groups Series systems 1006a and 1006b (as shown by arrows 1046a and 1046b). At step 1084, remote user 1001b may clicks on the meeting URL on his laptop 1003b to access the meeting. Note that user 1001b may be a guest user. Laptop 1003b may send a request for people session setup (Cloud Axis) to Call Server and Media Bridge/Relay 1018, as depicted by arrow 1048. Upon the request, Call Server and Media Bridge/Relay 1018 may communicate with laptop 1003b to set up H264 and audio, as shown by arrow 1046c. Additionally, personal devices 1004b and 1004b may retrieve roster from Services system 1012, as shown by arrows 1050a and 1050b, respectively. At step 1086, user 1001a may click on the meeting URL to request sharing a content, for example, a PowerPoint presentation. The browser software on laptop 1003a may connect to the meeting URL and upload the PowerPoint view to RPWS Content Server system 1016, as shown by arrows 1052 and 1054. RPWS Content Server system 1016 may further distribute the PowerPoint view to users 1002a, 1002b and 1001b through their individual personal device 1004a, personal device 1004b and laptop 1003b, as shown by arrows 1056a, 1056b and 1056c, respectively.

Figure 11:
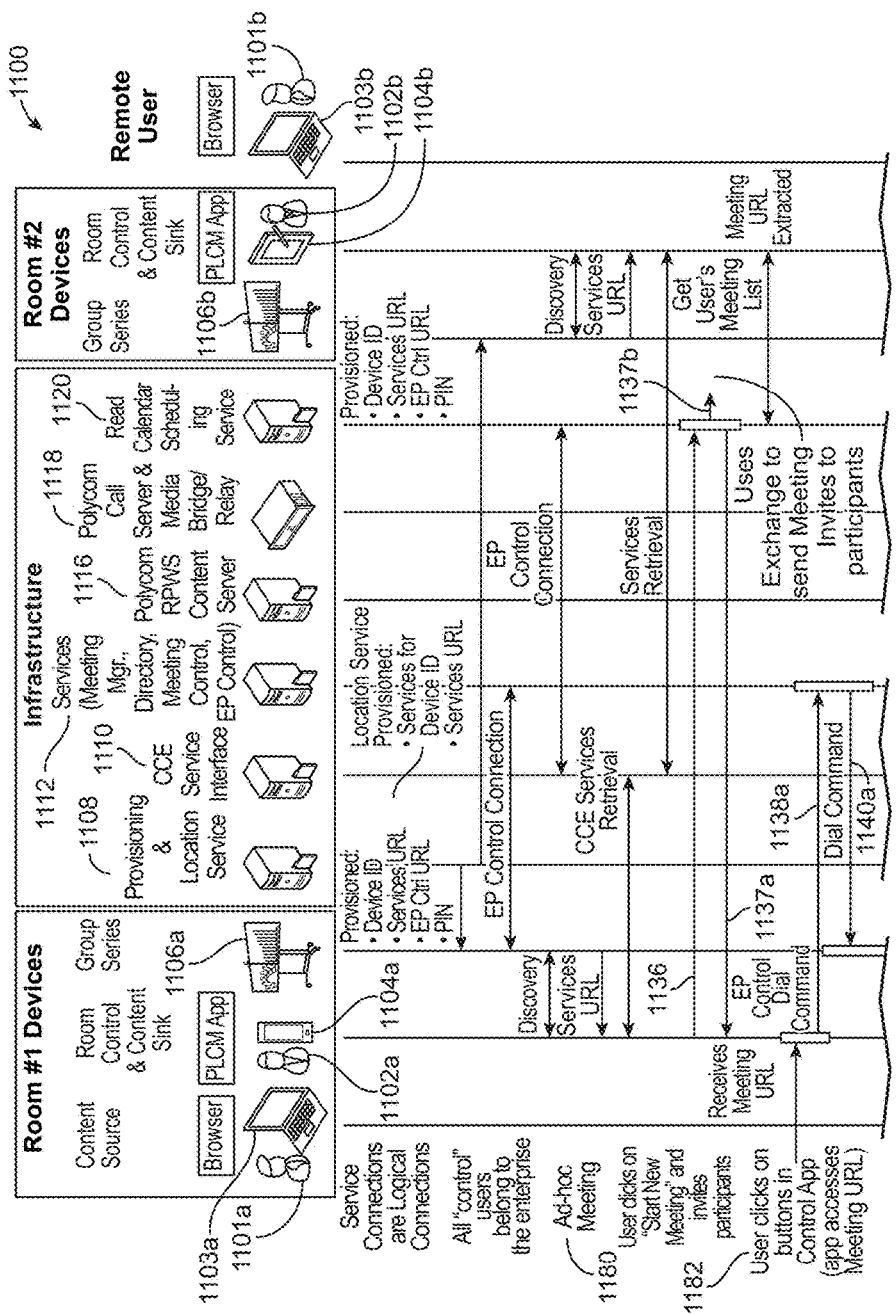
FIG. 11 illustrates an action flow for an ad hoc meeting.
Figure 11:
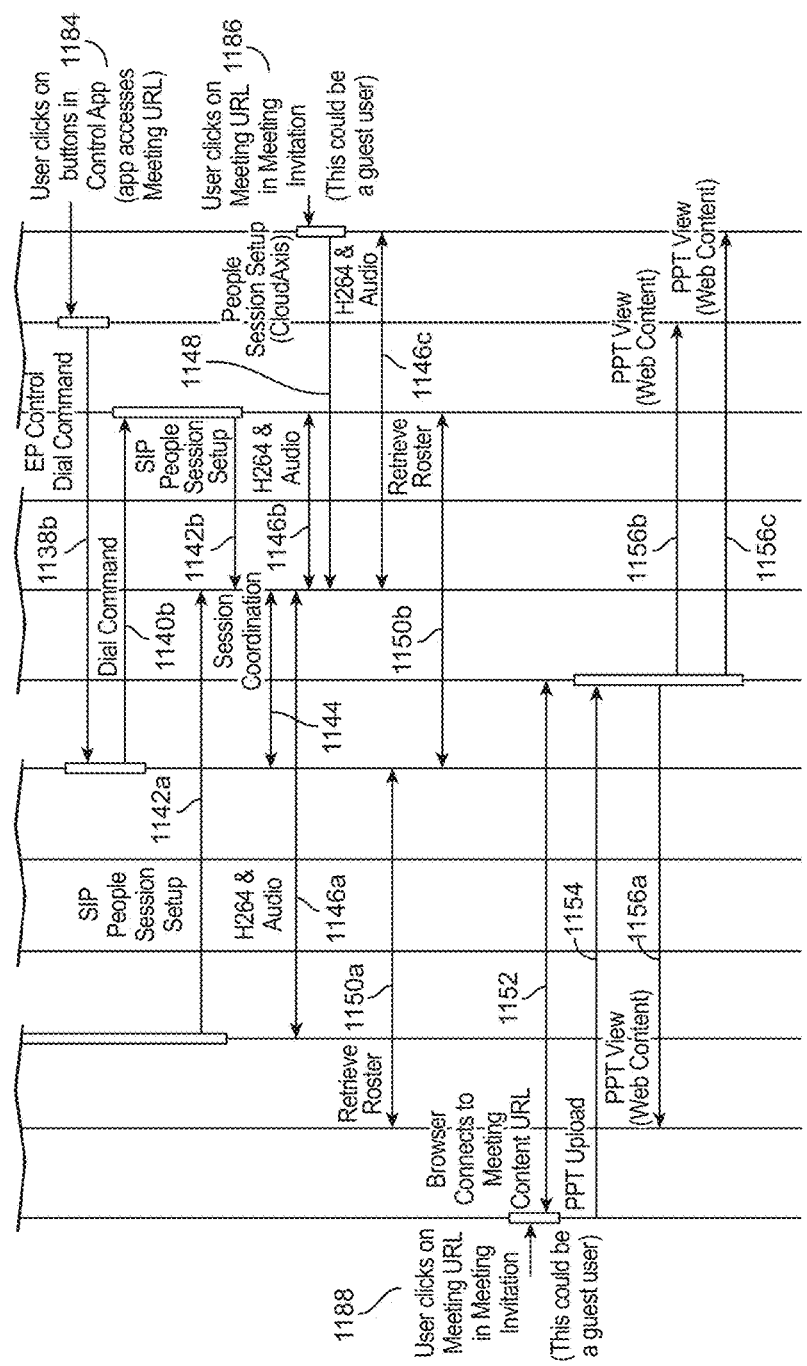

FIG. 11 illustrates instruction flow 1100 of an exemplary scenario where multiple users participate in an ad-hoc meeting from different locations in accordance with one embodiment. Instruction flow 1100 is substantially similar to instruction flow 1000 in FIG. 10, especially in terms of the communications between Groups Series systems 1106a and 1106b with Provisioning & Location Service system 1108, CCE Service Interface system 1110 and Services system 1112. However, in this exemplary scenario, the meeting is not previously scheduled. Instead, the meeting is ad-hoc created by user 1102a through his own personal device 1104a, at step 1080. User 1102a may click on "Start New Meeting" on his own personal device 1104a to invite users 1101a, 1102b and 1101b to join the meeting. Personal device 1104a may send a request to Read Calendar Scheduling Service system 1120, as shown by arrow 1036. Upon receiving the meeting invitation, Read Calendar Scheduling Service system 1120 may provide an acknowledge back to personal device 1104a, and further send meeting invitations to the other users by using Exchange, as shown by arrows 1037a and 1037b. Once the meeting becomes scheduled, the remaining operations may be substantially similar to those described in FIG. 10. For example, at step 1182, user 1102a may click on buttons in corresponding Control Application on his personal device 1104a. The control application on personal device 1104a may extract and access the meeting URL. Personal device 1104a may send an endpoint control dial command to Services system 1112, as shown by arrow 1138a. Upon the command, Service system 1112 may further route the dial command to Group Series system 1106a in conference room #1, as illustrated by arrow 1140a. At step 1184, user 1102b may also click on buttons in corresponding Control Application on her personal device 1104b. Similarly, the control application on personal device 1104b may extract and access the meeting URL. Personal device 1104b may send an endpoint control dial command to Services system 1112, as shown by arrow 1138b. Upon the command, Service system 1112 may further route the dial command to Group Series system 1106b in conference room #2, as illustrated by arrow 1140b. Group Series systems 1106a and 1106b may each send a request to Call Server and Media Bridge/Relay 1118 for session initiation protocol (SIP) people session setup, as shown by arrows 1142a and 1142b. Under the requests, Call Server and Media Bridge/Relay 1118 may communicate with Services system 1112 (as shown by arrow 1144) and then set up the H264 and audio through Groups Series systems 1106a and 1106b (as shown by arrows 1146a and 1146b). At step 1186, remote user 1101b may clicks on the meeting URL on his laptop 1103b to access the meeting. Note that user 1101b may be a guest user. Laptop 1103b may send a request for people session setup (Cloud Axis) to Call Server and Media Bridge/Relay 1118, as depicted by arrow 1148. Upon the request, Call Server and Media Bridge/Relay 1118 may communicate with laptop 1103b to set up H264 and audio, as shown by arrow 1146c. Additionally, personal devices 1104b and 1104b may retrieve roster from Services system 1112, as shown by arrows 1150a and 1150b, respectively. At step 1188, user 1101a may click on the meeting URL to request sharing a content, for example, a PowerPoint presentation. The browser software on laptop 1103 a may connect to the meeting URL and upload the PowerPoint view to RPWS Content Server system 1116, as shown by arrows 1152 and 1154. RPWS Content Server system 1016 may further distribute the PowerPoint view to users 1102a, 1102b and 1101b through their individual personal device 1104a, personal device 1104b and laptop 1103b, as shown by arrows 1156a, 1156b and 1156c, respectively.

Figure 12:
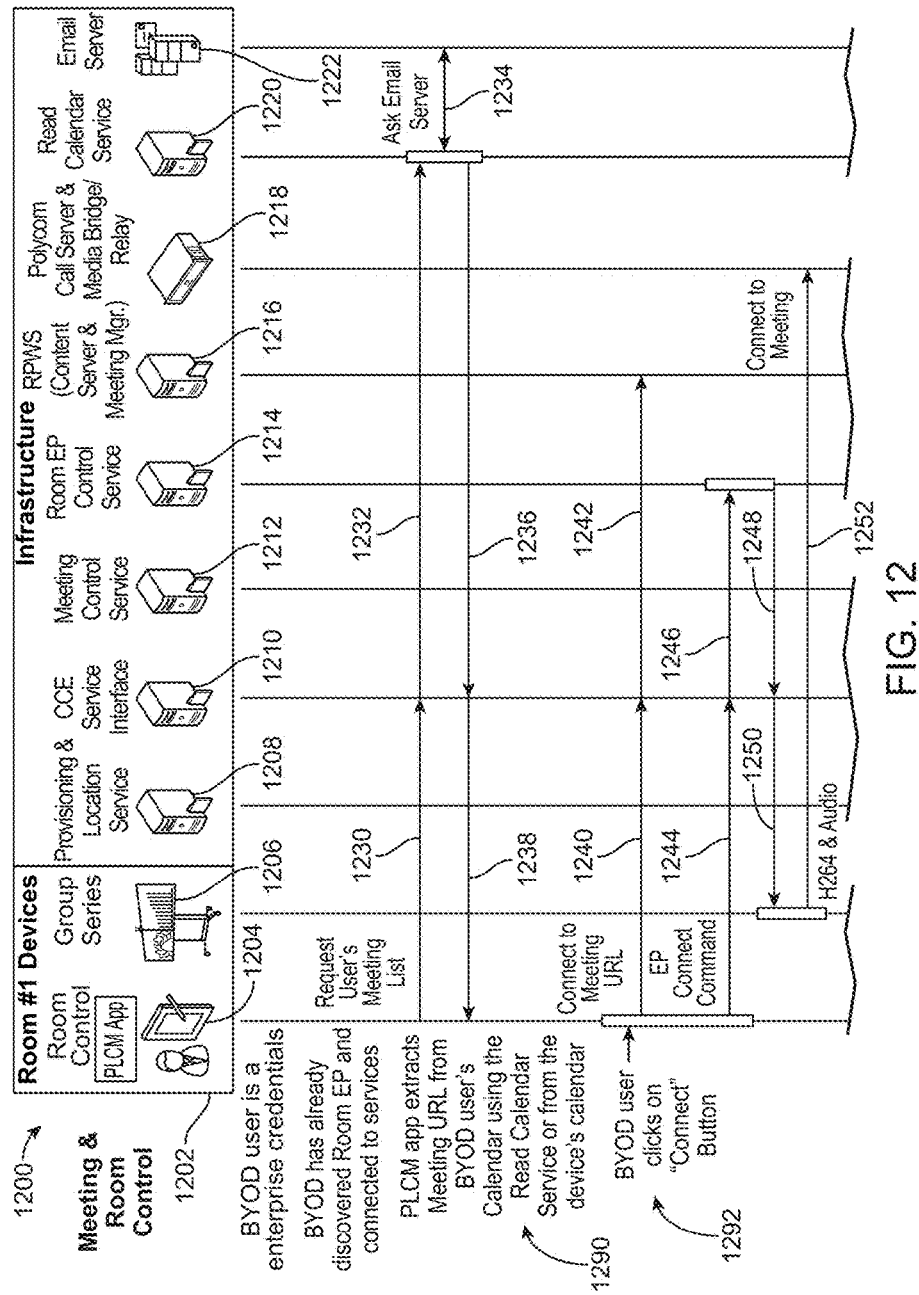
FIG. 12 is a flow diagram showing steps for when user connects to services using a BYOD control device.
Figure 12:
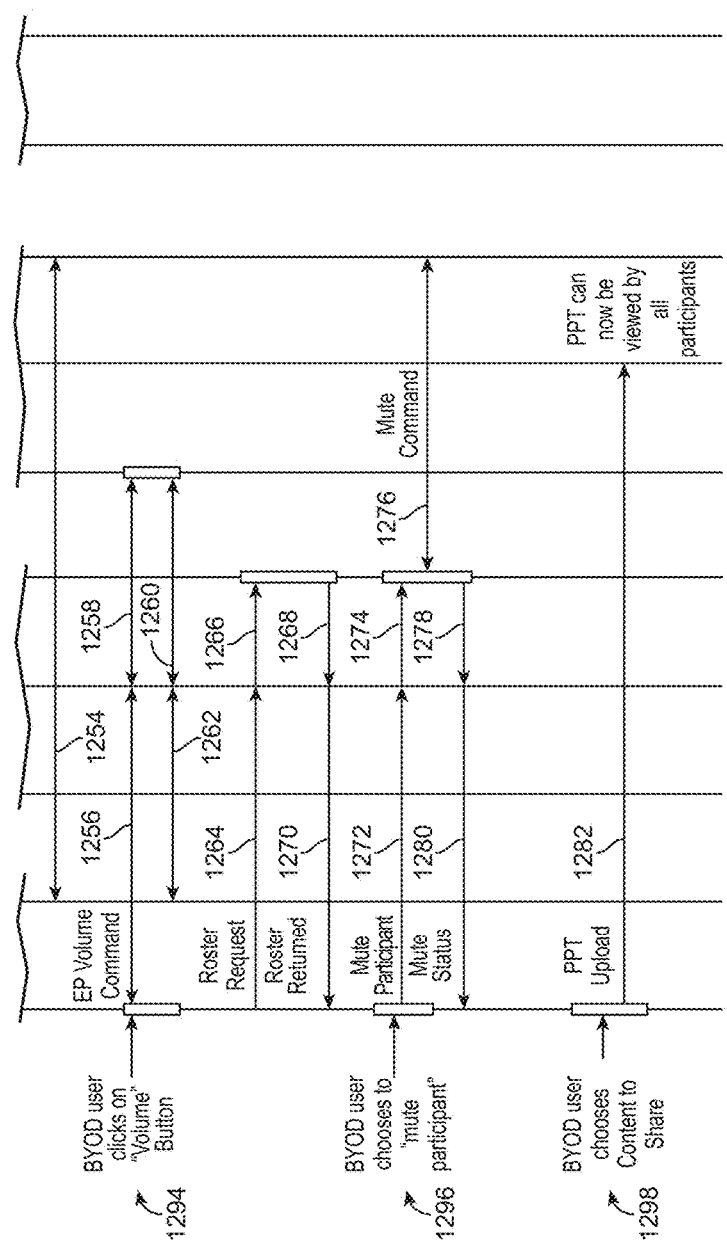

FIG. 12 illustrates instruction flow 1200 for user 1204 to use his own personal device 1206 to control the room equipment (e.g., the volume) and the meeting experience (e.g., muting another participant) in accordance with one embodiment. It is assumed that in this exemplary scenario, personal device 1204 has the enterprise credentials, has discovered conference room #1's endpoint, and connected to the services. At step 1290, the application on personal device 1204 may extract meeting URL from user 1202's calendar, by using Read Calendar Service system 1220 or directly reading the calendar information stored on personal device 1204. If the application retrieves the meeting URL through Read Calendar Service system 1220, personal device 1204 may request user 1202's meeting list from CCE Service Interface system 1210, as shown by arrow 1230. Based on the request, CCE Service Interface system 1210 may communicate with Read Calendar Service system 1220, which may further request E-mail Server 1222 for the meeting information, as demonstrated by arrows 1232 and 1234. Once Read Calendar Service system 1220 receives the meeting information from E-mail Server 1222, it may forward the information back to personal device 1204 through CCE Service Interface system 1212, as illustrated by arrows 1236 and 1238. At step 1292, user 1202 may click on "Connect" button on his own personal device 1204 to participate in the meeting. In particular, personal device 1204 may be connected to the meeting URL through CCE Service Interface System 1210 and Real Presence Web Suite (Content Server & Meeting Manager system) 1216, as shown by arrows 1240 and 1242. In parallel, personal device 1204 may also send an endpoint connect command, as shown by arrow 1244. This command may be further routed by CCE Service Interface system 1210 and Room Endpoint Control Service system 1214 to Group Series system 1206, as illustrated by arrows 1246, 1248 and 1250. In response, Group Series system 1206 may inform Call Server & Media Bridge/Relay 1218 to set up H264 and audio system of conference room #1, as shown by arrows 1252 and 1254. At step 1294, user 1202 may want to control the volume of the speakers in conference room #1. Guest user 1202 may adjust the volume through personal device 1204, for example, by clicking on a "Volume" button. In consequence, a volume adjustment command may be transmitted from personal device 1204, through CCE Service Interface system 1210 and Room Endpoint Control Service system 1214, and finally reach Group Series 1206, as demonstrated by arrows 1256, 1258, 1260 and 1262. Personal device 1204 may also request roster from Meeting Control Service 1212 through CCE Service Interface 1210, as shown by arrows 1264, 1266, 1268 and 1270. At step 1296, user 1202 may would like to mute another participant. He may click on "Mute Participant" on his personal device 1204. Personal device 1204 may send the "mute participant" request to CCE Service Interface system 1210, which may further route it to Meeting Control Service 1212 and Call Service & Media Bridge/Relay system 1218, as shown by arrow 1274 and 1276. Personal device 1204 may receive a status update in return, as shown by arrows 1276, 1278 and 1280. User 1202 may also share a content to the meeting through his own device 1204. For example, at step 1298, user 1202 may upload a PowerPoint presentation to RPWS system (Content Server & Meeting Manager) 1216 for other participants to view, as shown by arrow 1282.

Figure 13:
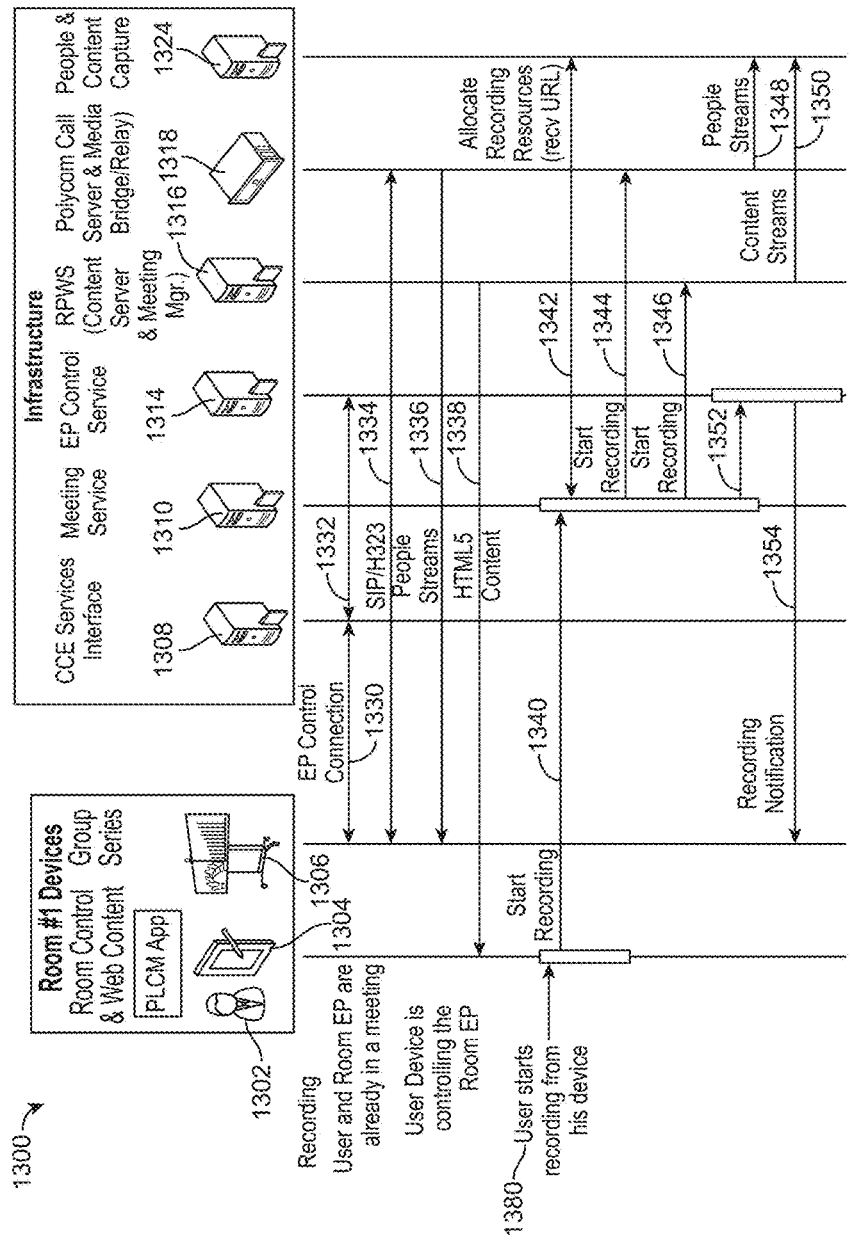
FIG. 13 is a flow diagram showing steps for when a user device and a room endpoint are in a meeting.

FIG. 13 illustrates instruction flow 1300 of an exemplary scenario where user 1302 is in a meeting at conference room #1 and decides to start recording the meeting in accordance with one embodiment. In this exemplary scenario, it is assumed that user 1302's own personal device 1304 has been in pair and control of Group Series system 1306 of conference room #1. Since the meeting is ongoing, Group Series system 1306 may have established the communications with the infrastructure. For example, Group Series system 1306 may include endpoint control connection with Endpoint Control Services system 1314 through CCE Services Interface System 1308, as shown by arrows 1330 and 1332. Further, Group Series system 1306 may have SIS/H323 connections and People Streams with Call Server & Media Bridge/Relay system 1318, as illustrated by arrows 1334 and 1336. In addition, as personal device 1304 is controlling conference room #1's endpoint, personal device 1304 may receive HTML5 content from RPWS system 1316 (Content Server & Meeting Manager), as shown by arrow 1338. At step 1380, user 1302 may initialize the recording on his own personal device 1304. In particular, personal device 1304 may send a "start recording" signal to Meeting Service system 1310, as depicted by arrow 1340. Upon receiving the "start recording" signal, Meeting Service system 1310 may communicated with People & Content Capture system 1324 to allocate recording resources, as illustrated by arrow 1342. Further, Meeting Service system 1310 may send a notice of "start recording" to Call Server & Media Bridge/Relay 1318 and RPWS system (Content Server & Meeting Manager) 1316 respectively, as shown by arrows 1344 and 1346. Consequently, Call Server & Media Bridge/Relay 1318 and RPWS system (Content Server & Meeting Manager) 1316 may send people streams and content streams signals to People Content & Capture 1324 respectively, as shown by arrows 1348 and 1350. Separately, meeting Service 1310 may also send a "recording notification" back to personal device 1304 through Endpoint Control Service system 1314, as shown by arrows 1352 and 1354.

Figure 14:
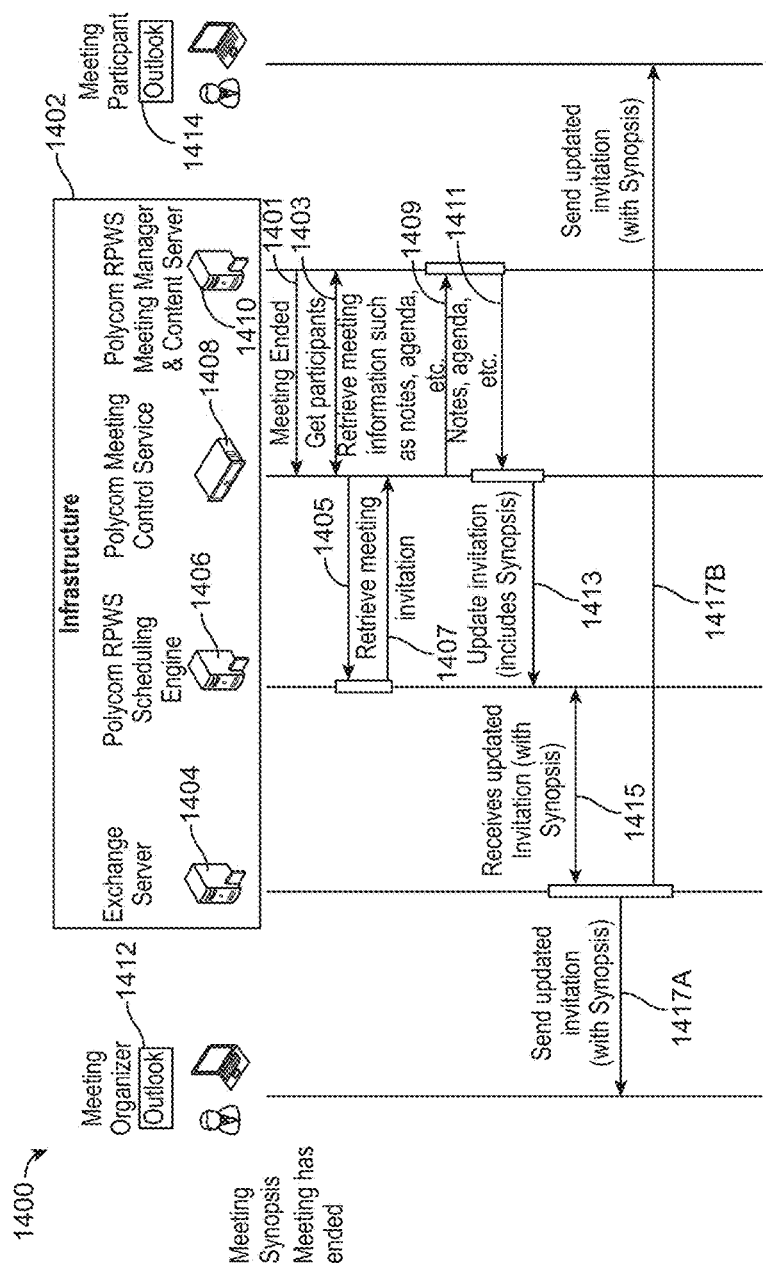
FIG. 14 is a flow diagram for a situation in which a meeting was recently ended.

FIG. 14 is a flow diagram illustrating a technique 1400 for sending a synopsis of a meeting that recently ended. The synopsis of the meeting can be created using infrastructure 1402 and sent to all meeting participants 1412 and 1414. Technique 1400 begins at operation 1401. Here, the RPWS meeting manager and content server 1410 communicates data to the meeting control service 1408 to indicate that the meeting has ended. Next, at operation 1403, the server 1410 and the service 1408 exchange information about the participants 1412 and 1414. Technique 1400 also includes operation 1405, where the service 1408 requests the meeting invitations from the scheduling engine 1406. Operation 1407 includes the engine 1406 providing the meeting invitations to the service 1408. Operations 1401, 1403, 1405, and 1407 are used to determine and confirm the meeting participants 1412 and 1414 that will receive the synopsis.

At operation 1409, the service 1408 requests meeting information from the server 1410. This meeting information includes, but is not limited to, any information associated with audio/video conferences—e.g., notes, agenda, attachments, video, audio, content, etc. The server 1410 provides the meeting information to the service 1408 at operation 1411. Next, at operation 1413, the service 1408 generates a synopsis of the meeting using the meeting information. In one embodiment, the service 1408 updates the previously acquired invitations (operation 1407) with the generated synopsis and provides these updated invitations to the scheduling engine 1406. For another embodiment, the generated synopsis is provided to the engine 1406 without the invitations. At operation 1415, the engine 1406 communicates the generated synopsis (or the updated invitations that include the synopsis) with the exchange server 1404.

Technique 1400 ends at operations 1417A-B. Here, the exchange server 1404 communicates the synopsis (by itself or as part of an updated invitation) to the participants 1412 and 1414. The synopsis can be communicated to the participants 1412 and 1414 using any type of electronic message format (e.g., text message, email, multimedia message, etc.).

Figure 15:
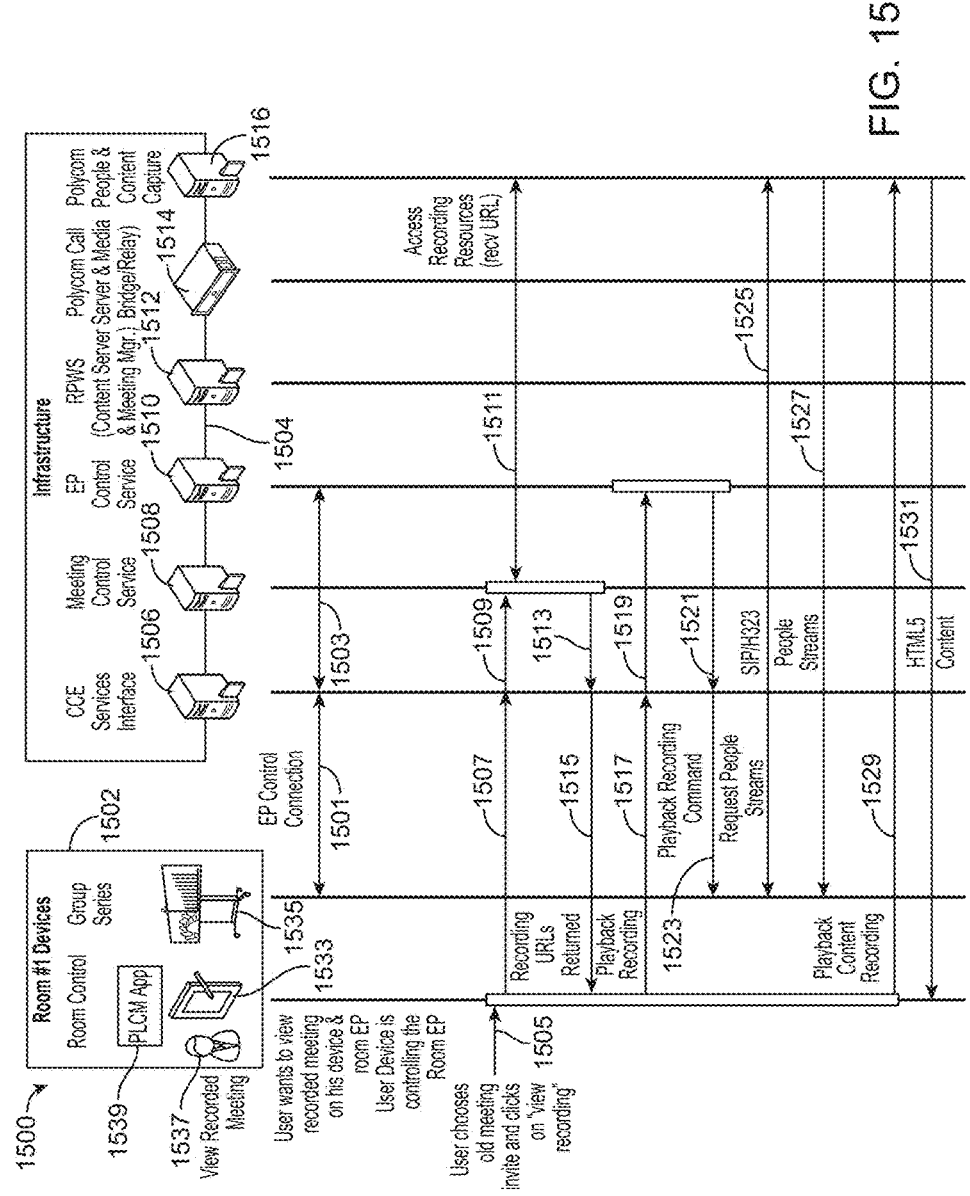
FIG. 15 is a flow diagram illustrating play back of a recorded meeting.

FIG. 15 is a flow diagram illustrating a technique 1500 in which a record of a meeting is to be played back. As shown, a user device 1533 (or BYOD control device 1533) is controlling a room endpoint/device 1535 and the user decides to watch a recorded meeting. The user 1537 starts the playback from his device 1533. In this example, people streams appear on the room endpoint/device 1535, and the content streams appear on the user's device 1533. When the user device 1533 and the endpoint/device 1535 are in the same room, this disclosure refers to them collectively as the room #1 devices 1502. Technique 1500 is performed by the room #1 devices 1502 and the infrastructure 1504 (which comprises components 1506, 1508, 1510, 1512, 1514, and 1516).

Technique 1500 begins at operations 1501 and 1503, where the endpoint control service 1510 communicates with the collaboration control experience (CCE) services interface 1506 to establish a control connection with and gain control over the endpoint/device 1535. Next, at operation 1505, the user 1537 makes a request, via input provided on his device 1533, to the infrastructure 1504 to communicate a previously-recorded meeting to the room #1 devices 1502 for presentation to the user 1537. The input can be received by an application 1539 that is accessible to the device 1533. At operation 1507, the request for the previously-recorded meeting triggers a request for a recording uniform resource locator (URL) that identifies the desired meeting to the CCE services interface 1506. The interface 1506 communicates the request for the recording URL to the meeting control service 1508, as shown in operation 1509.

Operation 1511 of Technique 1500 includes the meeting control service 1508 retrieving, based on the request for the recording URL, one or more recording resources at the people and content capture server 1516. These one or more recording resources include the recording URL for the previously-recorded meeting selected by the user 1537. As shown in operations 1513 and 1115, the meeting control service 1508 communicates the retrieved recording URL to the interface 1506, which in turn communicates the retrieved recording URL to the user device 1533 via the application 1539. Technique 1500 proceeds to operations 1517 and 1519 in response to an input representing a selection of the retrieved URL being received by the application 1539 via the device 1539. Specifically, operations 1517 and 1519 include transmitting a request to the endpoint control service 1510 through the CCE service interface 1506 to play/present the previously-recorded meeting.

At operations 1521 and 1523, the endpoint control service 1510 communicates a playback recording command through the interface 1506 to the room endpoint/device 1535. This command, in one embodiment, causes the room endpoint/device 1535 to trigger the playing back of people streams on the room endpoint/device 1535. In response to the received command, operation 1525 is performed. Here, the room endpoint/device 1535 requests the people streams corresponding to the retrieved URL from the people and content capture server 1516. The server 1516 responds to the request at operation 1527, where the people streams can be communicated from the server 1516 to the endpoint/device 1535 via voice over IP (VoIP) and multimedia communication technology. Such technology includes, but is not limited to, H.323 standard and session initiation protocol (SIP) standard. In addition, technique 1500 also includes operation

1529. This operation includes the device 1533 (via the application 1539) requesting playback of the content streams. The people and content capture server 1516 responds to this request by communicating the requested content via one or more web technologies to the device 1533. Examples of such technology includes, but is not limited to, HyperText Markup Language (HTML) standard.

Figure 16:
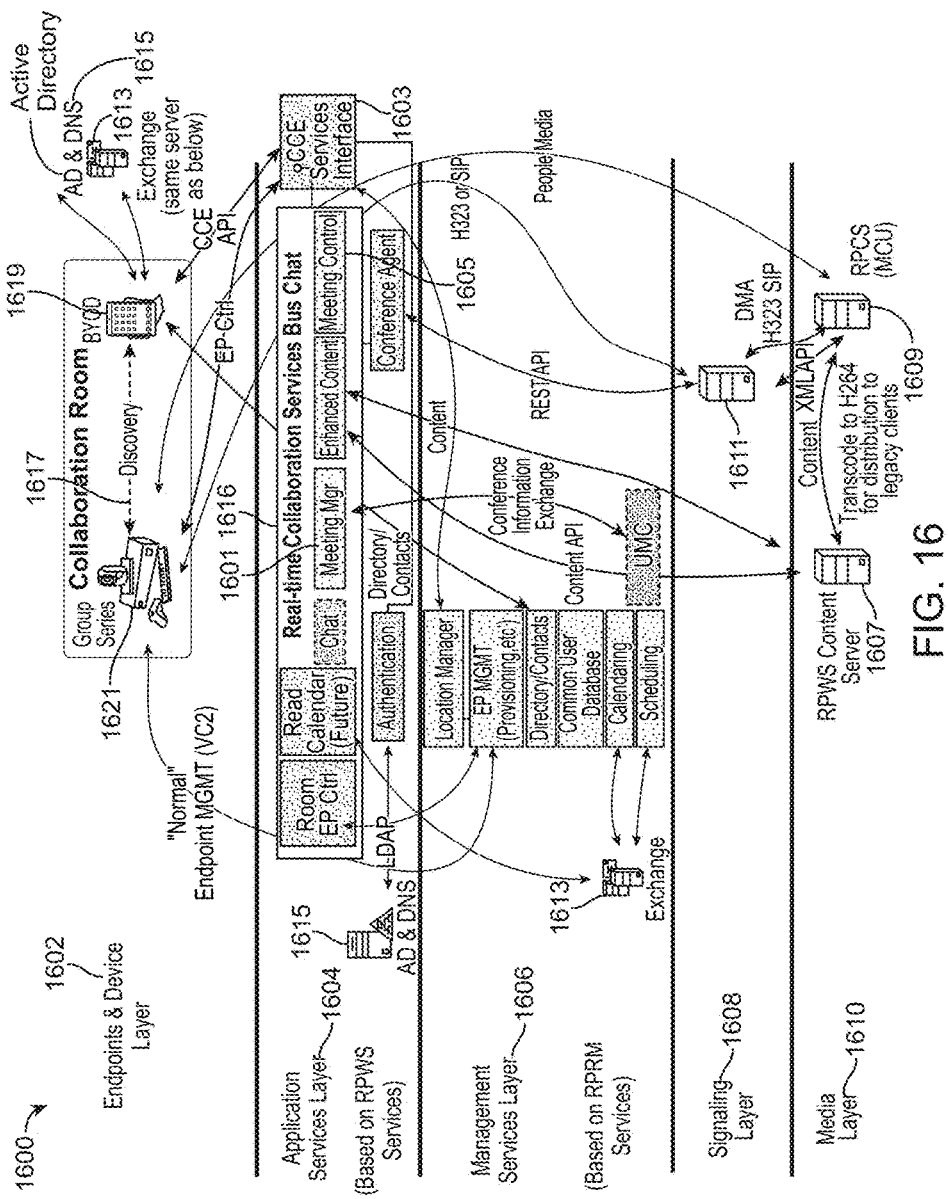
FIG. 16 is a logical view of an example architecture within this disclosure.

FIG. 16 is a logical view of an example architecture 1600 within this disclosure. The architecture 1600 can be implemented using web-based services. The architecture 1600 discussed here is not intended to be exclusive in any way, but rather to be illustrative. This is especially true for layer-type diagrams, which developers tend to express in somewhat differing ways. The notation employed here is generally intended to imply that hardware and/or software components shown in a layer use resources from the layers below and provide services to layers above. However, in practice, one or more components of the architecture 1600 may not behave entirely in that manner.

As shown, the architecture 1600 can consist of a number of experience layer services 1602, 1604, 1606, 1608, and 1610 (with which a user will directly interact). The experience layer services 1602, 1604, 1606, 1608, and 1610 can enable user devices to control both the room devices and the collaboration experience. The lowest layer is the media layer 1610, which includes the RPWS content server 1607 and the RPCS server 1609 (or RMX server 1609). The RPWS content server 1607 includes all the RPWS content, which allows a user device 1619 (or BYOD control device 1619) to view and manipulate web-based meeting content. The RMX server 1609 includes all the people media that is communicated to and presented by a room endpoint/device 1621.

The signaling layer 1608, which is above the media layer 1610, includes the DMA 1611, which can communicate management information and/or signaling information with the RMX server 1609 and the room endpoint/device 1621. The management services layer 1606 is above the signaling layer 1608. The layer 1606 includes several components, such a location manager, an endpoint manager (EP Mgmt), a directory with contacts, a common user database, a calendaring component, a scheduling component, etc. In one embodiment, the user device 1619 communicates with one or more components in the layer 1606 via the exchange server 1613 to perform certain functions (e.g., calendaring, scheduling, selecting meeting participants, etc.). Also, one or more components of the layer 1606 can facilitate endpoint management and/or control of the room endpoint/device 1621. Other functionalities are evident from the FIG. 16.

The architecture 1600 also includes an application services layer 1604, which sits on top of the management services layer 1606. Here, a real-time collaboration services bus chat 161 and the CCE services interface 1603 enable, among other things, communication between the user device 1619, the endpoint 1621, the exchange server 1613, the RPWS content server 1607, the DMA 1611, and the RMX 1609. The application services layer 1604 may provide added functionality to the embodiments described here. For example, the layer 1604 includes one or more components that enable meeting control, enhancement of content, meeting management, chats between participants, review of future calendar events, and/or control of the room endpoint/device 1621 via commands issued from the user device 1619. In one embodiment, the CCE services interface 1603 enables authentication of meeting participants' devices and/or endpoints via one or more directory services (e.g., active directory (AD), Domain Name System (DNS), etc.). The topmost layer of the architecture 1600 is the endpoints and device layer 1602. This is where the user device (or BYOD control device) 1619 and the room endpoint/device 1621 reside. These components have been described above in connection with at least one of FIGS. 1-13. For brevity, they are not described again here.

As shown, this architecture 1600 can include existing "People" components and "Content" Components, such as the DMA 1611 in the signaling layer, the RMX (or RPCS) 1609 in the media layer 1610, and/or the RPWS in the media layer 1610. The illustrated architecture 1600 can have additional components. For example, there can be components involved in license enforcement and monitoring (not shown). The architecture 1600 can include a component called the meeting manger 1601 which controls all aspects of a particular meeting including, but not limited to, coordinating the people and content portions of the meeting, accessing meeting information from the scheduling service in the layer 1606, providing URL information to the CCE Services Interface 1603, and providing roster information to the Meeting Control service 1605 and other functionality. In FIG. 16, the meeting manager 1601 is shown as part of the real-time collaboration services bus chat 161; however, the meeting manager 1601 may be separate from the bus chat 161.

In at least one embodiment, a CCE/BYOD solution (e.g., the CCE/BYOD solution illustrated in at least one of FIGS. 1-16, etc.) does not depend upon the manner in which a meeting was scheduled. In at least one embodiment, meeting participants will be informed of the VMR and the Meeting Server URL. Both pieces of information can be inserted into a calendar invitation for the meeting. There are also a number of ways that this information can be inserted into the invitations, including, but not limited to: Next-Gen Scheduling; Outlook scripts; direct user insertion of the meeting URL or VMR into the invitation; and inclusion of a user's meeting URL in an e-mail signature. In at least one embodiment, a BYOD control application (e.g., application 1539 in FIG. 15, etc.) can work with the Scheduling Service (e.g., the scheduling service in the management services layer 1606, etc.) to enable the user to initiate a meeting and to select participants. Meeting invitations can then be sent, using Exchange (e.g., the exchange server 1613 in FIG. 16, etc.), for example. In at least one embodiment, information which needs to be sent from the room equipment (e.g., room endpoint/device 1621, etc.) to the BYOD control device (e.g., the device 1619 of FIG. 16, etc.) through a discovery mechanism 1617, can use an RPRM as discussed above. Alternatively, a Location Manager Service (e.g., the location manager in the management services layer 1606, etc.) can be used. Other discovery mechanisms 1617 are also possible.

In at least one embodiment within this disclosure, a Location Manager can store a list of services for a specific room equipment and BYOD combination. For example, the location manager in the management services layer 1606 stores a list of services for the combination of room equipment 1621 and BYOD control device 1619. In the event a BYOD control device connects to this service, the service can send the user's credentials and a Device ID identifying the room equipment to the CCE Service interface (e.g., interface 1603, etc.). The CCE Services Interface can request the list of services from the Location Manager and the Location Manager can return the list of services which are available to the specific user for that specific room equipment. In at least one embodiment, a Location Manager can be responsible for applying policies based on the needs or identity of the user who owns the BYOD control device.

In at least one embodiment, a Location Manager can enable devices, such as room endpoint/device 1621 (e.g., Group Series systems, other audio/video conferencing base stations, etc.) and user devices 1619 (e.g., phones, laptop, other portable computer systems, etc.) to register to the infrastructure with unique identifiers which identify a particular device and the organization to which they belong. A Location Manager can also enable devices to identify their device type and version so that proper services are delivered to those devices. A Location Manager can support other devices and services, such as, for example, utilizing content from a content pod.

In at least one embodiment, a CCE Services Interface (e.g., interface 1603, etc.) can work with other infrastructure components such as an endpoint (EP) Control Application, a Meeting Control Application, etc., to establish a list of services available to a controlling BYOD device. Application 1539 of FIG. 15 can include at least one of an EP control application or a meeting control application. A CCE Services Interface can communicate this list of services to BYOD devices when they make a request for the list on the Services URL. A CCE service can provide a level of indirection so that the services available to BYOD control devices can be modified and enhanced after they are installed. In at least one embodiment, a CCE Services Interface can distribute the load across multiple servers and geographies, thus providing scalability. A CCE service also act as central connection point for BYOD controlling user devices and can send messages to proper service connections.

At least one embodiment within this disclosure can use a 'read calendar' service (e.g., the Read calendar service illustrated in application services layer 1604, etc.). One purpose of this service is to enable BYOD clients to access a calendar (e.g., the calendar in the management services layer 1606, etc.) on behalf of the user and to obtain current meeting information. This service can thus provide an alternative to having the client application directly read the calendar on the user's device (in other words, client-side integration).

At least one embodiment within this disclosure can utilize an EP control service (e.g., the Room EP ctrl service illustrated in application services layer 1604, etc.). An EP control service can provide endpoint control functionality to controlling BYOD devices such as endpoint mute, endpoint dialing, endpoint volume control, etc. An EP control service can provide a relay service, obviating the need for user devices to connect directly to room equipment.

At least one embodiment within this disclosure can use directory services and contact services. Examples of directory services are AD and DNS 1615, which are illustrated in FIG. 16. These components can enable BYOD control devices to access a directory of users and rooms which can be called, and provide the contact list for the user of the BYOD control device. A BYOD control device (e.g., device 1619, etc.) can command the controlled room equipment (e.g., endpoint 1621, etc.) to dial a directory entry or a contact entry.

At least one embodiment within this disclosure can include a 'media control' component (not shown in FIG. 16). One purpose of the meeting control component is to provide conference control functionality to controlling BYOD devices such as layout control, etc. Media control can enable roster viewing by a BYOD device. Media control can provide management functionality to BYOD control devices such as the ability to: 1) view the entire roster, 2) mute participants, 3) view the participant's access privileges, as 4) view the active speaker and other functionality. Media control can enable BYOD control devices to start and stop meeting recording, and to view a current status of one or more recordings. In at least one embodiment, this component can also include meeting synopsis functionality, including the ability to create a summary of a meeting and to add it to a meeting invitation, and thereafter send the invitation in an email or other format to all participants and/or post the invitation in a web site.

At least one embodiment within this disclosure can utilize and/or implement a side-band collaboration service (e.g., the chat illustrated in the application services layer 1604, etc.). A side-band collaboration service can enable side-band functionality such as chat, private-chat, and the like, thereby enabling meeting participants to (virtually) "raise their hand" to ask a question, or make a comment, etc., as would be done in a regular in person meeting.

Figure 17:
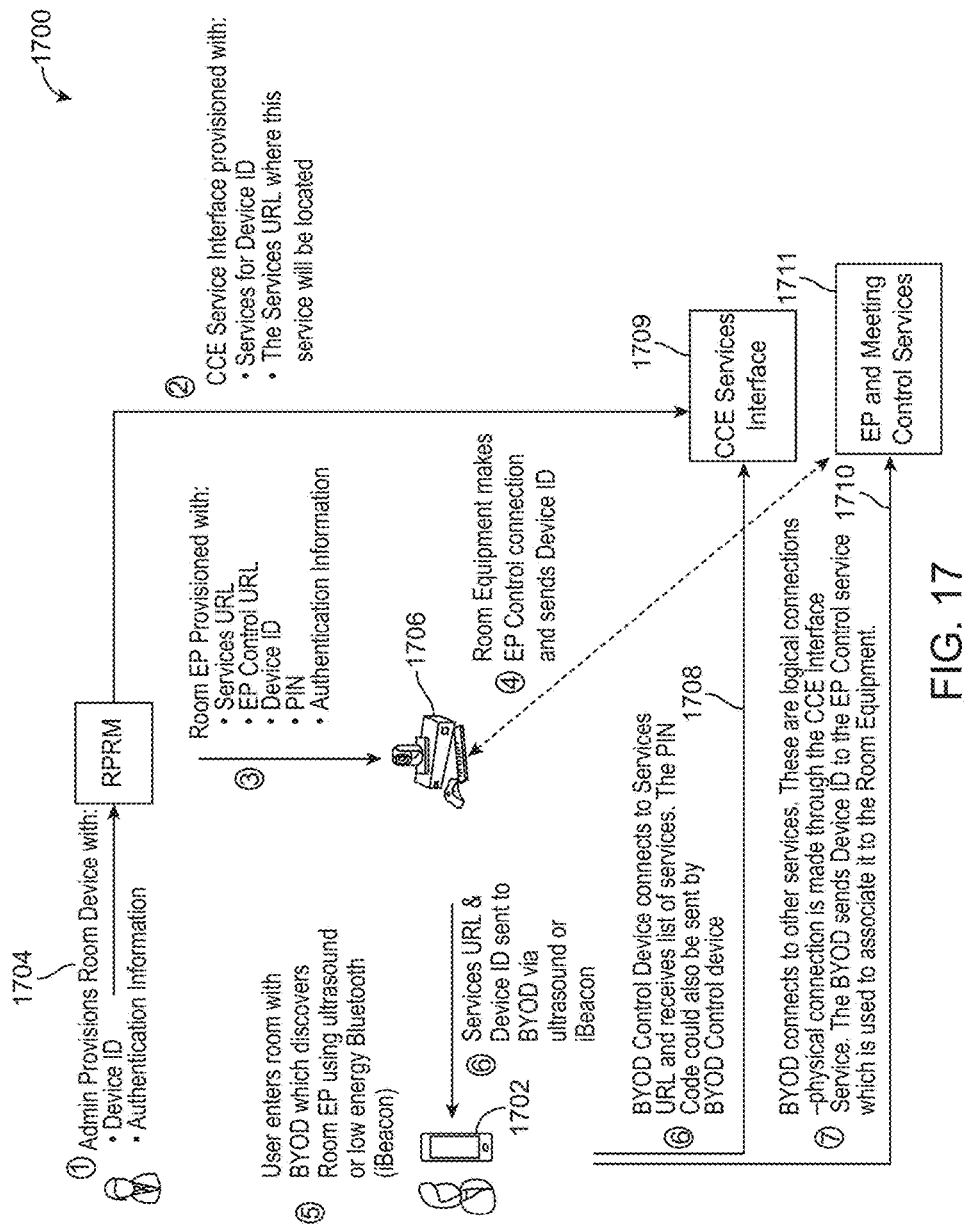
FIG. 17 illustrates an automatic BYOD discovery process.

FIG. 17 illustrates an automatic BYOD discovery process 1700. In one embodiment, operation 1 of the discovery process 1700 includes an administrator (or other equivalent entity) provisioning the room device 1704 with its Device ID and/or authentication information. In this way, when the BYOD control device 1702 enters the vicinity of the room device 1704, an authentication operation can be used to enable the room device 1704 and the BYOD control device 1702 to communicate with each other. Next, operation 2 of the discovery process 1700 includes an administrator (or other equivalent entity) provisioning the CCE service interface 1709 with services for the Device ID that corresponds to the room device 1704. This provisioning generally includes providing a URL for a location of the authorized services. At operation 3 of process 1700, an administrator (or other equivalent entity) provisions the room endpoint 1706 (if the room endpoint 1706 and the room device 1704 are separate). Here, the room endpoint 1706 is provisioned with the services URL described above, an endpoint control URL, a Device ID, a PIN, and/or authentication information. The room device 1704 connects to the room endpoint 1706 and transmits its Device ID to the room endpoint 1706, as shown in operation 4 of process 1700.

As discussed above, according to at least one embodiment, when a user enters a room with a BYOD control device 1702 such as a smart phone, tablet or PC, that BYOD control device will discover the room endpoint 1706, through a beacon emitting a signal, as shown in operation 5 of process 1700. The beacon for the room endpoint 1706 may be implemented with ultrasonic communication, Bluetooth Low Energy (BLE), or any other connection implementation of similar scope and capability. Operation 6 of process 1700 includes the BYOD control device 1702 receiving the services URL from the CCE service interface 1709, the Device ID from the room device 1704, and/or the Device ID from the room endpoint 1706. In operation 6, the BYOD control device 1702 also connects (indirectly) to the room endpoint 1706 in order to control it. A CCE solution can include two mechanisms to enable the endpoint discovery. For example, an "automatic discovery" process can utilize an enhanced ultrasonic mechanism as shown in FIG. 17. The automatic discovery process can be performed according to one or more of the descriptions provided above in connection with FIG. 4.

Upon discovery, a receiver controller (not shown) recognizes the BYOD control device 1702, determines if the BYOD control device 1702 has been provisioned, and joins it to the telepresence system. The telepresence system provides the BYOD device 1702 with a list of services 1708 available to the user based on the provisioning, as shown in operation 6 of process 1700. The BYOD device 1702 provides the telepresence system with other registration information 1710 to facilitate interactivity with other room equipment, as shown in operation 7 of process 1700. For example, the BYOD control device 1702 sends its Device ID to an endpoint and meeting control service 1711 which is used to associate the BYOD control device 1702 with the room endpoint 1706 and/or the room device 1704.

Figure 18:
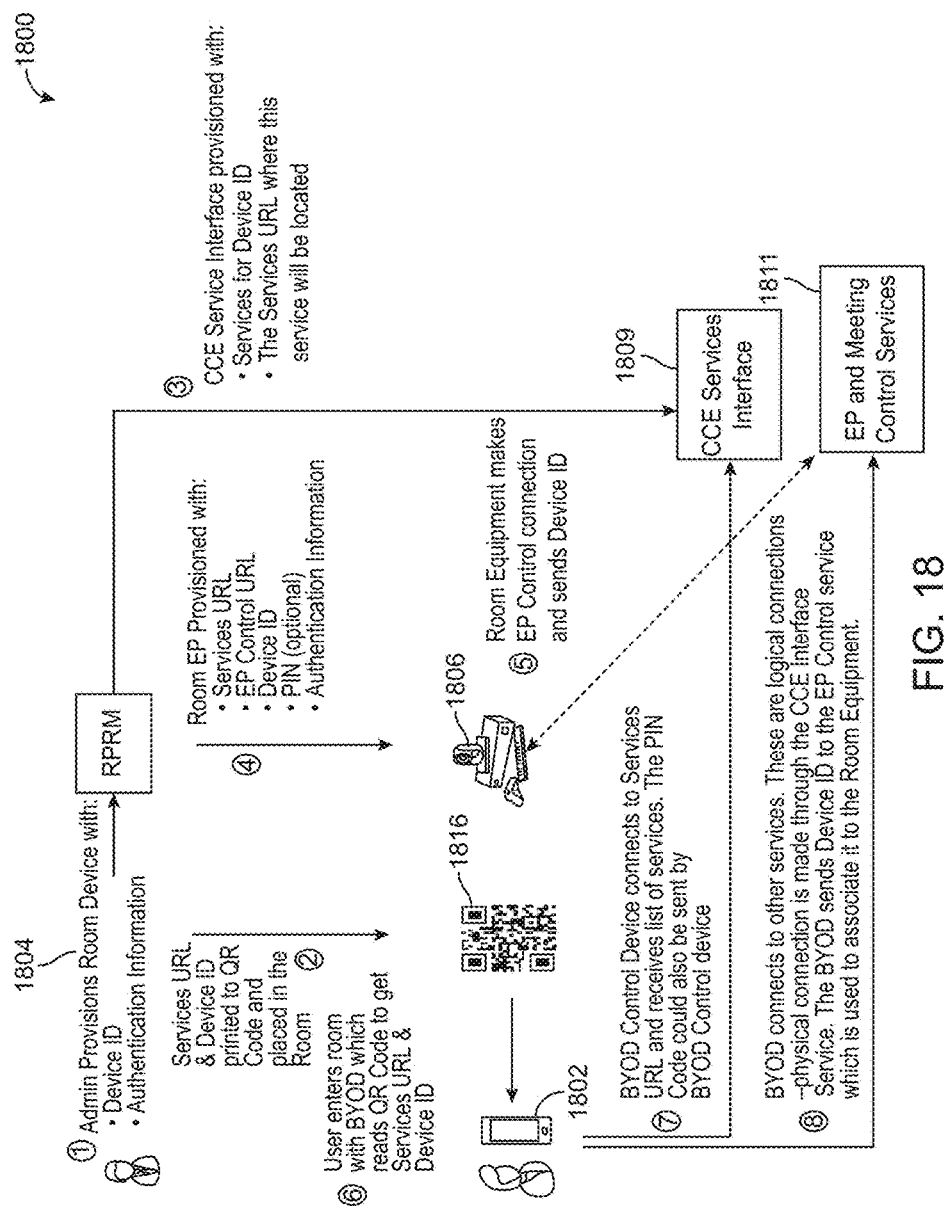
FIG. 18 illustrates a manual BYOD discovery process.

FIG. 18 illustrates a 'manual' BYOD discovery process 1800 that includes one or more QR codes 1816, which can be used instead of, or in addition to, the automatic process 1700 illustrated in FIG. 17. Process 1800 is similar to the process 1700 described above in connection with 17. For the sake of brevity, only the differences between process 1800 and process 1700 are described below in connection with FIG. 18.

One difference between the process 1800 and the process 1700 is that the manual process 1800 includes additional operations, which require the user to perform one or more actions in conjunction with the BYOD control device 1802. As shown in operations 2 and 6 of FIG. 18, the user utilizes the BYOD control device 1802 to scan a QR code 1816. The QR code 1816 may be the product of the provisioning process. An advantage of this approach allows for location-based pre-authentication, where all BYOD control devices 1802 in scanning proximity may be pre-authenticated through one mechanism, thereby simplifying administration of the system. Other discovery mechanisms, such as NFC tags, are also possible. With regard to QR codes 1816, an RPRM can include an administrative application which enables administrators to create and print QR code placards based on a services URL and device ID.

Figure 19:
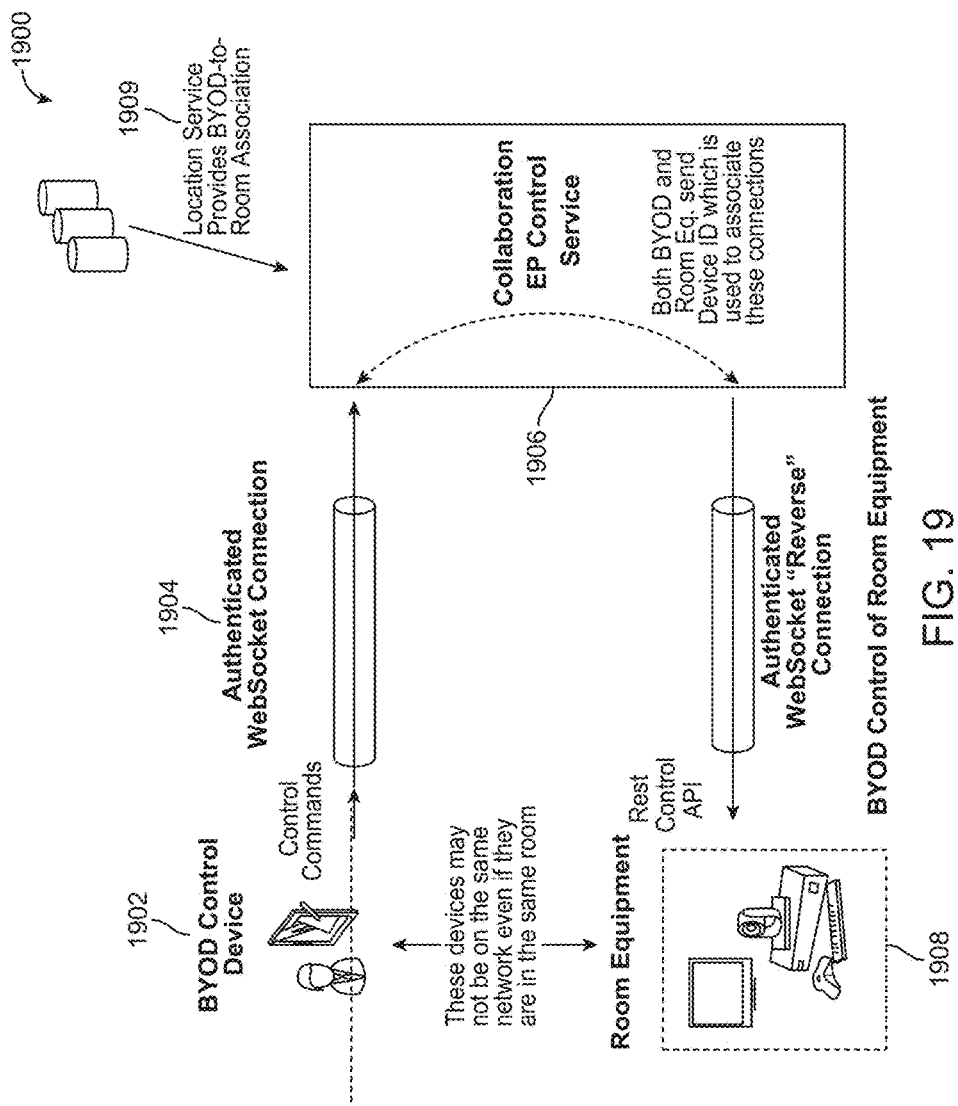
FIG. 19 illustrates BYOD control device controlling a room endpoint.

FIG. 19 illustrates a process 1900 in which a BYOD control device 1902 will control a room endpoint/device 1908 (or room equipment 1908). This process is defined in terms of the logical service components shown in FIG. 16. This has the advantage of allowing the BYOD control device 1902 to not be logically on the same network as the telepresence room equipment 1908. In one embodiment, this would allow for users on a "guest" WiFi network the ability to join a telepresence session without the "core" network, on which the room equipment 1908 resides, being compromised. The control commands necessary to connect the BYOD control device 1902 may be transmitted through an authenticated WebSocket connection 1904. The Web Socket connection 1904 may include encryption to maintain data security.

The collaboration EP control service 1906 associates the authenticated BYOD control device 1902 utilizing the provisioning data described above. The provisioning data includes data to associate BYOD control device 1902 with the telepresence room equipment 1908 that may be residing on another network. The association data may include the pairing of unique device IDs. The collaboration EP control service 1906 then updates the telepresence room equipment 1908 with the authenticated BYOD control device 1902. The service 1906 can also function in conjunction with one or more location services 1909 to provide BYOD-to-Room-Equipment association.

Figure 20:
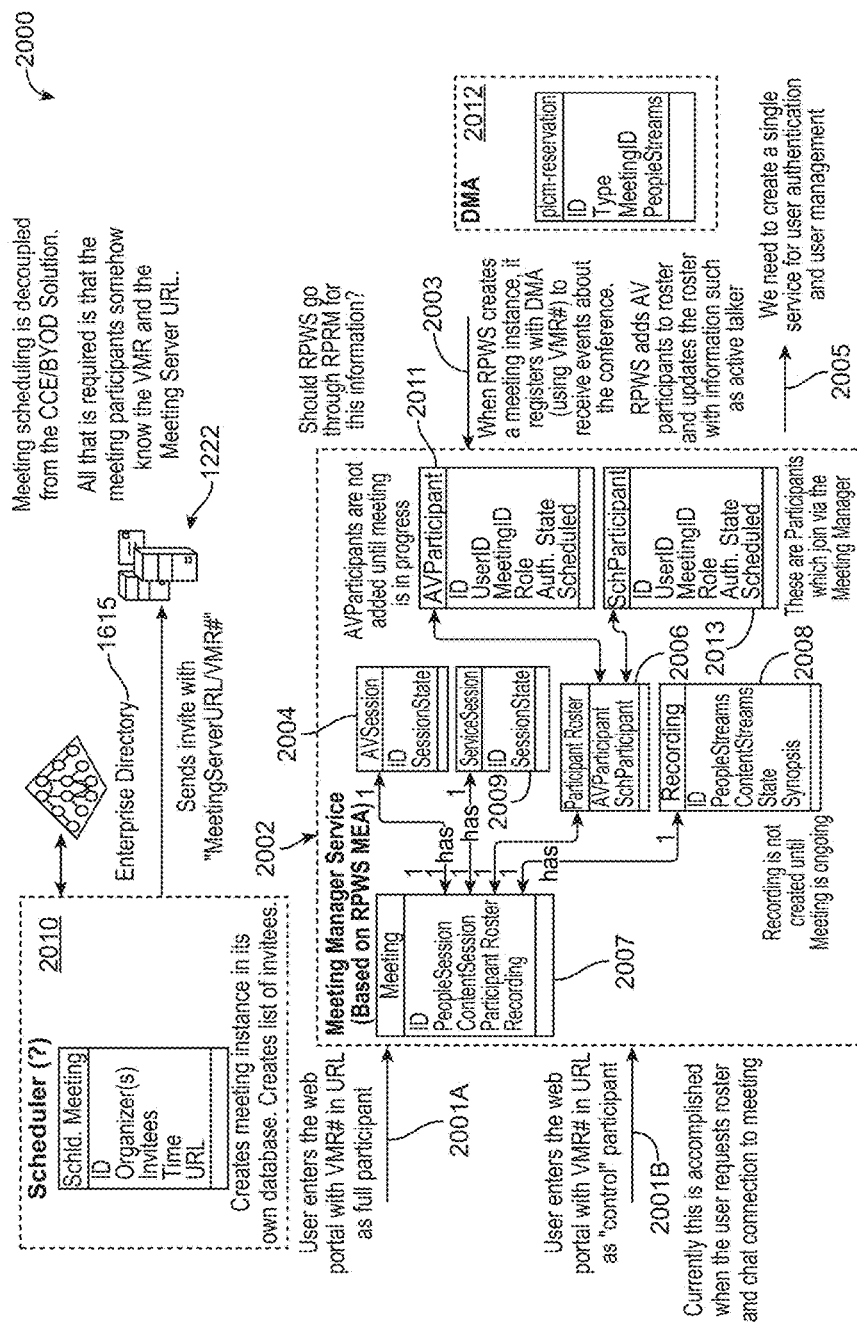
FIG. 20 illustrates mechanisms for creating meetings.

Referring now to FIG. 20, which illustrates a scheduling service and meeting manager service 2000 to create and/or manage meetings. These meetings can include content sessions and/or concurrent people (audio/visual) sessions. In one embodiment, an RPWS server (e.g., any RPWS server described above in connection with at least one of FIGS. 1-19, etc.) implements the service 2000. For a further embodiment, the RPWS server implementing the service 2000 operates in conjunction with the RPRM server (as described above in connection with at least one of FIGS. 1-19) to create and/or manage meetings. In other words, the meeting manager service 2002 creates and/or manages meetings, as illustrated in FIG. 20, and may be implemented in numerous ways. Consequently, FIG. 20 is intended to be illustrative (as oppose to exhaustive) of the relationships between various data objects to implement the meeting manager service 2002. For example, the meeting manager service 2002 may be implemented as a relational database schema, or as class objects to be instantiated by an object oriented language such as C++. Member objects pertaining to relevant characteristics include Meetings Data 2007, audio/video (AV) Sessions 2004, Service Sessions 2009, Participant Roster 2006, AV participants 2011, Scheduled Participants 2013, and Recordings 2008. Further member objects of those high level objects define the structure for supporting the meeting manager service 2002.

In one embodiment, the service 2000 is decoupled from its CCE/BYOD solution. Specifically, and in this embodiment, all that is required is that the meeting participants are aware of the VMR's existence (e.g., a VMR identification, a VMR#, etc.) and have the meeting server's URL. In one embodiment, the service 2000 includes a scheduler 2010, which creates a meeting instance (that includes a list of invitees) in its own database. This scheduler 2010 can transmit a communication to the invitees that includes the meeting instance, the VMR's existence, and/or the meeting server's URL. The communication sent by the scheduler 2010 can be sent via an email server 1222, which is described above in connection with at least FIG. 12. In one embodiment, the scheduler 2010 receives information about the invitees from a server 1615 that provides directory services and contact services. Directory and contact services are described above in connection with at least FIG. 16.

Meeting participants can enter a VMR created by the service 2000 in one of two ways, as shown by operations 2001A-B. In one embodiment, operation 2001A includes a meeting participant entering the VMR via a web portal as a full participant. Here, the participant uses the VMR's identification information, such as a VMR number (VMR#). As a full participant, the user can participate in the conference held in the VMR, but the user does not have any control over the room endpoints/devices. On the other hand, a meeting participant can enter the VMR as a control participant that has control over the room endpoints/devices (as shown in operation 2001B). In some scenarios, there is only one control participant in each meeting. In one embodiment, operation 2001B is performed in response to the participant requesting a roster of the participants and requesting chat connection to the meeting.

As shown in operation 2003, the RPWS server implementing the service 2000 registers the created meeting with a DMA 2012 in response to operations 2001A-B. The DMA 2010 is similar to or the same as the DMA 430 or the DMA 1611 described above in connection with FIGS. 4 and 16, respectively. In one embodiment, the RPWS server implementing the service 2000 adds meeting participants to the meeting's roster. In a further embodiment, the RPWS server also updates with additional information about each participant, such as the participant's status as a full or control user, whether the participant is an active talker, etc.

For one embodiment, operations 2001A, 2001B, and 2003 are performed in conjunction with operation 2005. This operation 2005 includes one or more actions performed by user authentication and management service to protect against security vulnerabilities (e.g., man-in-the-middle attacks, unwanted intrusions from uninvited or malicious users, etc.).

Figure 21:
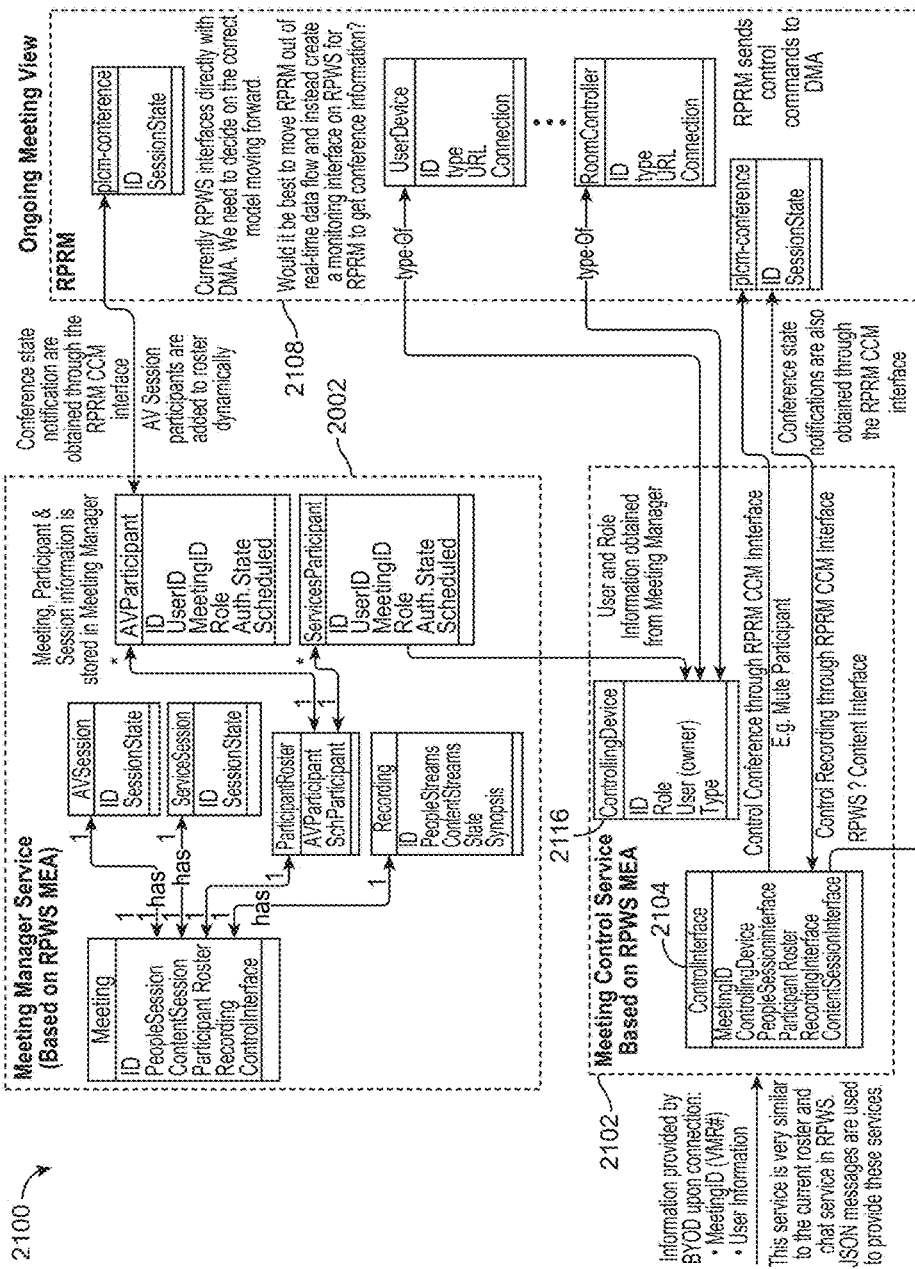
FIG. 21 illustrates object model and interfaces for a meeting control service and a meeting manager.
Figure 21:
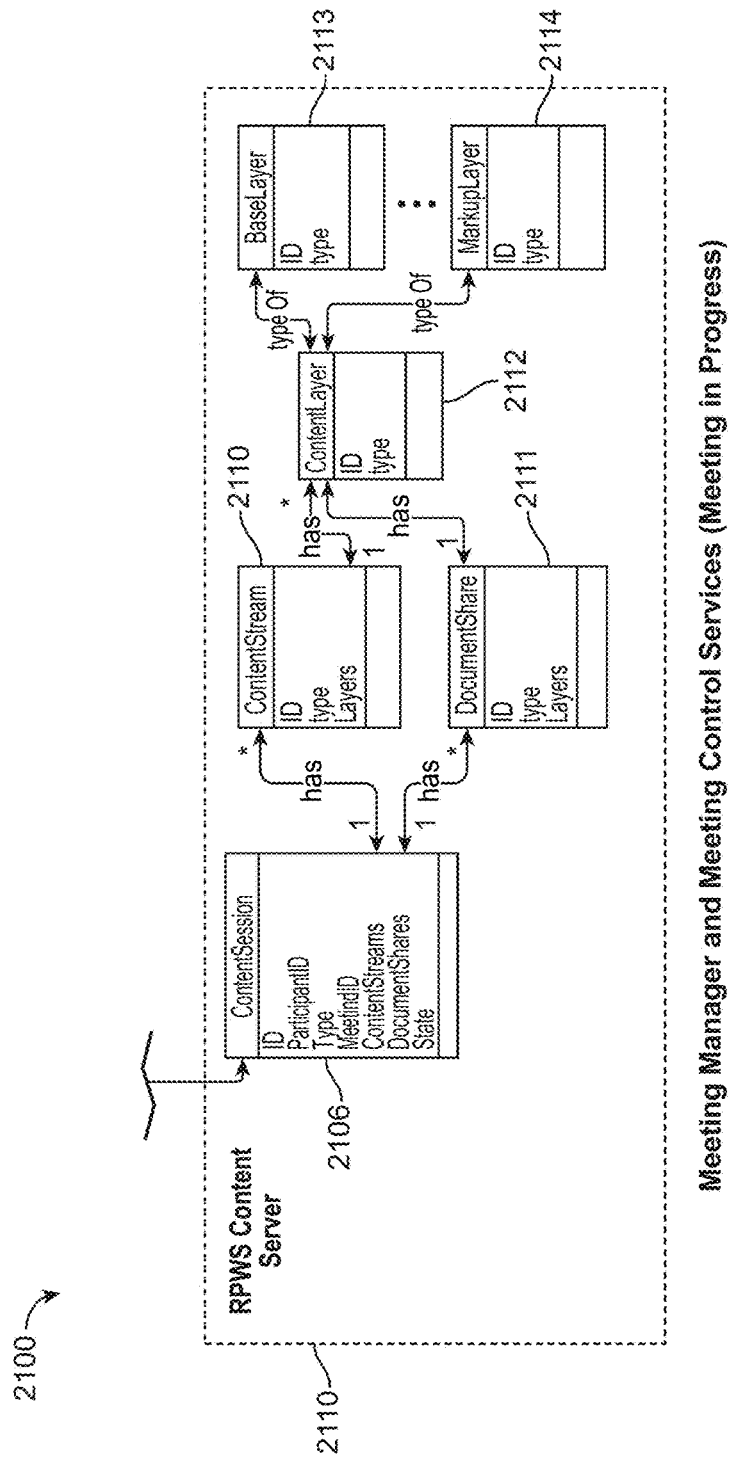

With regard now to FIG. 21, which illustrates a technique 2100 of creating a meeting. At least one embodiment of technique 2100 utilizes a meeting control service 2102 and a meeting manager service 2002 to, among other things, create a meeting. Each of the meeting control service 2102 and the meeting manager service 2002 can be implemented by an RPWS server 2110. As shown in FIG. 21, the services 2002 and 2102 are separate from the RPWS server 2110. This separation, however, is merely conceptual so as to show that the services 2002 and 2102 are distinct from the other functionalities of the RPWS server 2110. That is, and in one embodiment, the RPWS server 2110 implements the services 2002, 2102, and the object models 2106, 2110, 2111, 2112, 2113, and 2114. The RPWS server 2110 is similar to or the same as any of the RPWS servers described above in connection with at least one of FIG. 1-20.

Each of a meeting control service 2102 and a meeting manager service 2002 can involve an object model and interfaces, such as those shown in FIG. 21. The service 2002 is described above in connection with at least FIG. 20, so it is not described here for brevity. The meeting control service 2102 may include a Control Interface 2104 member object. The Control Interface 2104 aggregates all of the necessary information required to interface between the various components of a conferencing system. For example, the Control Interface 2104 receives information about the meeting (e.g., VMR identification, the user information, the device information, etc.) when the BYOD device connects to a VMR. The Control Interface 2104 maintains handles to the RPRM server 2108, which manages the video conferencing components. Additionally, the Control Interface 2104 member object maintains an instance to a Content Session 2106 that is a member object of the RPWS Content Server 2110. The RPWS Content Server 2110 handles shared digital objects that may be presented to users on their BYOD control devices via member objects 2106, 2110, 2111, 2112, 2113, 2114, and 2116. The RPWS content server 2110 can include more or less member objects than those illustrated in FIG. 21. For one embodiment, the Content Session 2106 manages digital shared objects for a current session.

The service 2102 may also include the Controlling Device 2116 member object. This member object includes information about the BYOD device of a user that is in control of the room endpoints/devices. In one embodiment, the Controlling Device 2106 receives information from the meeting manager service 2002 and/or the RPRM server 2108 about the user, his/her device, and the user's role in the meeting.

As illustrated in FIG. 21, the RPRM server 2108 works in conjunction with the services implemented by the RPWS server 2110 to create and/or manage meetings. Other embodiments are not so limited. For example, and in one embodiment, the RPWS server 2110 (and its services 2002 and 2102) can interface directly with a DMA server to create and/or manage meeting.

Figure 22:
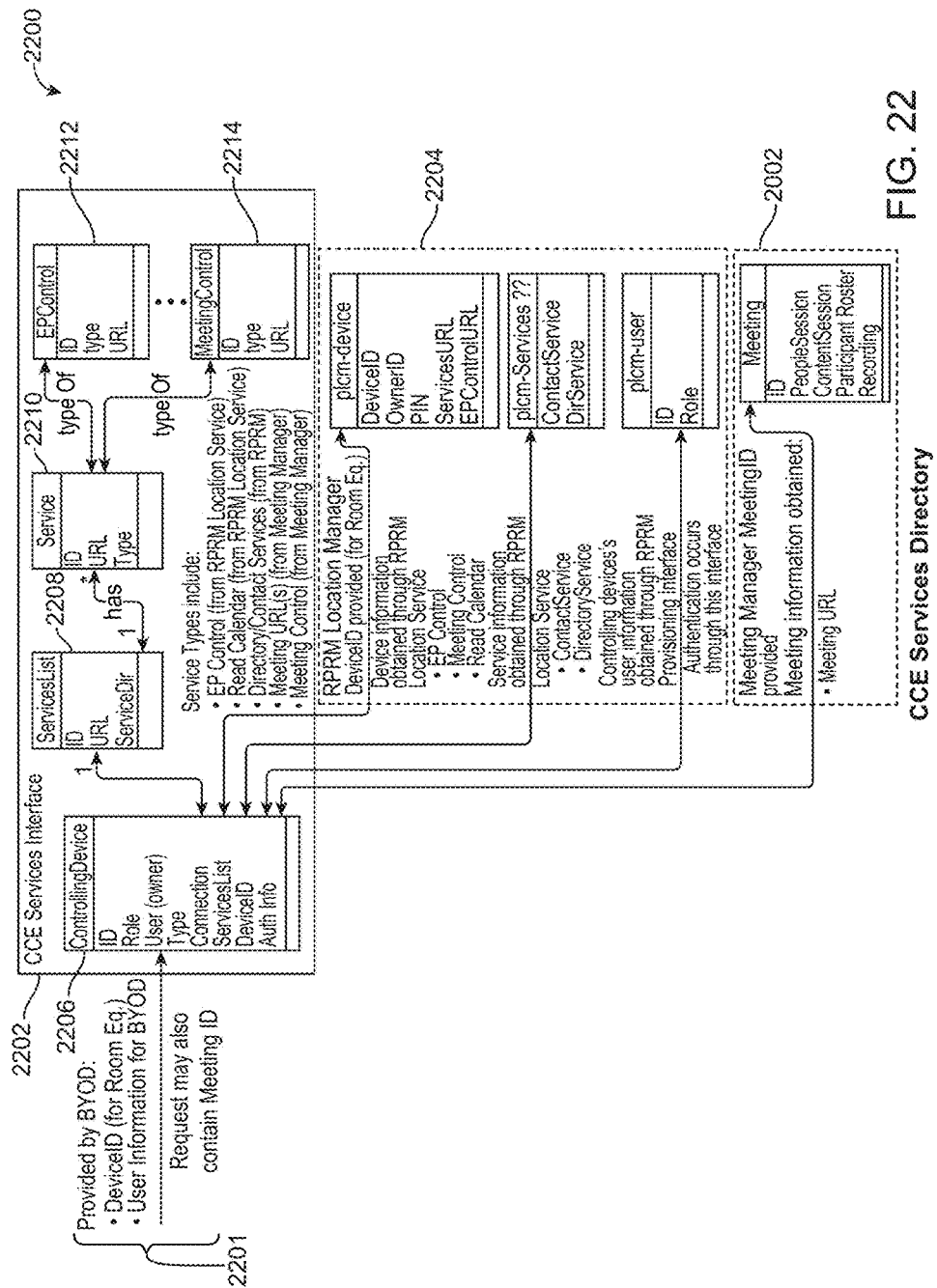
FIG. 22 illustrates an object and interfaces model for a location manager.

FIG. 22 illustrates a technique 2200 for establishing a list of services available to a controlling BYOD device. As shown, at least one embodiment of technique 2200 can include and/or utilize a CCE Services Interface 2202, a location manager service 2204, and a meeting manager service 2002. Each of these components is described above in connection with at least one of FIGS. 1-21, so they are not described again in detail.

In one embodiment of technique 2200, when a connection to a CCE Services Interface 2202 is made, the controlling BYOD control device can make a request for the list of services available to the BYOD control device and provide information required to facilitate this request (operation 2201). Upon receiving the request, the Interface 2202 can work with other infrastructure components such as the location manager 2204 and the meeting manager 2002 to establish a list of services available to a controlling BYOD device. This list can be returned to the BYOD control device via the Interface 2202. Examples of services in the list include, but are not limited to, endpoint control services, calendar services (e.g., read calendar, etc.), directory/contact services, meeting identification services (e.g., meeting URL, etc.), and meeting control services.

Interface 2202 can implement an object and interfaces model that includes at least one member object. For example, this model can include several member objects, such as the member objects 2206, 2208, 2210, 2212, and 2214. In a specific embodiment, the services provided by the interface 2202 are implemented at a top level by a Controlling Device member object 2206. This Controlling Device 2206 member object may implement relational information so that the BYOD control device may interface with the location manager 2204 and the meeting manager 2002. In one embodiment, the Interface 2202 is implemented by a CCE Services Interface system (e.g., the system 810 described above in connection with FIG. 8, the system 1210 described above in connection with FIG. 12, etc.).

With specific regard to the location manager 2204, which interfaces with the BYOD control device via the Interface 2202. The location manager 2204 can also implement an object and interfaces model that includes at least one member object (e.g., the plcm-device, the plcm-services, the plcm-user, etc.). In one embodiment, the location manager 2204 is implemented by an RPRM server (e.g., any of the RPRM servers described above in at least FIGS. 1-21, etc.). The location manager 2204 is similar to or the same as any of the location managers described above in connection with in at least FIGS. 1-21 (e.g., the location manager described above in connection with FIG. 16, etc.). In a specific embodiment, communication between the location manager 2204 and the BYOD control device occurs via the Controlling Device member object 2206. The communicated information includes, but is not limited to, the BYOD control device's information, authentication data, endpoint control information, meeting control information, calendar information, directory and contract information, and other service/meeting information provided by the RPRM server.

The meeting manager service 2002 is similar to or the same as at least one of the meeting manager services described above in connection with at least FIGS. 16-21. In one embodiment of technique 2200, the meeting manager 2002 implements an object and interfaces model that includes at least one member object (e.g., the meeting information object, etc.). In a specific embodiment, communication between the meeting manager 2002 and the BYOD control device occurs via the Controlling Device member object 2206. The communicated information includes, but is not limited to, the meeting URL, the meeting identification, data associated with the people streams, data associated with the content streams, the participant roster, and data associated with recorded meetings.

Figure 23:
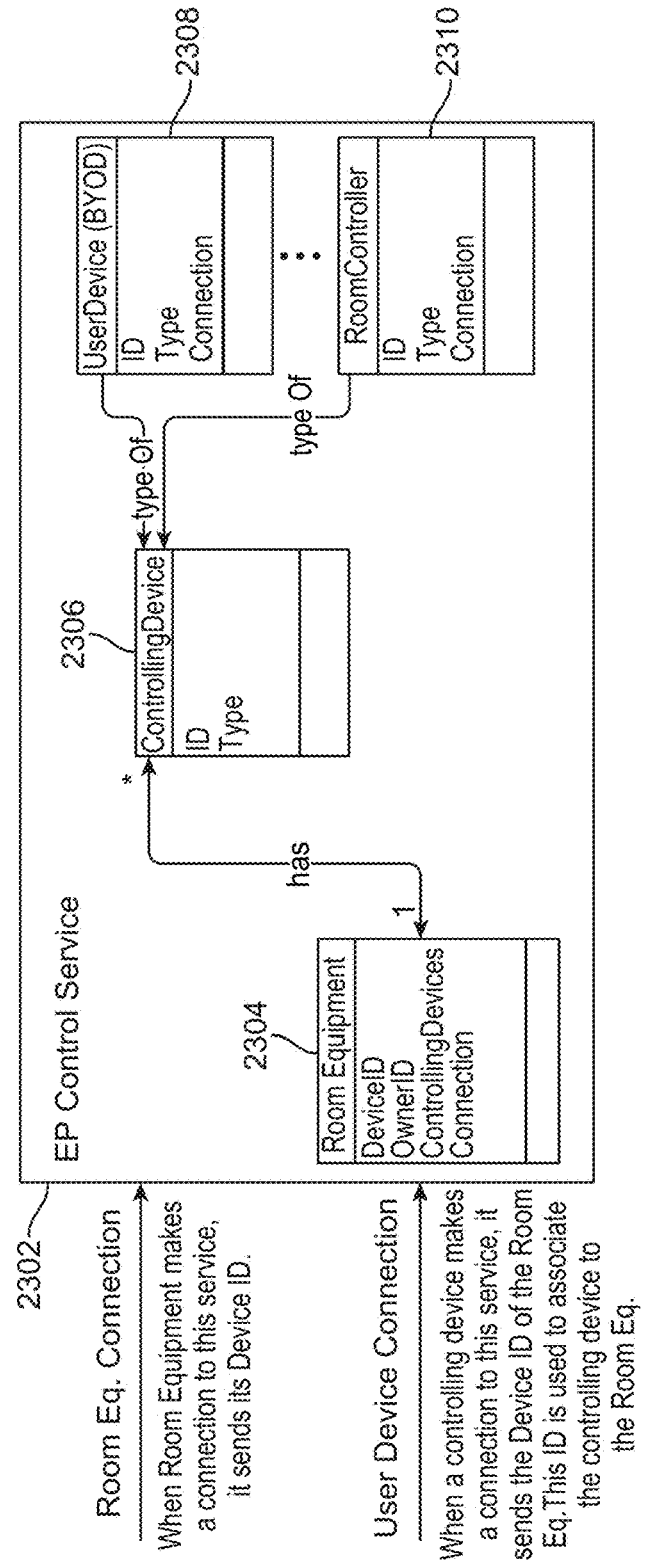
FIG. 23 illustrates an object and interface model for an endpoint control.

As described above, at least one embodiment of this disclosure can include and/or utilize an endpoint control service 2302. An endpoint control service can enable BYOD control devices to control meeting room equipment by making "logical" control connections between those devices and room equipment. Control functionality can include endpoint dial, endpoint volume control, endpoint mute, etc. An endpoint control service can implement an object and interface model like the one shown in FIG. 23. The endpoint control service 2302 includes a room equipment 2304 member object. This object has a composition of controlling device 2306 objects. Each controlling device 2306 has a type relating to the device on which it is implemented. For example, a controlling device 2306 may be a BYOD control device, or it may be the room controller which is present in the room equipment. The Controlling Device 2306 may be implemented as an abstract base class where the a UserDevice (BYOD) Object 2308 and a RoomController Object 2310 functionally are child classes to the Controlling Device 2306 and their interfaces are decided by the Controlling Device 2306. Additionally many other child objects of a "type of" relationship to the Controlling Device 2306 are possible with the inheritance model shown in FIG. 23.

Figure 24:
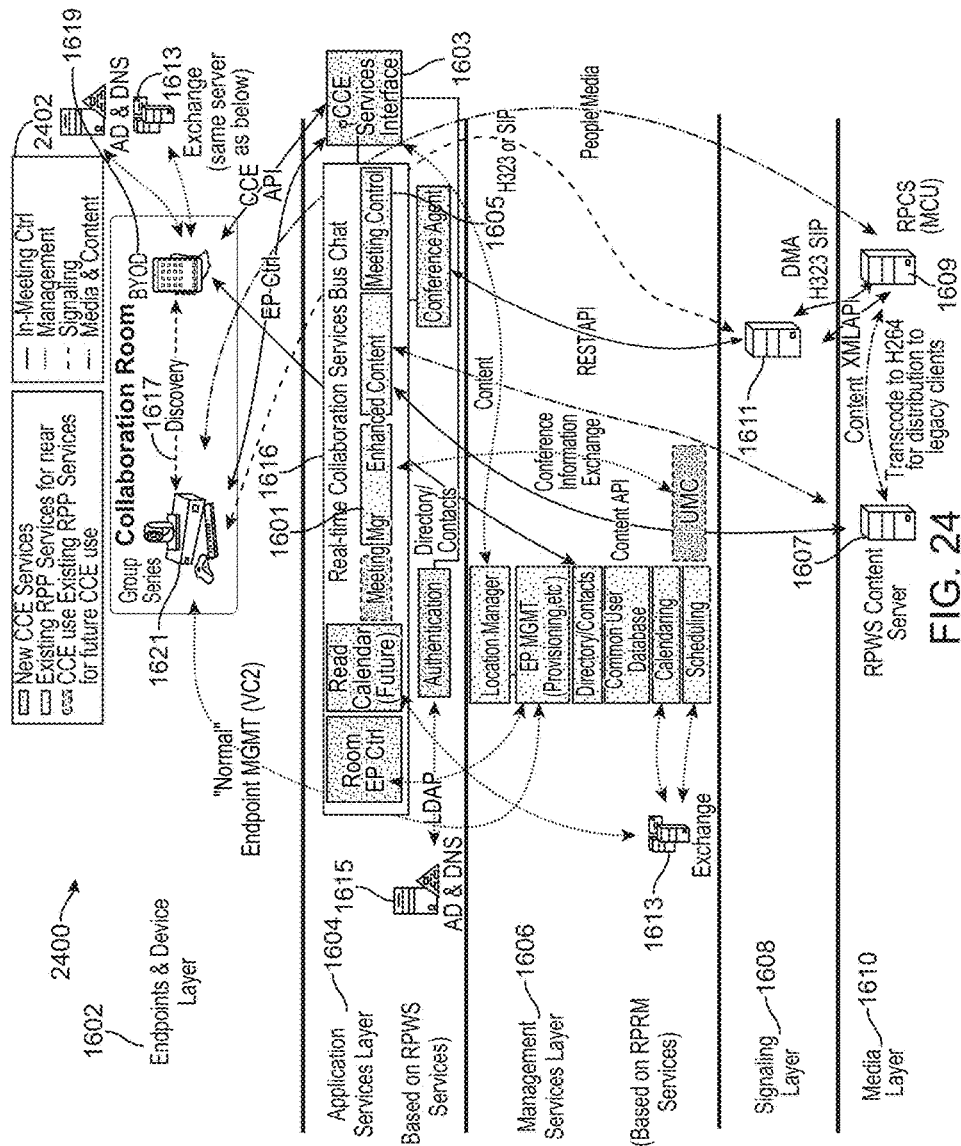
FIG. 24 illustrates the logical service components for leveraging web-based services in accordance with an embodiment of this disclosure.

Aspects of this disclosure can also include a 'read calendar' service. This service can work within the CCE Services Interface 1603 to enable BYOD users to access their calendar information. This service can implement an object model similar to that shown that shown in FIG. 16. However, the relationships between the system components are illustrated in FIG. 24.

Various connections between the components can be described in the legend 2402. Four types of communication types are identified: in-meeting control, management, signaling, and media and content. In-meeting control traverses the stack from the endpoints and device layer 1602 all the way down to the media layer 1610. End point control runs between collaboration room devices 1617, including the Group Series 1621 and the BYOD 1619, to the CCE Services interface 1603. Additionally in-meeting control also connects the RPWS content server 1607 and the enhanced content module of the real-time collaboration services bus 1616. The directory contacts of the management services layer 1606 connects to the real-time collaboration services bus 1616. Signaling connections connect the signaling components across the stack. The RPCS 1609 interfaces with the DMA 1611 by H323, or SIP signaling. Again the DMA 1611 signals the Group Series 1621 via H323, or SIP signaling. Media transport connections exist to provide media content up the stack. Media content begins in the media layer 1610 and connects the RPWS content server 1607 and the RPCS 1609. Media transport connects the real-time collaboration services bus 1617 and the RPWS content server 1607. Additionally the RPCS uses media and content transport to the Group Series 1621.

Management connections originate in the management services layer 1606 and connect the functional components in that layer to that of the application services layer 1604, as well as the Endpoints and device layer 1602. Management connections connect the exchange 1613 to the calendaring and scheduling components of the management service layer, as well as the calendar reading functionality of the real-time collaboration services bus 1616 and the BYOD 1619 in the collaboration room 1617. End point management module of the management services layer 1606 may also utilize management connections to interface with the real-time collaboration services bus 1616 and the Group Series 1621. The location manager module of the management services layer 1606 connects CCE services interface 1603 with management connective functionality.

Figure 25:
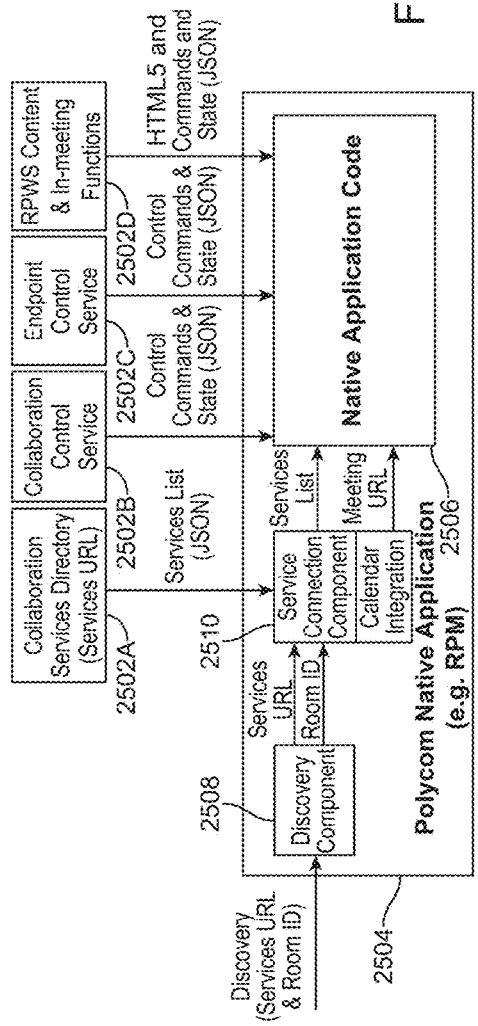
FIG. 25 illustrates a method of proving client functionality using native device applications.
Figure 26:
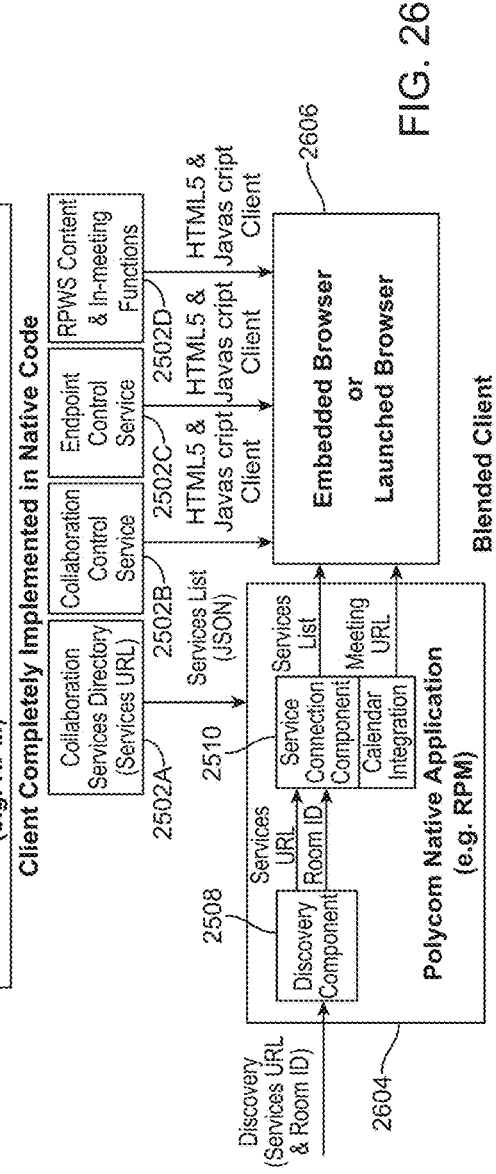
FIG. 26 illustrates a method of blending discovery and calendar functions.
Figure 27:
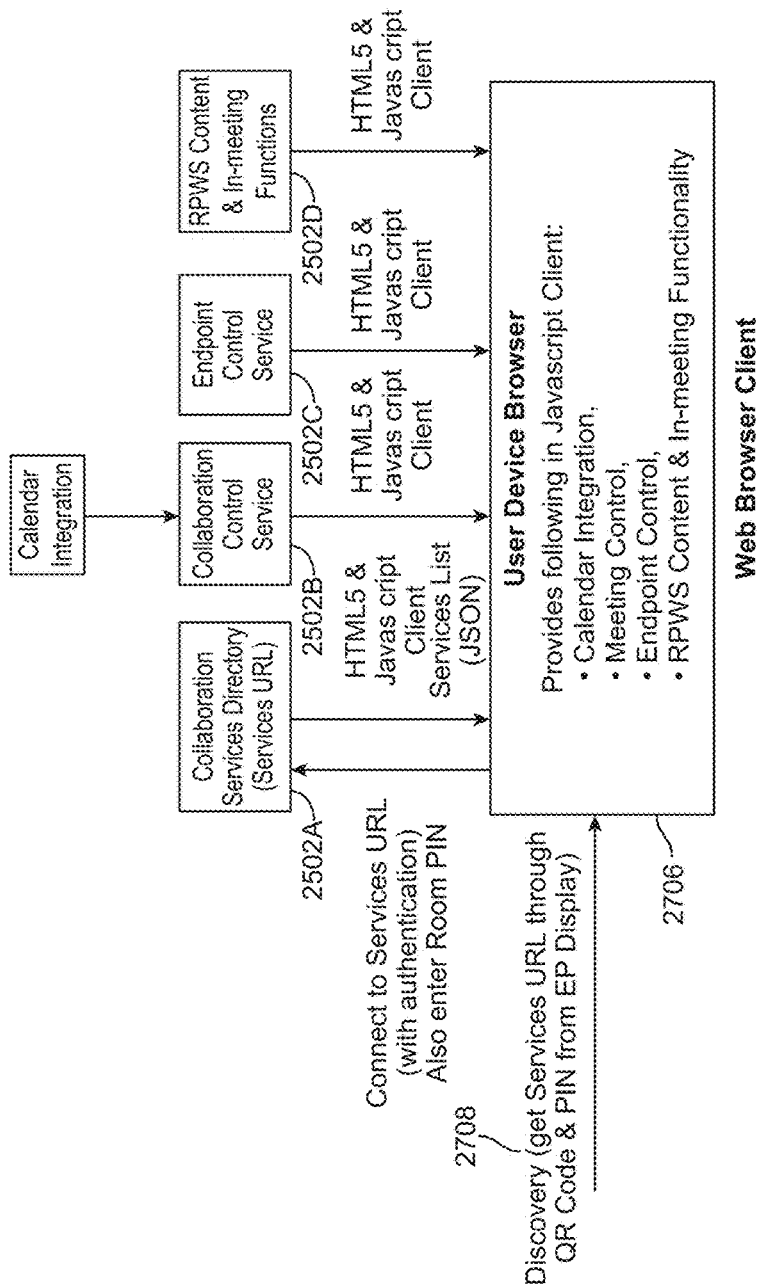
FIG. 27 illustrates a device discovery process requiring a user to pointing his device at a QR code.

In at least one embodiment of this disclosure, client functionality can be provided by implementing native device applications. This approach is illustrated in FIG. 25. Native device applications may include but are not limited to applications targeted for iOS, Android, Windows, macOS, OSX, or other mobile platforms. Similarly, the approach illustrated may be implemented in languages and APIs appropriate for their respective platforms. As illustrated in FIG. 25, the native application 2504 receives input from services for managing connections and content in a video conferencing system. These may include a collaboration service directory 2502A, a collaboration control service 2502B, end point control service 2502C, and a PRWS content and in meeting function service 2502D. Communication between the services 2502A-2502D may be implemented through JSON object payloads. Other communication protocols as well as the underlying transport layers may facilitate this functionality as well. A component of the native application 2504 includes native application code 2506, which provides the processing of any data provided by the service 2502A-2502D. Other services of the Native Application 2504, such as the discovery component 2508 and the service connection component 2510, may be included but provide APIs into the respective services 2502A-2502D that they receive data from, and my be common software libraries. A second approach is to use a blended client, in which the discovery and calendar integration may be implemented in native code. The native application 2604 can embed a browser or launch a browser 2606 so that the meeting control, endpoint control, and content are provided by Javascript client code, (for example). This second approach is illustrated in FIG. 26. Services 2502A-2502D may provided content similarly to FIG. 25. The embedded browser may take the approach of executing the default browser on the mobile platform, or it may use a web browser engine library such as WebKit, to implement the browser functionality. In a third approach, a web browser client 2706 can be made available in which device discovery 2708 requires a user to perform some action, such as pointing his device at a QR code. The QR code application could then launch a browser and direct the browser to the Services URL. Implementations of browser implemented QR scanning software may include the ZXing library. The user could enter a PIN for the room ID. Services 2502A-2502D may be implemented in the same manner as FIG. 25 and FIG. 26. This third approach is illustrated in FIG. 27.

In at least one collaboration and control experience (a telepresence meeting, for example), clients can use network infrastructure APIs to access many of the services described herein. It will be understood by a person of skill in the art that such APIs must be secure, meaning that the confidentiality, integrity and availability of the underlying services must be maintained. In order to maintain confidentiality and integrity, the solution can follow the practices illustrated in FIG. 28, that is using server-side transport layer security (TLS) connections, and utilizing an approved ID.

Figure 28:
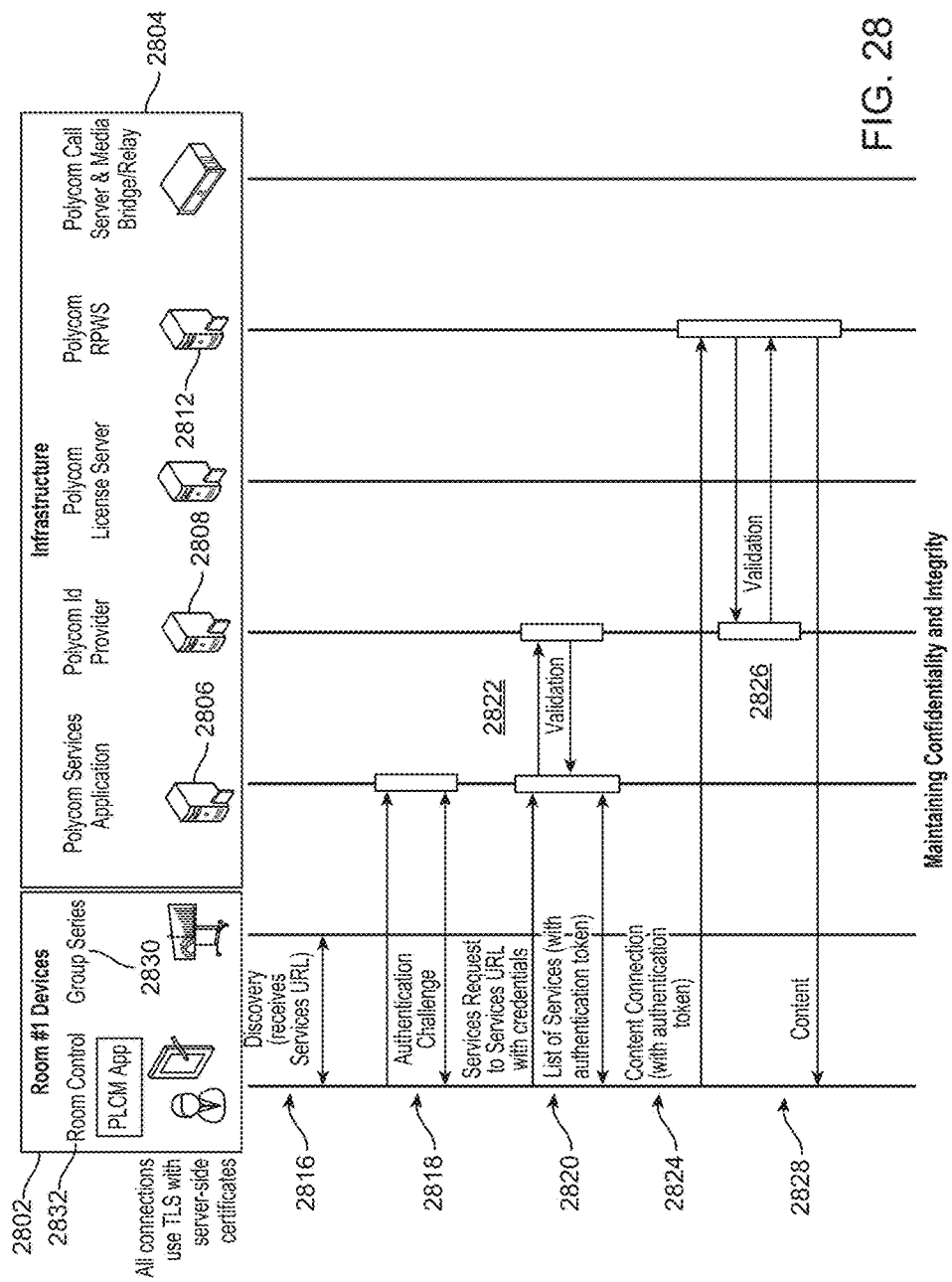
FIG. 28 illustrates practices for maintaining confidentiality and integrity for systems within this disclosure.

Illustrated in FIG. 28 are the actors and actions that may be utilized in establishing secure services. Room devices 2802 and Infrastructure 2804 may participate as actors in this process. Room devices 2802 may include devices capable of Room Control 2832 and telepresence device 2830. Room Control 2832 devices may include the PLCM App or BYOD control devices. Upon coming into proximity to the telepresence device 2830, a Room Control 2832 devices may be configure to emit signals for discovery 2816. As discussed above, discover 2816 between the Room Control 2832 and the telepresence device 2830 may be implemented via ultrasonic communication, Bluetooth, NFC, or any communication method operable to implement discovery 2816.

After discovery 2816 is complete, an authentication challenge 2818 may be undertaken. The authentication challenge 2818 may require the Room Control 2832 devices to interface with the Infrastructure 2804, particularly with an application services server 2806. This may be implemented utilizing the Room Control 2832 device's native application, web browser, or combination of the two as mentioned above to provide the Infrastructure 2804 authentication data. Service Requests 2820 may be sent to the application service server 2806 once the Room Control 2832 device has been authenticated. The application service server 2806 communicates with the Id provider server 2808. The Id provider server 2808 validates 2822 the services available to the requesting Room Control 2832 device. A list of services (with an authentication token) may be returned to the requesting Room Control 2832 device, via the application service server 2806. A content connection 2824 may be requested by the Room Control 2832 device. The request may be processed by the RPWS 2812. The processing of this request includes a validation 2826 step, and a content response 2828.

Figures 29, 30:
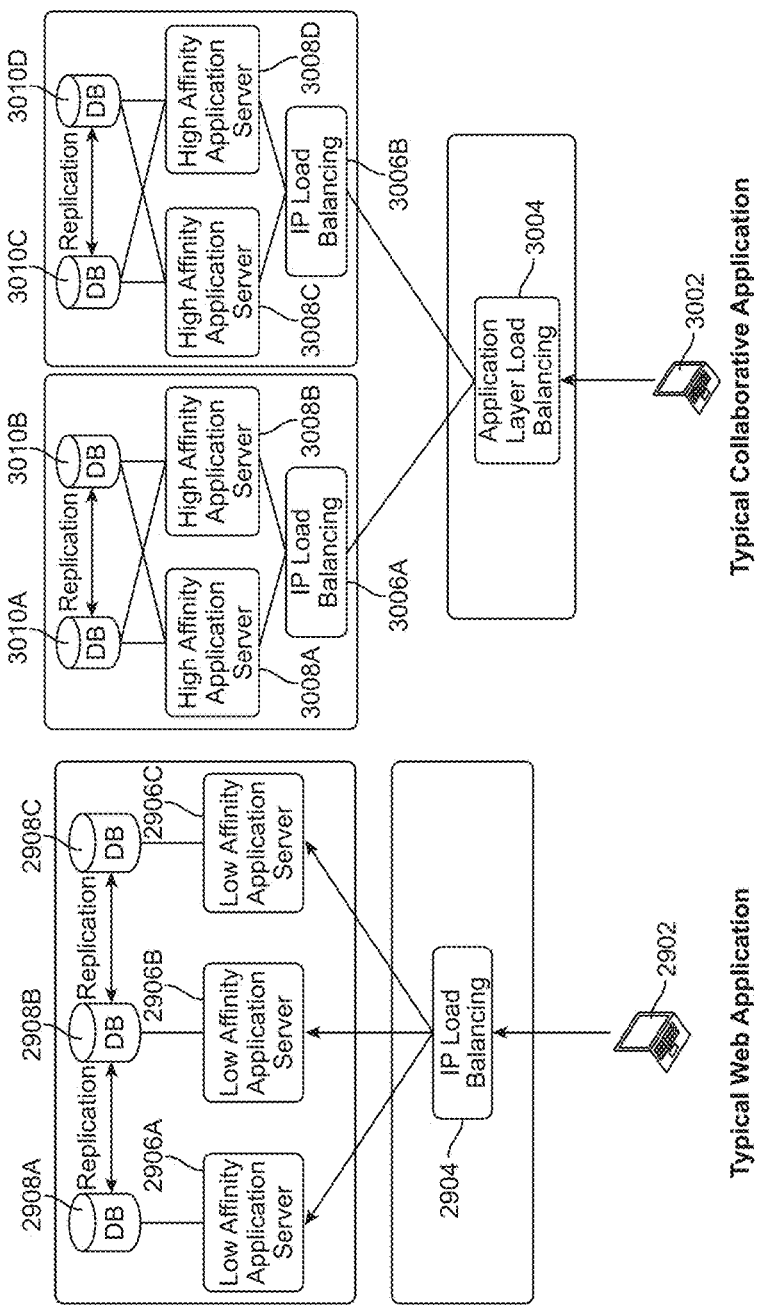
FIG. 29 illustrates an architecture of a typical web application.
FIG. 30 illustrates an architecture of a typical collaborative application.

Collaboration strategies and implementations within this disclosure can achieve scalability and availability of the collaboration equipment described in this disclosure. A collaboration service can require that a large amount of state information to be stored. All of clients participating in a particular session can have access to the same real-time information, which can mean that they need to be routed to the same server, or pool of servers. Finally, unlike web applications, collaboration requires bi-directional real-time media and events. Moreover, because web applications do not require that a large amount of state to be stored, they have low-affinity to a particular server, as shown in FIG. 29. This means that messages from a particular client can be routed to any server using IP-layer load balancing in a typical web application. A typical web application 2902 provides data to an IP load balancing module 2904 which may include load balancing at the transport layers of the OSI network model. This approach does not include any upper layer packet inspection, and the balanced traffic may be fed to a plurality of low affinity application servers 2906A-2906C. The data and states may be stored in logically attached databases 2908A-2908C, where database replication may be implemented for data and state integrity. Conversely, a typical collaborative application 3002 can require that a large amount of state to be stored, as illustrated in FIG. 30. The typical collaborative application required the maintaining and integrity of states, so high affinity application server 3008A-3008D may be necessary. The typical collaboration application 3002 provides data to the application layer load balancing module 3004. The application layer load balancing module 3004 may provide packet inspection as it balances OSI application layer data. Similar to FIG. 29, IP load balancing modules 3006A-3006B provide transport layer load balancing before providing data to the high affinity application servers 3008A-3008D. Again databases 3010A-3010D provide logically attached storage as well as data replication for the high affinity application servers 3008A-3008D. In addition, all the clients participating in a session can need access to the same state information. Thus, as shown in FIG. 31, clients must be routed based on application-layer information (i.e. the session ID) so that they can share state and data.

In at least one embodiment of this disclosure, high scalability and high availability can be achieved for collaboration services through the use of identifier-based load balancing so that the infrastructure will consists of pools of servers, wherein there is no need to share real-time information or data between the pools of servers. An architectural approach for achieving high scalability and high availability is illustrated in FIG. 31. Through the use of the application-layer routing mechanism, this architecture will enable all clients who are participating in the same session to be routed to the same pool of application servers. This architecture consists of a number of layers, including, but not limited to a front-end layer comprised of http websocket front-end pools 3104A-3104B, an application layer including redundant application pools 3108A-3108D, and a media layer of conference media pools 3110A-3110D.

Figure 31:
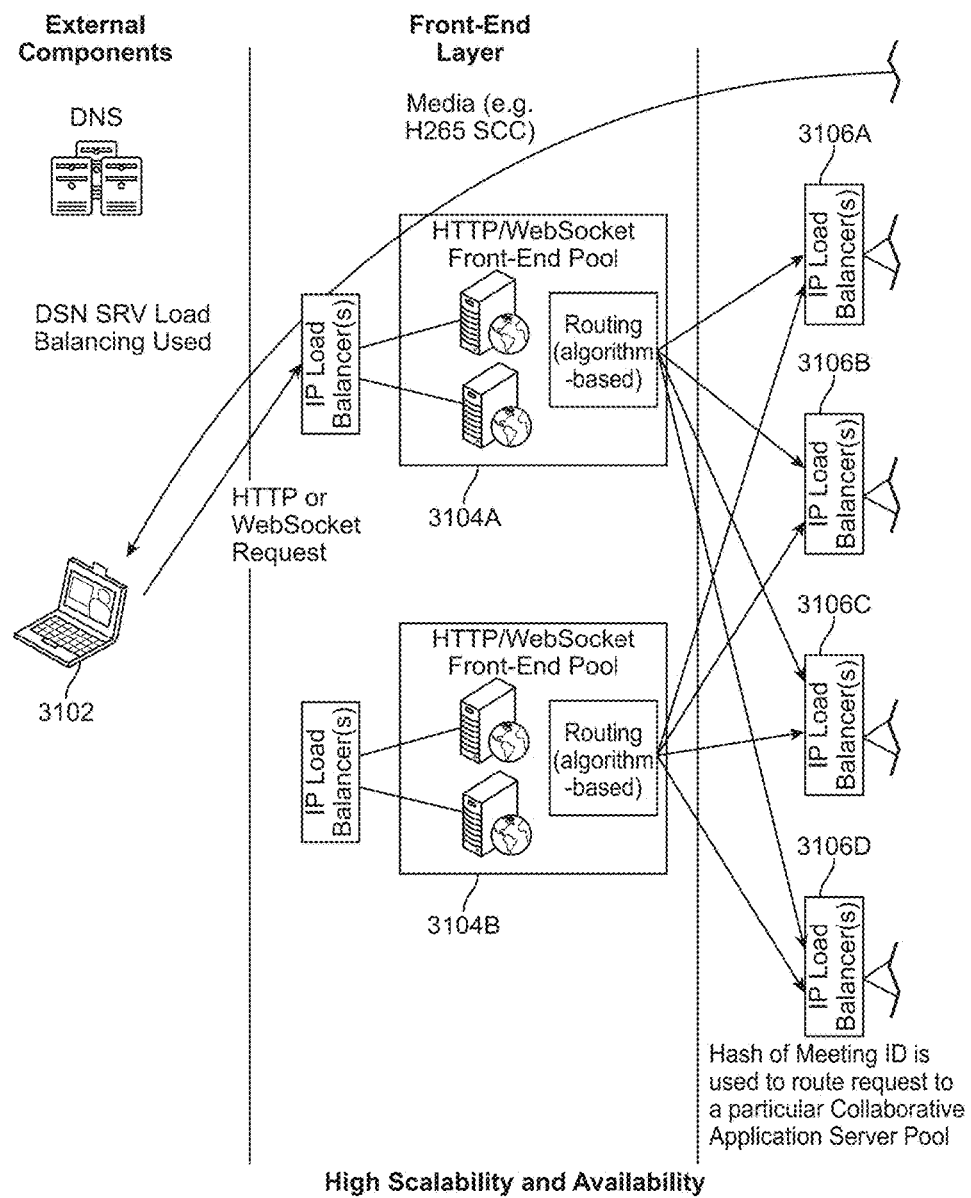
FIG. 31 illustrates an architecture of an example collaborative which provides high scalability and availability to users.
Figure 31:
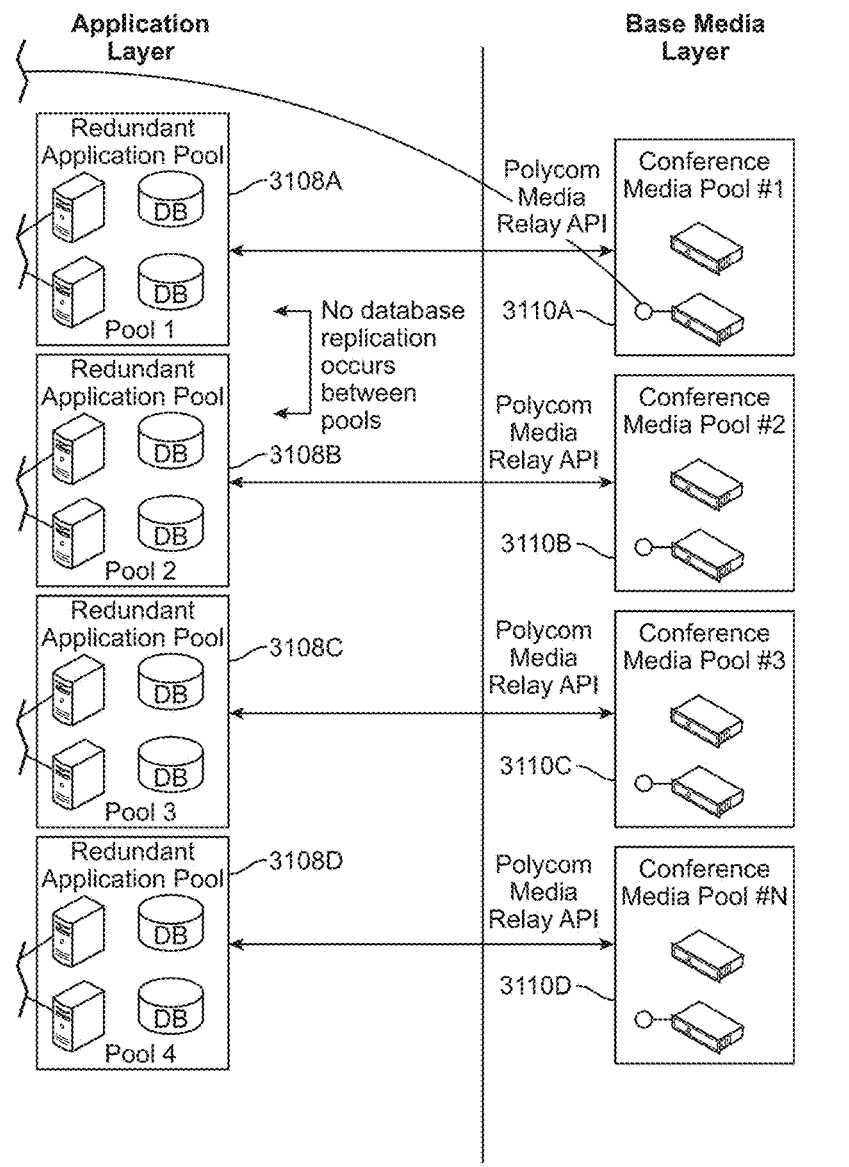

As shown in FIG. 31, a front-end layer can provide firewall traversal and security when receiving requests from external components such as a client 3102. The infrastructure can be designed such that a client 3102 can access the infrastructure through any HTTP websocket front-end pool 3104A-3104B. The load can be balanced between pools using domain name system (DNS) load balancing, which means that a client randomly selects one of the HTTP websocket front-end pools 3104A-3104B through which the client 3102 connects. Since in a collaboration service, it is necessary for all clients participating in a particular session to utilize the same server, messages can be routed from this layer to the next layer, using identifier-based load balancing. This then means that the redundant application pool 3108A-3108D to which messages will be routed can be based on a hash of the meeting (or session) identifier.

The application layer illustrated in FIG. 31 manages collaborative sessions, including the media resources, and all messages and events for the session. Since identifier-based load balancing is used to select a redundant application pool 3108A-3108D, even if clients for a particular conference session access the infrastructure through different HTTP websocket front-end pools 3104A-3104B, they will be directed to the same redundant application pool 3108A-3108D. Each redundant application pool 3104A-3104B can have redundant servers and shared databases. Thus, clients for conference session can be moved to a different server in the redundant application pool 3104A-3104B if one fails. The servers in a pool can be distributed geographically to improve availability and reliability. The databases can be supported by a highly scalable and available cloud database, such as Amazon S3 or RDS.

The base media layer illustrated in FIG. 31 provides Media Relay and transcoding capabilities for the infrastructure. Each redundant application pool 3104A-3104B can access and manage media resources through the Polycom Medial Relay API. High scalability in this layer can be achieved by using conference media pools 3110A-3110D for conferences rather than using transcoding engines. The conference media pools 3110A-3110D provide media services to the client 3102.

A media recording layer (not shown) can provide recording resources. In at least one embodiment, each media resources layer can access a pool of recording resources. A platform director can be used to add and remove recording resources when needed. In at least one embodiment, in order to achieve high availability, clients and servers can use techniques such as those used in SIP Outbound to reconnect clients 3102 to services if connections are lost.

At least one embodiment within this disclosure is a 'modular room' which will require minimal hardware. Hardware for encoding and decoding can deployed in small modules tied to displays, cameras, microphones and hubs. In at least one embodiment, there can be a module, called a content pod 3201 which can be tied to a single display and can perform such functions as receiving video streams from user devices such as tablets and phones and transcode them so that they can be transported across the network. For example, the pod could run AirPlay receiver software, which could receive a H264 stream from an iPad's screen and transcode it to H264 SVC. A content pod 3201 could also decode the stream for local display. The content pod 3201 could also receive video streams from remote participants and display them on the local display. In the event the content pod 3201 is coupled to a touch display, the content pod 3201 could function as an electronic whiteboard.

Figure 32:
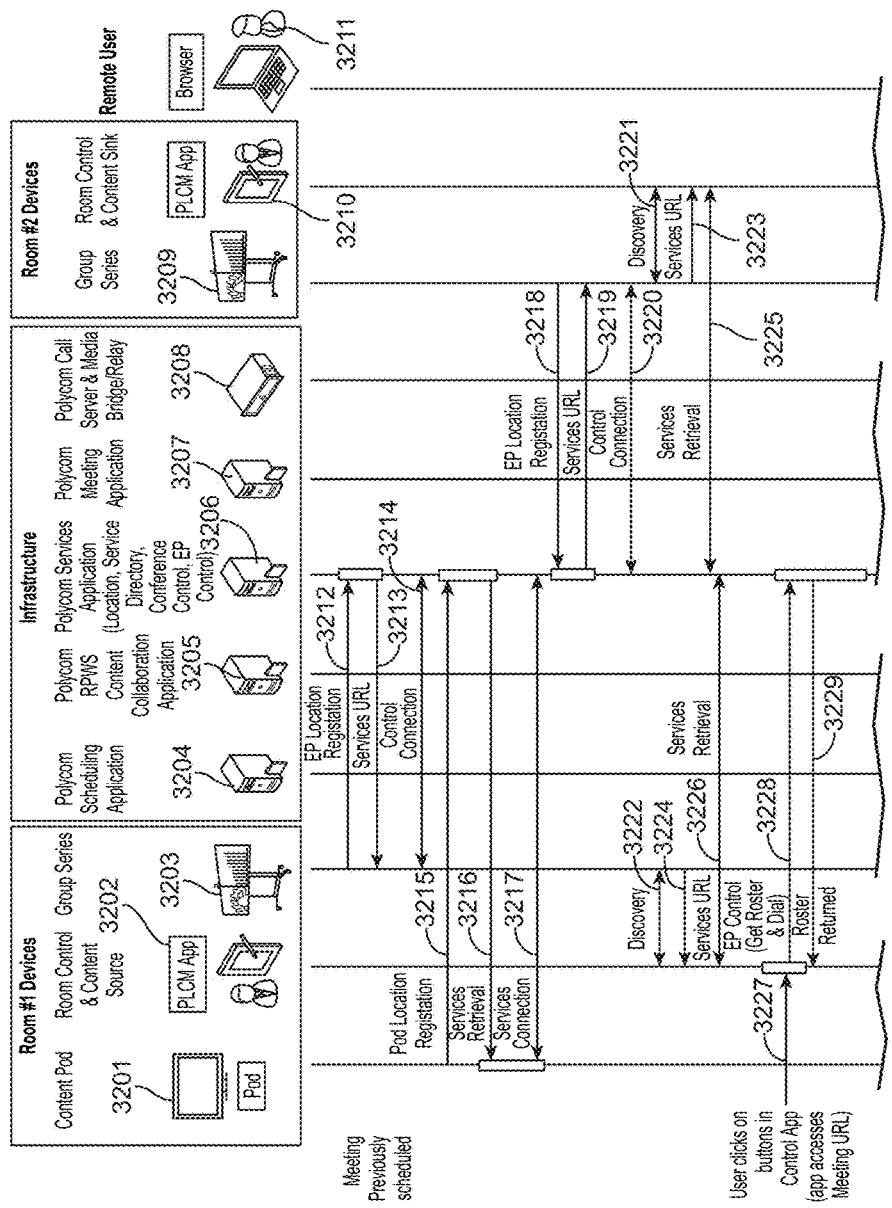
FIG. 32 is a flow diagram for a collaboration using BYOD control devices and dedicated content pods.
Figure 32:
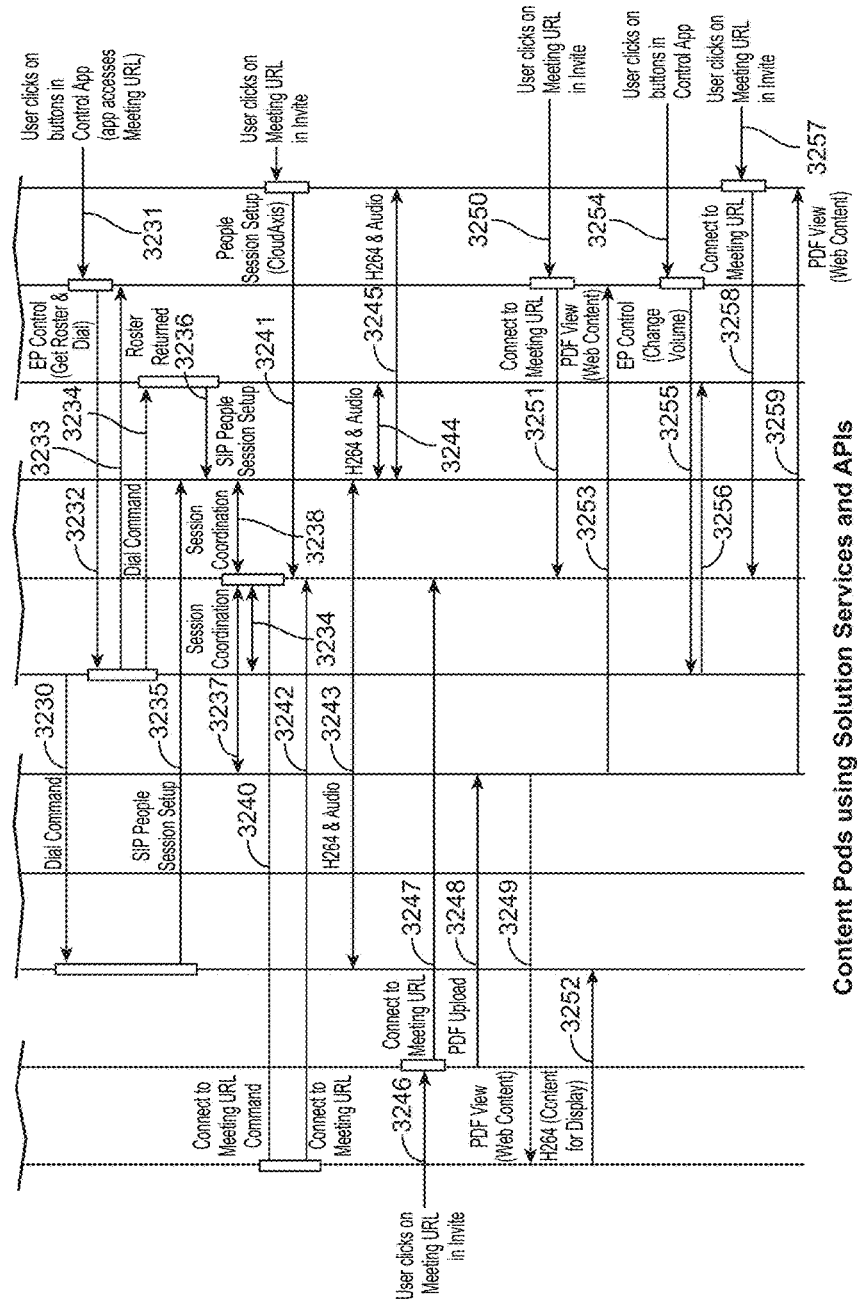

FIG. 32 illustrates a situation involving BYOD control devices and dedicated content pods 3201. FIG. 32 shows how content pods 3201 can associate with room endpoints, can join meetings and can receive content, as discussed above. FIG. 32 illustrates various actors and their relationships to one another in the context of an activity diagram. Actors include the Room #1 devices: the content pod 3201, the PLCM App 3202, and a Group Series system 3203. Infrastructure actors include: the Polycom scheduling application 3204, the Polycom RPWS content collaboration application 3205, the Polycom services application 3206, the Polycom meeting application 3207, and the Polycom call server and media bridge/relay 3208. Room #2 devices include a second Group Series system 3209 and a second PLCM App 3210. Additionally remote users 3211 may interface with the system as actors.

The activity diagram begins with the Group Series system 3206 providing end point location registration 3212 to the Polycom service application 3206. The Polycom services application 3206 provides a services URL 3213 to the Group Series system 3203. A control connection 3214 may be established between the Group Series system 3203 and the Polycom services application 3206. A content pod 3201 registers its location 3215 with the Polycom services application 3206. Similar to the Group Series system 3203, services may be retrieved 3216 by the content pod 3201 from the Polycom services application 3206. A services connection 3217 may be then established between the content pod 3201 and the Polycom service application 3206.

The Room #2 devices undergo a similar setup. The second Group Series system 3209 provides end point location registration 3218 to the Polycom service application 3206. The Polycom services application 3206 provides a services URL 3219 to the second Group Series system 3209. A control connection 3220 may be established between the second Group Series system 3209 and the Polycom services application 3206. Once the Group Series system 3203 and the second Group Series system 3209 have established proper control connections, the PLCM App 3202 and the second PLCM App 3210 may undergo discovery 3221, 3222 respectively with the Group Series system 3203 and the second Group Series system 3209. Likewise, the Group Series system 3203 and the second Group Series system 3209 provide service URLs 3223, 3224 to their respective PLCM Apps 3202, 3210. Service retrieval 3225, 3226 by the PLCM Apps 3202, 3210 then may occur with the Polycom Services Application 3206.

The PLCM App 3202 receives a user click on buttons 3227, which in turn prompts a EP control message 3228 to the Polycom Services Application 3206, including getting a roster and dial. The Polycom services application 3206 then returns the roster 3229 to the PLCM App 3202. The Polycom services application 3206 provides a dial command 3230 to the Group Series system 3203. The remote user 3211 provides the second PLCM app 3210 with a click on control buttons. The second PLCM app 3210 provides an EP control message 3232 similar to EP control message 3228, to the Polycom services application 3206. The Polycom services application 3206 then provides back the roster 3233 to the PLCM App 3210. The Polycom service application 3206 then issues a dial command to the second Group Series system 3234.

The Group Series server 3203 may send a SIP message for People Session setup 3235 to the Polycom Call Server and media bridge/relaty 3208. Likewise, the second Group Series system sets up a SIP people session setup message 3236 to the Polycom call server and media bridge/relay 3208. Session coordination 3237, 3238 takes place between the Polycom meeting application 3207 and the Polycom call server and media bridge/relay 3208 and the Polycom RPWS content collaboration application 3204. Session coordination 3239 also occurs between the Polycom meeting application 3207 and the Polycom services application 3206.

The content pod 3201 provides a connect to meeting URL command to the Polycom meeting application 3207. The remote user 3211 provides a People session setup (Cloud-Axis) command 3241 to the Polycom meeting application 3207, when the user clicks on the meeting URL invite. The content pod 3201 connects to the meeting URL 3243 via messaging the Polycom meeting application 3207. Once the two rooms are connected to the meeting, H264 video and audio 3243 may be sent to the Group Series system 3203 from the Polycom call server and media bridge/relay 3208. Likewise the Polycom call server and media bridge/relay 3208 provide H264 video and audio 3244 to the second Group Series system. The remote user 3211 also receives and transmits H264 video and audio 3245.

Content may also be shared via the PLCM App 3202. The users clicks on the meeting invite URL 3246, which may indicate the PLCM App 3202 to connect to the meeting URL 3247 on the Polycom meeting application 3207. The PLCM App 3202 uploads a PDF 3248 to the Polycom RPWS content collaboration application 3205. The PDF View 3249 may be transmitted back to the content pod 3201 as web content. Likewise the remote user 3211 may receive shared content as well by clicking on the URL invite 3250, which may require the second PLCM App 3210 to connect to the meeting URL 3251 with the Polycom meeting application 3207. The PDF View as web content 3253 is provided to the second PLCM App 3210 by the Polycom RPWS content collaboration application. The remote user 3111 may also click on control buttons in the control app 3254, which in turn may issue a EP Control Change Volume 3255 command to the Polycom services application 3206, which then issues the Change Volume 3256 command to the second Group Series system 3209 in Room #2. The remote user may also click on the meeting URL in an invite, possibly in a web browser, which then connects to the meeting URL 3258 with the Polycom application services 3206. The Polycom RPWS content collaboration application 3205 then delivers the shared PDF view 3259 as web content to the remote user 3211.

Additional examples within this disclosure include:

Example 1

A telepresence system comprising: at least one display device; a beacon coupled to the display device and configured to emit a signal so as to be discoverable by electronic devices within a predetermined proximity; a receiver-controller coupled to the beacon, the receiver-controller configured to enable such electronic devices to be recognized and to join a collaborative session in which content from one electronic device can be shared with other electronic devices; wherein the receiver-controller is further configured to share some or all of its functions with one or more of the joined devices simultaneously.

Example 2

The telepresence system of example 1, wherein joining of the collaborative session is done through a remote server via a GUI displayed on a web-browser of a joining electronic device.

Example 3

The telepresence system of example 2, wherein joining of the collaborative session by the electronic device requires confirmation of a unique ID of the joining device at the remote server.

Example 4

The telepresence system of example 1, wherein the recognition is achieved according to the Bluetooth standard.

Example 5

The telepresence system of example 1, wherein control functions are shared directly via an ultrasonic system or indirectly via the remote server.

Example 6

The telepresence system of example 5, wherein control functions include volume control, image control and muting control.

Example 7

The telepresence system of example 6, wherein the server is configured to automatically check a calendar engine associated with a joining device and to display information on one or more displays co-located with the joining device and coupled to the controller-receiver associated with information of the calendar engine.

Example 8

A telepresence device comprising: a display; a beacon coupled to the display; a receiver-controller coupled to the beacon; and a processor coupled to the beacon and the display, the processor further coupled to a non-transitory storage medium storing instructions executable by the processor to control the processor to: cause the beacon emit a signal so as to be discoverable by electronic devices within a predetermined proximity of the beacon; cause the receiver-controller to recognize such electronic devices and enable such devices to join a collaborative session in which content from one electronic device can be shared with other electronic devices; and further cause the receiver-controller to share some or all of its functions with one or more of the joined devices simultaneously.

Example 9

The telepresence device of example 8, wherein joining of the collaborative is done through a remote server via a GUI displayed on a web-browser of a joining electronic device.

Example 10

The telepresence device of example 9, wherein joining of the collaborative session by the electronic device requires confirmation of a unique ID of a joining device at the remote server.

Example 11

The telepresence device of example 8, wherein the recognition is achieved according to the Bluetooth standard.

Example 12

The telepresence device of example 8, wherein control functions are shared directly via an ultrasonic system or indirectly via the remote server.

Example 13

The telepresence device of example 12, wherein control functions include volume control, image control and muting control.

Example 14

The telepresence device of example 13, wherein the server is configured to automatically check a calendar engine associated with a joining device and to display information on one or more displays co-located with the joining device and coupled to the controller-receiver associated with information of the calendar engine.

Example 15

A non-transitory computer readable storage medium storing instructions executable by a processor to: cause a beacon to emit a signal so as to be discoverable by electronic devices within a predetermined proximity of the beacon; cause a receiver-controller co-located with the beacon to recognize such electronic devices and enable such devices to join a collaborative session in which content from one electronic device can be shared with other electronic devices; and further cause the receiver-controller to share some or all of its functions with one or more of the joined devices simultaneously.

Example 16

The non-transitory computer readable storage medium of example 15, wherein joining of the collaborative session is done through a remote server via a GUI displayed on a web-browser of a joining electronic device.

Example 17

The non-transitory computer readable storage medium of example 16, wherein joining of the collaborative session by the electronic device requires confirmation of a unique ID of a joining device at the remote server.

Example 18

The non-transitory computer readable storage medium of example 15, wherein the recognition is achieved according to the Bluetooth standard.

Example 19

The non-transitory computer readable storage medium of example 15, wherein control functions are shared directly via an ultrasonic system or indirectly via the remote server.

Example 20

The non-transitory computer readable storage medium of example 19, wherein control functions include volume control, image control and muting control.

Example 21

A telepresence system which is configured to: allow a Bring Your Own Device (BYOD) device to interact with the system and perform functions according to the state of the system and the capabilities of the BYOD device, wherein the system and BYOD device automatically commence joining in location and receive and perform allowed functions appropriate to the state of a conference and the system.

The embodiments and examples described above are illustrative, and should in no way be construed as limiting the scope of the following claims.

We claim:

1. A telepresence system of an enterprise system, the telepresence system comprising:
   at least one display device;
   a beacon coupled to the display device and configured to emit a signal discoverable by electronic devices within a predetermined proximity; and
   a receiver-controller coupled to the beacon, a camera, and a microphone, the receiver-controller configured to:
     detect discovery of the beacon by a first electronic device associated with a conference chairperson registered within the enterprise system;
     receive a first instruction from the first electronic device to initiate a collaborative session in which content from one electronic device can be shared with other electronic devices;
     send a first invitation to a second electronic device associated with an attendee registered with the enterprise system and a second invitation to a third electronic device associated with a first guest not registered with the enterprise system, responsive to receiving the first instruction;
     join the second electronic device and the third electronic device to the collaborative session;
     detect discovery during the collaborative session of the beacon by a fourth electronic device associated with a second guest not registered with the enterprise system;
     receive, from the first electronic device, a second instruction to join the fourth electronic device to the collaborative session; and
     join, responsive to the second instruction, the fourth electronic device to the collaboration session,
   wherein the first electronic device can, due to the first electronic device's association with the registered conference chairperson, control the camera, control the display device, mute the microphone, and mute audio pickup at the second electronic device, the third electronic device, and the fourth electronic device, and share content with the display device, the second electronic device, the third electronic device, and the fourth electronic device;
   wherein the second electronic device can, due to the second electronic device's association with the registered attendee, control the display device, unmute the microphone, and share content with the display device, the third electronic device, and the fourth electronic device;
   wherein the third electronic device can, due to the second invitation, unmute the microphone, and share content with the display device, the third electronic device, and the fourth electronic device; and
   wherein the fourth electronic device can, due to the fourth electronic device's association with the second guest not registered with the enterprise system, share content with the display device, the first electronic device, the second electronic device, and the third electronic device.

2. The telepresence system of claim 1, wherein joining of the collaborative session is done through a remote server via a GUI displayed on a web-browser of a joining electronic device.

3. The telepresence system of claim 2, wherein joining of the collaborative session by the joining electronic device requires confirmation of a unique ID of the joining electronic device at the remote server.

4. The telepresence system of claim 1, wherein discovery of the beacon by the first electronic device is detected according to the Bluetooth standard.

5. The telepresence system of claim 1, wherein control functions are shared directly via an ultrasonic system or indirectly via a remote server.

6. The telepresence system of claim 2, wherein the remote server is configured to automatically check a calendar engine associated with a joining device and to display information on one or more displays co-located with the joining device and coupled to the receiver-controller associated with information of the calendar engine.

7. A telepresence device of an enterprise system, the telepresence device comprising:
   a display;
   a beacon coupled to the display;
   a receiver-controller coupled to the beacon;
   a camera;
   a microphone; and
   a processor coupled to the beacon, the camera, the microphone, and the display, the processor further coupled to a non-transitory storage medium storing instructions executable by the processor, the instructions comprising instructions to:
   emit, using the beacon, a signal discoverable by electronic devices within a predetermined proximity of the beacon;
   detect, using the receiver-controller, discovery of the beacon by a first electronic device associated with a conference chairperson registered with the enterprise system;
   receive, using the receiver-controller, a first instruction from the first electronic device to initiate a collaborative session in which content from one electronic device can be shared with other electronic devices;
   send, using the receiver-controller, a first invitation to a second electronic device associated with an attendee registered with the enterprise system and a second invitation to a third electronic device associated with a first guest not registered with the enterprise system, responsive to receiving the first instruction;

join, using the receiver-controller, the second electronic device and the third electronic device to the collaborative session;

detect, using the receiver-controller, discovery during the collaborative session of the beacon by a fourth electronic device associated with a second guest not registered with the enterprise system;

receive, from the first electronic device, a second instruction to join the fourth electronic device to the collaborative session; and join, responsive to the second instruction, the fourth electronic device to the collaboration session, wherein the first electronic device can, due to the first electronic device's association with the registered conference chairperson, control the camera, control the display, mute the microphone, and mute audio pickup at the second electronic device, the third electronic device, and the fourth electronic device, and share content with the display, the second electronic device, the third electronic device, and the fourth electronic device;

wherein the second electronic device can, due to the second electronic device's association with the registered attendee, control the display, unmute the microphone, and share content with the display, the third electronic device, and the fourth electronic device;

wherein the third electronic device can, due to the second invitation, unmute the microphone, and share content with the display, the third electronic device, and the fourth electronic device; and wherein the fourth electronic device can, due to the fourth electronic device's association with the second guest not registered with the enterprise system, share content with the display, the first electronic device, the second electronic device, and the third electronic device.

8. The telepresence device of claim 7, wherein joining of the collaborative session is done through a remote server via a GUI displayed on a web-browser of a joining electronic device.

9. The telepresence device of claim 8, wherein joining of the collaborative session by the joining electronic device requires confirmation of a unique ID of the joining electronic device at the remote server.

10. The telepresence device of claim 7, wherein discovery of the beacon by the first electronic device is detected according to the Bluetooth standard.

11. The telepresence device of claim 7, wherein control functions are shared directly via an ultrasonic system or indirectly via a remote server.

12. The telepresence device of claim 8, wherein the remote server is configured to automatically check a calendar engine associated with a joining device and to display information on one or more displays co-located with the joining device and coupled to the receiver-controller associated with information of the calendar engine.

13. A non-transitory computer readable storage medium storing instructions executable by a processor to:

cause a beacon to emit a signal discoverable by electronic devices within a predetermined proximity of the beacon;

cause a receiver-controller co-located with the beacon, a display, a camera, and a microphone to:

detect discovery of the beacon by a first electronic device associated with a conference chairperson registered within an enterprise system;

receive a first instruction from the first electronic device to initiate a collaborative session in which content from one electronic device can be shared with other electronic devices;

send a first invitation to a second electronic device associated with an attendee registered with the enterprise system and a second invitation to a third electronic device associated with a first guest not registered with the enterprise system, responsive to receiving the first instruction;

join the second electronic device and the third electronic device to the collaborative session;

detect discovery during the collaborative session of the beacon by a fourth electronic device associated with a second guest not registered with the enterprise system;

receive, from the first electronic device, a second instruction to join the fourth electronic device to the collaborative session; and join, responsive to the second instruction, the fourth electronic device to the collaboration session, wherein the first electronic device can, due to the first electronic device's association with the registered conference chairperson, control the camera, control the display, mute the microphone, and mute audio pickup at the second electronic device, the third electronic device, and the fourth electronic device, and share content with the display, the second electronic device, the third electronic device, and the fourth electronic device;

wherein the second electronic device can, due to the second electronic device's association with the registered attendee, control the display, unmute the microphone, and share content with the display, the third electronic device, and the fourth electronic device;

wherein the third electronic device can, due to the second invitation, unmute the microphone, and share content with the display, the third electronic device, and the fourth electronic device; and wherein the fourth electronic device can, due to the fourth electronic device's association with the second guest not registered with the enterprise system, share content with the display, the first electronic device, the second electronic device, and the third electronic device.

14. The non-transitory computer readable storage medium of claim 13, wherein joining of the collaborative session is done through a remote server via a GUI displayed on a web-browser of a joining electronic device.

15. The non-transitory computer readable storage medium of claim 14, wherein joining of the collaborative session by the joining electronic device requires confirmation of a unique ID of the joining electronic device at the remote server.

16. The non-transitory computer readable storage medium of claim 13, wherein discovery of the beacon by the first electronic device is detected according to the Bluetooth standard.

17. The non-transitory computer readable storage medium of claim 13, wherein control functions are shared directly via an ultrasonic system or indirectly via a remote server.

* * * * *